United States Patent
Kawamura et al.

(10) Patent No.: US 6,332,057 B1
(45) Date of Patent: *Dec. 18, 2001

(54) DATA REPRODUCTION APPARATUS AND DATA STORAGE MEDIUM

(75) Inventors: Makoto Kawamura; Yasushi Fujinami, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/207,717

(22) Filed: Dec. 9, 1998

Related U.S. Application Data

(62) Division of application No. 08/495,506, filed on Oct. 6, 1995, now Pat. No. 6,151,441.

(30) Foreign Application Priority Data

Dec. 18, 1993 (JP) .................................................. 5-344012

(51) Int. Cl.[7] .................................................. H04N 5/91
(52) U.S. Cl. .............................. 386/95; 386/98; 386/104
(58) Field of Search .................................. 386/46, 95, 98, 386/111, 112, 124, 104, 96, 125; 348/465, 473; 369/60; 360/32

(56) References Cited

U.S. PATENT DOCUMENTS

| | | | |
|---|---|---|---|
| 5,455,684 | * 10/1995 | Fujinami et al. | 386/111 |
| 5,471,450 | * 11/1995 | Yonemitsu et al. | 369/60 |
| 5,537,148 | * 7/1996 | Fujinami | 348/473 |
| 5,550,593 | * 8/1996 | Nakabayashi | 348/465 |
| 5,598,276 | * 1/1997 | Cookson et al. | 386/46 |

* cited by examiner

*Primary Examiner*—Huy Nguyen
(74) *Attorney, Agent, or Firm*—Frommer Lawrence & Haug, LLP.; William S. Frommer; Bruno Polito

(57) ABSTRACT

A data reproduction apparatus and a data storage medium for synchronously reproducing multiplexed data with video, audio, and superimposed dialogue data compressed at a variable rate and performing various functions. Data are reproduced from the data storage medium using sector numbers, and data for negative sector numbers carried by some sectors are also reproduced. Multiplexing information indicating whether or not image, voice, and superimposed dialogue data is each multiplexed and information for the positions of access points used for data search and random access are stored in the positions represented by these negative sector numbers and reproduced so as to enable multiplexed data with video, audio, and superimposed dialogue data compressed at a variable rate to be synchronously reproduced and various functions to be executed.

8 Claims, 35 Drawing Sheets

| | |
|---|---|
| TOC HEADER | |
| TOC SIZE | |
| NUMBER OF TRACKS (N) | |
| TRACK INFORMATION (FIRST TRACK) | TRACK NUMBER |
| | START SECTOR NUMBER |
| | END SECTOR NUMBER |
| | REPRO INHIBIT FLAG |
| | V. MULTIPLEX FLAG |
| | A. MULTIPLEX FLAG |
| | SD MULTIPLEX FLAG |
| | MULTIPLEX FLAG VALIDITY FLAG |
| TRACK INFORMATION (SECOND TRACK) | TRACK NUMBER |
| | START SECTOR NUMBER |
| | END SECTOR NUMBER |
| | REPRO INHIBIT FLAG |
| | V. MULTIPLEX FLAG |
| | A. MULTIPLEX FLAG |
| | SD MULTIPLEX FLAG |
| | MULTIPLEX FLAG VALIDITY FLAG |

| | |
|---|---|
| TRACK INFORMATION (N-TH TRACK) | TRACK NUMBER |
| | START SECTOR NUMBER |
| | END SECTOR NUMBER |
| | REPRO INHIBIT FLAG |
| | V. MULTIPLEX FLAG |
| | A. MULTIPLEX FLAG |
| | SD MULTIPLEX FLAG |
| | MULTIPLEX FLAG VALIDITY FLAG |
| ENTRY POINT TABLE HEADER | |
| ENTRY POINT TABLE | NUM OF ENTRY POINTS (M) |
| ENTRY POINT INFOMATION (1ST ENTRY POINT) | ENTRY POINT SECTOR NUMBER |
| | ENTRY POINT TIME CODE |
| ENTRY POINT INFOMATION (M-TH ENTRY POINT) | ENTRY POINT SECTOR NUMBER |
| | ENTRY POINT TIME CODE |
| TOC END MARK | |

FIG. 6

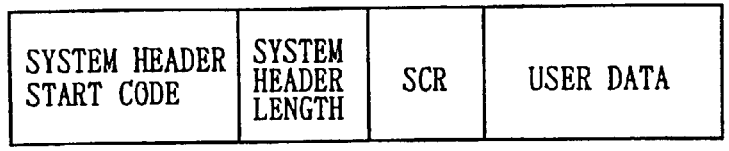
FIG. 8
FORMAT OF VIDEO DATA HEADER
   (DTSV ENCODE FLAG=0)
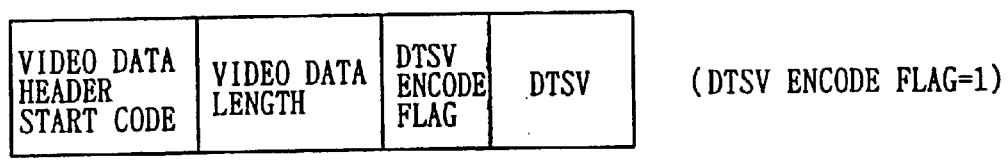   (DTSV ENCODE FLAG=1)
FORMAT OF AUDIO DATA HEADER
   (DTSA ENCODE FLAG=0)
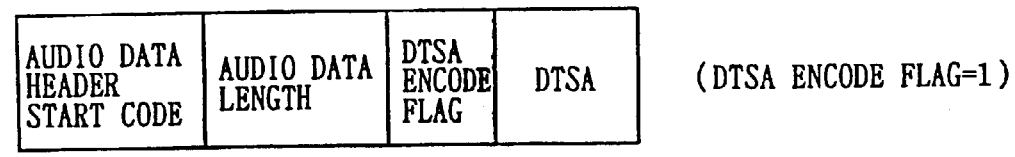   (DTSA ENCODE FLAG=1)
FORMAT OF SUPERIMPOSED DIALOGUE DATA HEADER
   (DTSS ENCODE FLAG=0)
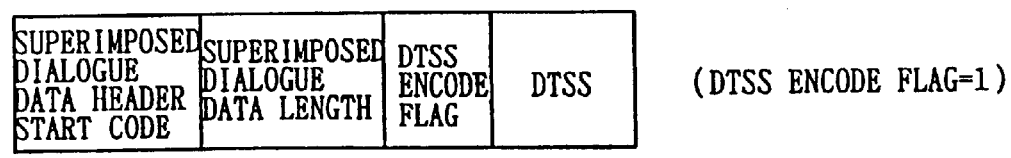   (DTSS ENCODE FLAG=1)
FIG. 9

DATA REPRODUCTION APPARATUS AND DATA STORAGE MEDIUM

CROSS-REFERENCE TO RELATED APPLICATION

This application is a divisional application of U.S. patent application Ser. No. 08/495,506 filed Oct. 6, 1995, U.S. Pat. No. 6,151,441.

TECHNICAL FIELD

The present invention relates to a data reproduction apparatus and a data storage medium that can be preferably applied to, for example, those using a storage medium with digitalized moving picture stored therein.

BACKGROUND ART

A conventional data reproduction apparatus that reproduces data from a disk as a storage medium with digitalized moving picture stored therein is described as a variable-rate-sensitive data reproduction apparatus as shown in FIG. 12 in the applicant's Japanese Patent Laid Open No.6-124,168 (publicized on May 6, 1994). This reproduction apparatus reproduces data stored on an optical disk 101 using a pickup 102. The pickup 102 irradiates the optical disk 101 with laser beams and uses light reflected from the optic disk 101 to reproduce the data stored therein. Signals reproduced by the pickup 102 are delivered to a demodulator 103. The demodulator 103 demodulates the reproduced signals output by the optic pickup 102 to output them to a sector detector 104.

The sector detector 104 detects an address stored in each sector from the delivered data to output it to a ring buffer control circuit 106. It also outputs the data to an ECC circuit 105 located after the sector detector while maintaining sector synchronization. The sector detector 104 outputs a sector number error signal to a track jump determination circuit 118 via the ring buffer control circuit 106 if the detector fails to detect addresses or if detected addresses are not continuous.

The ECC circuit 105 detects an error in data supplied by the sector detector 104, and uses redundant bits contained in the data to correct the error to output the corrected data to a ring buffer memory (FIFO) 107 for the ring jump. Furthermore, if the ECC circuit 105 fails to correct an error in data, it outputs an error generation signal to the track jump determination circuit 118.

The ring buffer control circuit 106 controls writes to and reads from the ring buffer memory 107, and monitors a code request signal requesting data output from a multiplexed data separation circuit 108.

The track jump determination circuit 118 monitors the output of the ring buffer control circuit 106 to output a track jump signal to a tracking servo circuit 117 as required to track-jump the reproduction position of the pickup 102 relative to the optical disk 101. The track jump determination circuit 118 also detects a sector number error signal from the sector detector 104 or an error generation signal from the ECC circuit 105 to output the track jump signal to the tracking servo circuit 117 to track-jump the reproduction position of the pickup 102.

The output of the ring buffer memory 107 is supplied to the multiplexed data separation circuit 108. A header separation circuit 109 in the multiplexed data separation circuit 108 separates pack headers and packet headers from data supplied from the ring buffer memory 107 to deliver them to a separator control 111, and supplies time-division-multiplexed data to the input terminal G of a switching circuit 110. The output terminals (switched terminals) H1, H2 of the switching circuit 110 are connected to the input terminals of a video code buffer 113 and an audio code buffer 115, respectively. The output of the video code buffer 115 is connected to the input of a video decoder 114, while the output of the audio code buffer 115 is connected to the input of an audio decoder 116.

In addition, code request signals generated by a video decoder 114 are input to the video code buffer 113, while code request signals generated by the video code buffer 113 are input to the multiplexed data separation circuit 108. Similarly, code request signals issued by an audio decoder 116 are input to the audio code buffer 115, while code request signals issued by the audio code buffer 115 are input to the multiplexed data separation circuit 108.

The operation of each component of this data reproduction apparatus is described next. The pickup 102 irradiates the optical disk 101 with laser beams, and uses light reflected from the optical disk to reproduce the data stored therein. Reproduced signals output by the pickup 102 are input to the demodulator 103 for demodulation. The data demodulated by the demodulator 103 is input to the ECC circuit 105 via the sector detector 104 to detect and correct an error.

A sector number error signal is output to the track jump determination circuit 118 if the sector detector 104 fails to detect sector numbers (the addresses assigned to the sectors of the optical disk 101) correctly. The ECC circuit 105 outputs an error generation signal to the track jump determination circuit 118 if an uncorrectable error is occurring in the data. Corrected data is delivered from the ECC circuit 105 to the ring buffer memory 107 for storage.

The ring buffer control circuit 106 reads the address of each sector from the output of the sector detector 104 to designate the write address (write point (WP)) on the ring buffer memory 107 corresponding to the address of the sector. The ring buffer control 106 also designates read addresses (reproduction points (RPs)) for the data written to the ring buffer memory 107 based on a code request signal from the multiplexed data separation circuit 108 located after the ring buffer control. It then reads data from the reproduction points (RP) to supply them to the multiplexed data separation circuit 108.

The head separation circuit 109 in the multiplexed data separation circuit 108 separates pack headers and packet headers from the data delivered by the ring buffer memory 107 to supply them to the separation circuit control circuit 111. The separation circuit control circuit 111 sequentially connects the input terminal G of the switching circuit 110 to the output terminal (switched terminal) H1 or H2 thereof according to the stream ID information in the packet headers delivered from the header separation circuit 109 to separate the time-division-multiplexed data correctly. It then supplies the data to the corresponding data buffer 113 or 115.

The video code buffer 113 issues a code request signal to the multiplexed data separation circuit 108 using the available section of its internal code buffer. The buffer 113 then stores received data. It also receives code request signals from the video decoder 114 to output data it contains. The video decoder 114 reproduces video signals from the supplied data to output them from the output terminal.

The audio code buffer 115 issues a code request signal to the multiplexed data separation circuit 108 using the available section of its internal code buffer. The buffer 115 then stores received data. It also receives code request signals from the audio decoder 116 and outputs data it contains. The audio decoder 116 reproduces audio signals from the supplied data to output them from the output terminal.

The video decoder 114 thus requests data from the video code buffer 113, while the video code buffer 113 requests data from the multiplexed data separation circuit 108. The multiplexed data separation circuit 108 in turn requests data from the ring buffer control circuit 106. In this case, data flows from the ring buffer memory 107 in the direction reverse to the request.

For example, reads from the ring buffer memory 107 decrease with the decreasing amount of data consumed by the video decoder 114 per unit time due to continuous data processing for simple screens. In this case, the amount of data stored in the ring buffer memory 107 may increase, resulting in overflow. The track jump determination circuit 118 thus uses write points (WPs) and reproduction points (RPs) to calculate the amount of data currently stored in the ring buffer memory 107 and, if the data exceeds a predetermined criteria, determines that the ring buffer memory may overflow to output a track jump instruction to the tracking servo circuit 117.

If the track jump determination circuit 118 detects a selector number error signal from the sector detector 104 or an error generation signal from the ECC circuit 105, it uses write addresses (WPs) and read addresses (RPs) to calculate the amount of data remaining in the ring buffer memory 107 and the amount of data required to ensure reads from the ring buffer memory 107 to the multiplexed data separation circuit 108 while the optical disk 101 is making a single rotation from the current track position (that is, while waiting for the optical disk 101 to make a single rotation).

If a large amount of data remains in the ring buffer memory 107, the track jump determination circuit 118 determines that the error can be recovered by forcing the pickup 102 to retry to reproduce data from the position where the error has occurred and outputs a track jump instruction to the tracking servo circuit 117 because an underflow does not occur even if data is read from the ring buffer memory 107 at the maximum transfer rate.

When the track jump instruction is output from the track jump determination circuit 118, for example, the tracking servo circuit 117 forces the pickup 102 to jump from position A to position B inner-circumferentially one track off from position A, as shown in FIG. 13 The ring buffer control circuit 106 inhibits new data from being written to the ring buffer memory 107 and the data stored in the ring buffer memory 107 is transferred to the multiplexed data separation circuit 108 as required until the optical disk makes another single rotation from position B to position A, that is, until the sector number obtained from the sector detector 104 becomes equal to that obtained before the track jump.

Even when the sector number obtained from the sector detector 104 becomes equal to that obtained before the track jump, writes to the ring buffer memory 107 are not restarted and another track jump is performed if the amount of data stored in the ring buffer memory 107 exceeds the predetermined criteria, that is, if the ring buffer memory 107 may overflow. The data reproduction apparatus can thus use the ring buffer memory 107 to address a variable rate and to carry out retries on errors.

The usefulness of this conventional data reproduction apparatus can be substantially improved by synchronously reproducing multiplexed data with video, audio, and superimposed dialogue data compressed at a variable rate in conformity with ISO11172 (MPEG1) or ISO13818 (MPEG2) while correcting synchronization errors and to perform a search, a halt, or a frame feed operation on errors.

DISCLOSURE OF INVENTION

In view of the above points, this invention proposes a data reproduction apparatus that synchronously reproduces multiplexed data with video, audio, and superimposed dialogue data compressed at a variable rate and performs various functions as well as a data storage medium associated with this device.

To achieve this object, this invention sets negative sector numbers to some sectors in a data storage medium that stores and reproduces data in sectors.

A data reproduction apparatus for reproducing data according to this invention reproduces data from a data storage medium with data stored in sectors using sector numbers as well as the negative sector numbers set to some sectors.

This invention stores, in predetermined positions on a data storage medium with multiplexed data comprising image data, audio data, superimposed dialogue data, and/or other data stored therein, multiplexing information indicating whether or not this data is multiplexed.

This invention also reads, from predetermined positions on a data storage medium with multiplexed data comprising image data, audio data, superimposed dialogue data, and/or other data stored therein, multiplexing information indicating whether or not this data is multiplexed.

This invention also stores positional information for access points used for data search and random access, in predetermined positions on a data storage medium with multiplexed data comprising image data, audio data, superimposed dialogue data, and/or other data stored therein.

This invention also reads positional information for access points used for data search and random access from predetermined positions on a data storage medium with multiplexed data comprising image data, audio data, superimposed dialogue data, and/or other data stored therein.

A data reproduction apparatus according to this invention having an error correction device, a ring buffer, a video code buffer, an audio code buffer, and/or a superimposed dialogue code buffer tests the operation of the memory contained in one or more of the above devices when activated or at an arbitrary point in time.

A data reproduction apparatus according to this invention using two types of error correction symbols associated with different interleaving directions to correct errors in reproduced data has an error correction device capable of varying the number of times that errors are corrected.

A data reproduction apparatus according to this invention which rereads data from the position where an error has occurred when the error is uncorrectable, automatically switches the number of times that data is reread, depending on operational conditions or the type of data to be reproduced.

A data reproduction apparatus according to this invention which can vary the number of times that errors are corrected and the number of times that data is reread automatically switches the number of times and the order that errors are corrected and that data is reread, depending on operational conditions or the type of data to be reproduced.

A data reproduction apparatus according to this invention comprising a buffer for reading at a variable rate or a buffer for rereading data when a data readout from a storage medium fails stores in a buffer memory information for the contents of data stored in the data storage medium.

The data reproduction apparatus according to this invention comprising a buffer for reading at a variable rate or a buffer for rereading data when data read from a storage medium fails stores in the buffer memory positional information for access points used for search and random access.

A data reproduction apparatus according to this invention for reproducing data from a data storage medium with image, audio, or superimposed dialogue data or other data stored therein automatically reproduces all or part of the image, audio, and/or superimposed dialogue data stored in the storage medium when the apparatus is activated, or when the storage medium is installed if the medium is removable.

In a data storage medium according to this invention having image, audio, or superimposed dialogue data or other data stored therein, reproduced data is written to specific positions when all or part of the stored image, audio, and/or superimposed dialogue data is automatically reproduced when the apparatus is activated, or when the storage medium is installed if the medium is removable.

A data reproduction apparatus for reproducing data from a data storage medium with image, audio, or superimposed dialogue data or other data stored therein automatically reproduces all or part of the image, audio, and/or superimposed dialogue data stored in the storage medium when the reproduction of part or all of the stored image, audio, and/or superimposed dialogue data is finished, suspended, or halted.

In the data storage medium according to this invention having image, audio, or superimposed dialogue data or other data stored therein, reproduced data is written to specific positions when all or part of the stored image, audio, and/or superimposed dialogue data is automatically reproduced when the reproduction of part or all of the stored image, audio, and/or superimposed dialogue data is finished, suspended, or halted.

A data reproduction apparatus according to this invention for reproducing multiplexed data comprising image, audio, and/or superimposed dialogue data has a multiplexing detection means for detecting whether or not the image, audio, and superimposed dialogue data is each multiplexed in the multiplexed data.

In a data reproduction apparatus according to this invention having a video code buffer, an audio code buffer, and/or a superimposed dialogue code buffer, a buffer memory has stored therein the video, audio, and/or superimposed dialogue data as well as information for data decoding start time inserted into the audio or the superimposed dialogue data.

This invention also has a reference clock for detecting an error in the synchronization of the reproduction time or the decoding start time of the video, audio, and superimposed dialogue data and measuring the magnitude of the error.

To start reproduction of multiplexed data with video and audio data, this invention skips the audio data instead of decoding it or clears all or part of a buffer for storing audio data to enable the audio data to have an earlier decoding start time than the video data so that the decoding of the video data can be started earlier than that of the audio data if comparison of the video decoding start time with the audio decoding time shows that the former is earlier than the latter.

This invention also starts reproduction of video, audio, or superimposed dialogue data in synchronization with a vertical synchronization signal.

A data reproduction apparatus according to this invention which can reproduce multiplexed data with video and audio data starts reproduction of the audio data in synchronization with the video data being reproduced and a reference clock in operation if the audio data is detected for the first time after reproduction of the video data has only been started.

A data reproduction apparatus according to this invention which can reproduce multiplexed data with video and superimposed dialogue data starts reproduction of the video data in synchronization with the audio data being reproduced and a reference clock in operation if the video data is detected for the first time after reproduction of the audio data has only been started.

A data reproduction apparatus according to this invention which can reproduce multiplexed data with video and superimposed dialogue data starts reproduction of the video data in synchronization with the superimposed dialogue data being reproduced and a reference clock in operation if the video data is detected for the first time after reproduction of the superimposed dialogue data has only been started.

A data reproduction apparatus according to this invention which can reproduce multiplexed data comprising audio and superimposed dialogue data starts reproduction of the audio data in synchronization with the superimposed dialogue data being reproduced and a reference clock in operation if the audio data is detected for the first time after reproduction of the superimposed dialogue data has only been started.

A data storage medium according to this invention for storing multiplexed data with video data in conformity with ISO11172 (MPEG1) or ISO13818 (MPEG2) or a plurality of data including such video data ensures that decoding start information is encoded for each picture.

A data reproduction apparatus according to this invention for reproducing video data in conformity with ISO11172 (MPEG1) or ISO13818 (MPEG2) having a means for detecting picture heads and the type of pictures carries out fast-forward reproduction by reproducing I- and P-pictures without reproducing B-pictures.

A data reproduction apparatus according to this invention for reproducing video and audio data comprising an error correction device for correcting errors in data read from a storage medium temporarily stops video output, reduces the brightness of a screen, outputs a blue or other color screen, stops audio output, or reduces the output level at the moment when the data in which an error has occurred is reproduced if the error cannot be corrected by the error correction device.

A data reproduction apparatus comprising an error correction device for correcting errors in data read from a storage medium and a mechanism for counting the number of times that an error that cannot be corrected by the error correction device skips data to be reproduced or aborts reproduction depending on the number or the frequency of errors that have occurred during a specified length of time.

A data reproduction apparatus according to this invention for reproducing video data in conformity with ISO11172 (MPEG1) or ISO13818 (MPEG2) having a means for detecting picture heads and the type of pictures and performing search operation by track jump repeats to carry out search operations in both forward and reverse directions when a P- or a B-picture is detected immediately after only I-pictures are selected and reproduced.

A data reproduction apparatus according to this invention for reproducing multiplexed data with video, audio, and/or superimposed dialogue data stops loading audio and/or superimposed dialogue data into a code buffer, periodically clears the code buffer, or instructs search for information for superimposed dialogue decoding start time, when searching for video data or feeding frames.

Data is reproduced according to sector numbers, and negative sector numbers set to some sectors are also reproduced. Multiplexed data with video, audio, and superimposed dialogue data compressed at a variable rate can be synchronously reproduced and various functions can be executed by storing, in the positions represented by these negative sector numbers, multiplexing information indicating whether or not the image, audio, and superimposed dialogue data is each multiplexed in the multiplexed data and positional information for access points used for data search and random access, and reproducing this information.

BRIEF DESCRIPTION OF DRAWINGS

FIG. 6 is a schematic diagram describing the structure of TOC data in the DCM which differs from the TOC data in FIG. 5;

FIG. 8 is a schematic diagram describing the structure of a system header in the bit stream in FIGS. 7A to 7D;

FIG. 9 is a schematic diagram describing the structures of video, audio, and superimposed dialogue data heads in the bit stream in FIGS. 7A to 7D;

BEST MODE FOR CARRYING OUT THE INVENTION

An embodiment of this invention is described with reference to the drawings.

(1) Configuration of the Data Reproduction Apparatus

Figure 1:
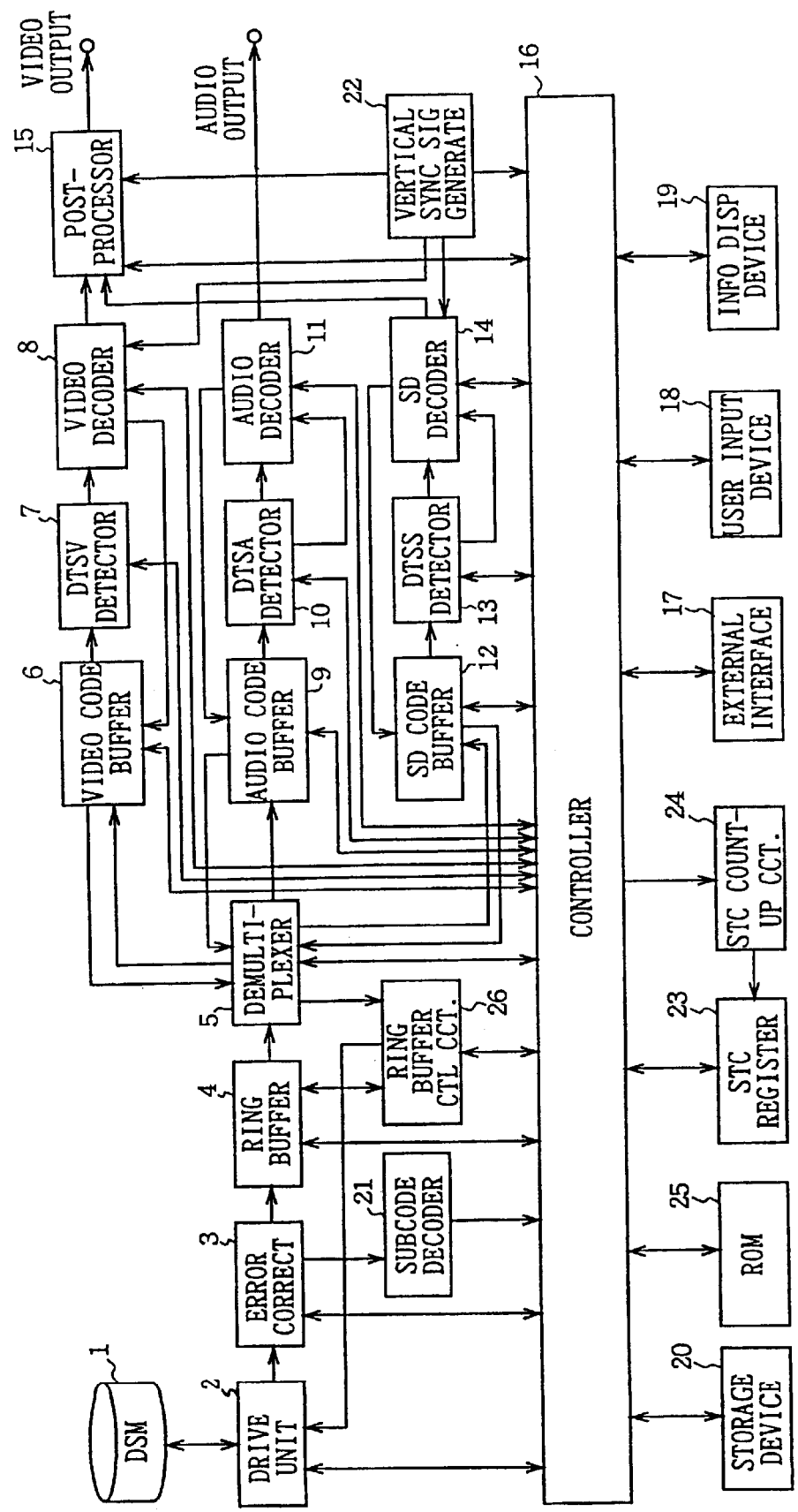
FIG. 1 is a block diagram illustrating the configuration of a data reproduction apparatus according to this invention.

FIG. 1 generally illustrates a data reproduction apparatus according to this invention wherein a data storage media (DSM) 1 comprises an optical disk that can be removed from a drive unit 2 that stores digital data such as video, audio, superimposed dialogue, and table of contents (TOC) information. However, the DSM 1 may be a removable or detachable optical storage medium, magnetic storage medium, optoelectro medium or semiconductor storage element, or other digital data storage medium.

The drive unit 2 has a mechanism section for mechanically loading and unloading the DSM 1 and a drive driving a pickup comprising an optical head for reading reproduction signals from the DSM 1. The pickup corresponds to the DSM 1, and may be a magnetic or an optoelectro head. The pickup also acts as an address pointer if the DSM 1 is a semiconductor element. The drive unit 2 has a demodulator that demodulates read-out reproduction signals to obtain subcode data, multiplexed data, error correction data (C1), and error correction data (C2), and sends it to the error correction device 3 in the format shown in FIG. 2.

Figure 2:
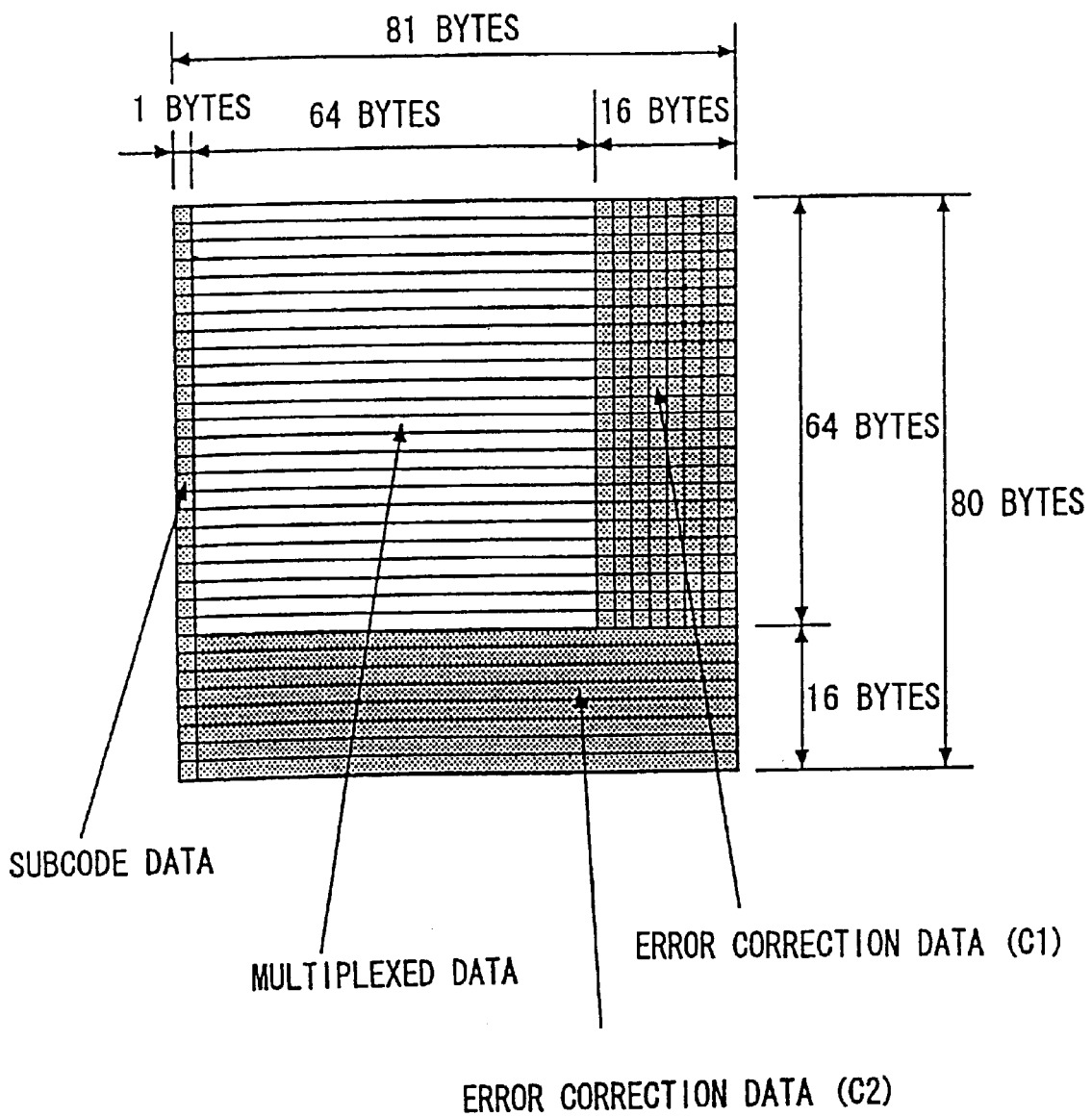
FIG. 2 is a schematic diagram describing the sector format for reproduced data in the data reproduction apparatus.
Figure 12:
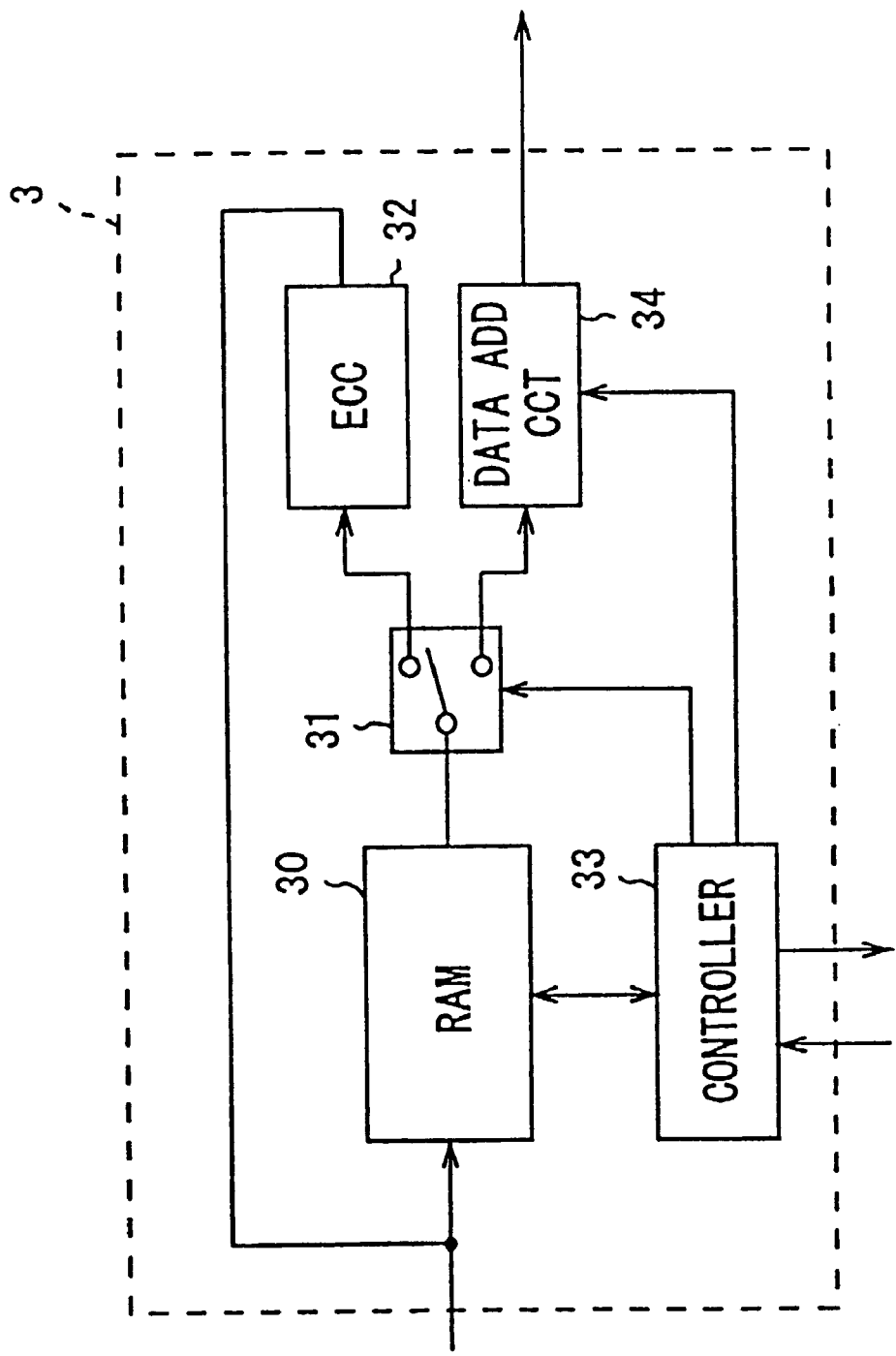
FIG. 12 is a block diagram illustrating the configuration of an error correction device 3.

The error correction device 3 receives subcode data, multiplexed data, error correction data (C1), and error correction data (C2) sent from the drive unit 2 in the format shown in FIG. 2, and uses the error correction data to detect and correct errors. It also analyzes subcode data with an error corrected to obtain sector number data. It also appends sector number data and an error flag obtained from subcode data to multiplexed data with an error corrected, and transfers the multiplexed data to a ring buffer 4 in the format shown in FIG. 5A. FIG. 12 shows the configuration of an error correction device 3. A RAM 30 stores data supplied by the drive unit 2. A switch 31 switches to an error correction circuit 32 or a data addition circuit 34, the destination of data read from the RAM. The error correction circuit 32 uses error correction data (C1) and error correction data (C2) to correct errors. The data addition circuit adds sector number data and an error flag supplied by a controller 33 to multiplexed data read from the RAM 30. The controller 33 controls the addresses of the RAM and the switch 31, and analyzes subcode data. In the TOC readout state described below, the switch 31 can be continuously set to the error correction circuit 32 to carry out error correction for the same data a plurality of times.

For data comprising eight bits of multiplexed data to which one bit is added as required, an error flag of "0" is added to the multiplexed data if the data involves no error or the error in the data is corrected completely, whereas an error flag of "1" is added to the data if the error is uncorrectable. The error correction device 3 sends subcode data to a subcode decoder 21 only if the data involves no error or if the error is corrected completely.

The subcode decoder 21 decodes subcode data delivered from the error correction device 3 to pass the decoded data to a control circuit 16.

The ring buffer 4 has a FIFO memory inside, and temporarily buffers multiplexed data, sector number data, and an error flag sent from the error correction device 3 in the format shown in FIG. 5A to transfer multiplexed data and the associated sector number data and error flag in the format shown in FIG. 5A in response to a read-out pointer indicated by a ring buffer control circuit 26.

All data sent from the error correction device 3 may be buffered unconditionally; only a limited number of data may be selected and buffered starting with the sector number of a read start point specified by the controller 16; only a limited amount of data may be buffered ending with an end point specified by the controller; or only a limited amount of data may be buffered within the specific range between the sector number of a start point specified by the controller 16 and the sector number of an end point also specified by the controller 16. This can be switched via a ring buffer control circuit 26.

Figure 35:
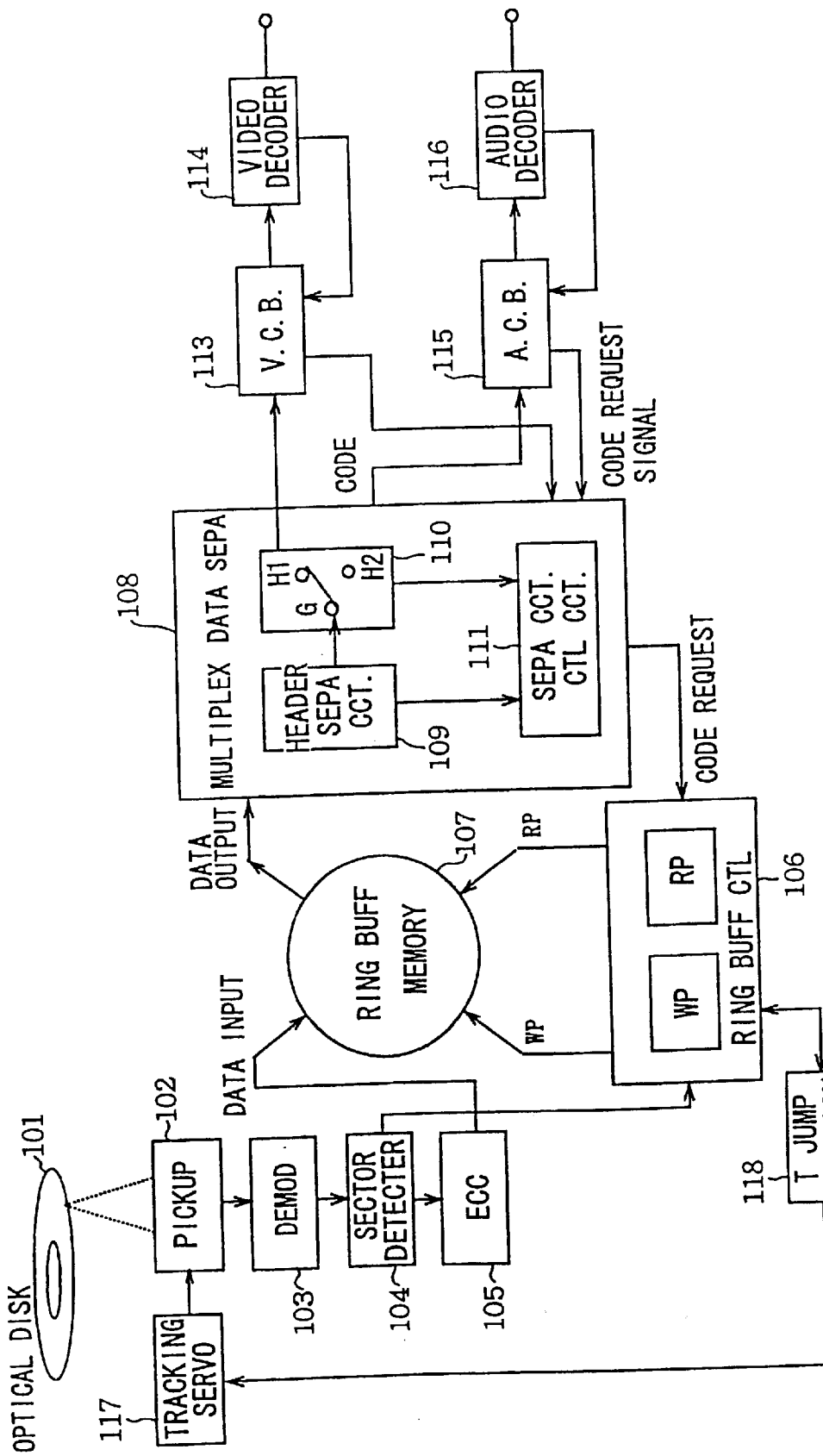
FIG. 35 is a block diagram illustrating the configuration of a conventional data reproduction apparatus.
Figure 36:
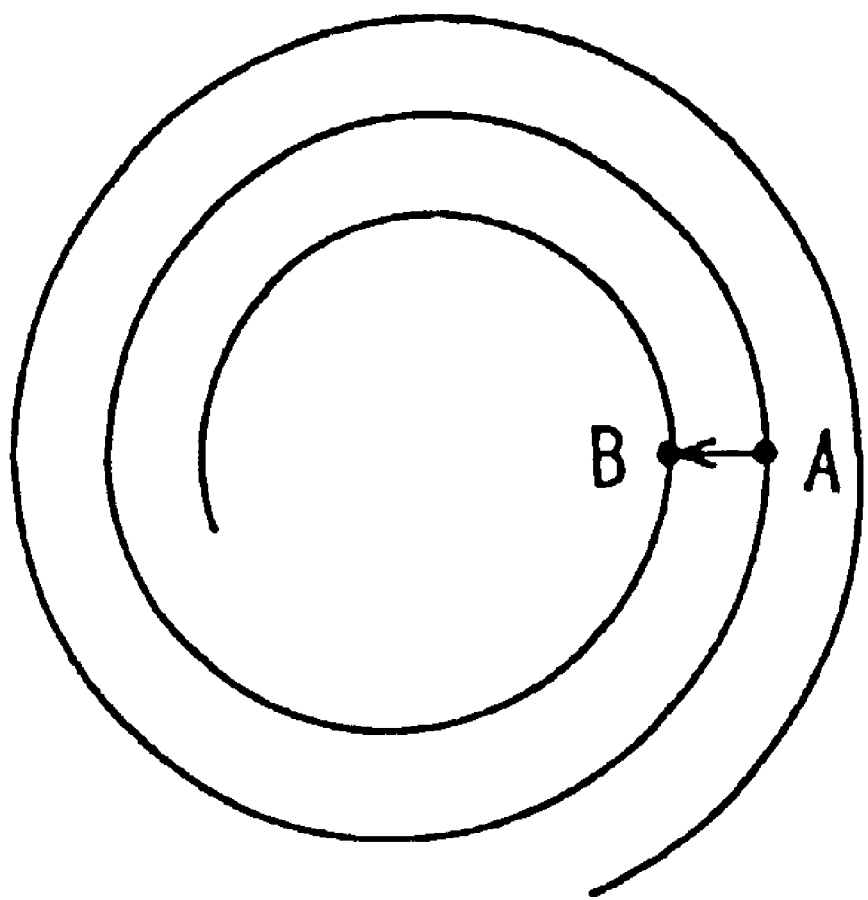
FIG. 36 is a schematic diagram describing a track jump in the data reproduction apparatus in FIG. 35.

If the start and/or end point has been specified by the controller 16, the ring buffer control circuit 26 informs the controller 16 when the data at a buffer start or end point is detected. It also receives a TOC data load instruction to load TOC data sent from the error correction device 3 into a specific region for TOC data in a buffer memory, and detects the end of loading to communicate it to the controller 16. The ring buffer control circuit 26 transfers TOC data loaded and stored in the ring buffer 4 in response to a request from the controller 16. In addition, as with the ring buffer control circuit 106 and the track jump determination circuit 118 shown in FIG. 35, the ring buffer control circuit 26 monitors the amount of data stored in the ring buffer 4, and orders the drive section of the drive unit 2 to perform track jump as required.

The demultiplexer 5 divides multiplexed data sent from the ring buffer 4 and shown in FIG. 5A into a video bit stream, an audio bit stream, and a superimposed dialogue bit stream, and transfers video heads and data, audio heads and data, and superimposed dialogue heads and data to the video code buffer 6, the audio code buffer 9, and the superimposed dialogue code buffer 12, as shown in FIGS. 5B, 5C, and 5D respectively.

The demultiplexer 5 sends an error flag corresponding to each of the video, the audio, or the superimposed dialogue data to the video code buffer 6, the audio code buffer 9, or the superimposed dialogue code buffer 12, respectively. However, it stops code requests to the ring buffer 26 and aborts data delivery to the video code buffer 6, the audio code buffer 9, and the superimposed dialogue code buffer 12 if it receives a signal meaning that the video code buffer 6, the audio code buffer 9, or the superimposed dialogue buffer 12 has overflowed.

The demultiplexer 5 also detects sector number data, system clock references (SCR) stored in a system head, a video decoding time stamp (DTSV) stored in a video data head to show video data decoding start time, an audio decoding time stamp (DTSA) stored in an audio data head to show audio data decoding start time, and a superimposed dialogue decoding time stamp (DTSS) stored in a superimposed dialogue data head to show superimposed dialogue data decoding start time to send a signal to the controller 16 meaning that it has detected sector number data, an SCR, a DTSV, a DTSA, and a DTSS. It also retains detected sector number data, SCR, DTSV, DTSA, and DTSS, and communicates their contents to the controller 16 when ordered by the controller 16.

If the demultiplexer 5 checks the continuity of sector numbers to find that data with discontinuous sector numbers has been delivered by the ring buffer 4, it inserts between the discontinuous sector dummy data containing an error flag of one or more byte, and passes the data to all of the video code buffer 6, the audio code buffer 9, and the superimposed dialogue code buffer 12 to inform them of the loss of data in that position or the presence of a discontinuous sector boundary created by search operation.

The video code buffer 6 has a FIFO memory inside, and buffers video data heads and video data sent by the demultiplexer 5 to transfer them to a DTSV detector 7 when requested by the video decoder 8. It also issues a signal informing the demultiplexer 5 and the controller 16 of the overflow or the underflow of the video code buffer 6 if the buffer memory overflows or underflows.

The DTSV detector 7 enables only the video data of the video data head and video data sent from the video code buffer 6 to pass in order to transfer them to the video decoder 8. It also detects a DTSV in a video data head to issue a signal to the controller 16 meaning that the DTSV has been detected, and retains the detected DTSV in its internal register to inform the controller 16 of the retention when ordered by the controller 16.

The video decoder 8 includes an MPEG decoder in conformity with ISO1172 (MPEG1) or ISO13818 (MPEG2), and decodes video data transferred from the DTSV detector 7 to send the results to a postprocessor 15. During decoding, it halts decoding, resumes decoding, searches for an I-picture head, and communicates the detection of an I-picture head to the controller 16. The MPEG decoder can detect a picture head, determine the type of picture head, that is, whether the picture head is an I-, a P-, or a B-picture head, and communicate the detection of the picture head and its type to the controller 16. The video decoder 8 temporarily replaces video data resulting from decoding with a black or blue screen to suppress output. It also sends a signal informing the controller 16 that an error is occurring if it finds that received compressed data contain syntactically inconsistent description or if it attempts to decode data with an error flag.

The audio code buffer 9 has a FIFO memory inside, and buffers audio data heads and audio data sent by the demultiplexer 5 to transfer them to a DTSA detector 10 when requested by the audio decoder 11. It also issues a signal informing the demultiplexer 5 and the controller 16 of the overflow or the underflow of the audio code buffer if the buffer memory overflows or underflows.

Like the DTSV detector 7, the DTSA detector 10 enables only the audio data of the audio data head and audio data sent from the audio code buffer 9 to pass in order to transfer them to the audio decoder 11. It also detects a DTSA in an audio data head to issue a signal to the controller 16 and the audio decoder 11, meaning that the DTSA has been detected. It also retains the detected DTSA in its internal register to inform the controller 16 of retention when ordered by the controller 16.

The audio decoder 11 decodes compressed or noncompressed audio data transferred from the DTSA detector 10 to output the results to the audio output terminal. During decoding, it halts decoding, resumes decoding, repeats decoding of audio data for a specified duration, skips audio data for a specified duration. For example, the specified duration refers to four levels of duration: 1 s, 100 ms, 10 ms, and 1 ms, and the minimum decoding unit for compressed data. The audio decoder 11 halts decoding when receiving a signal from the DTSA detector 10 meaning that a DTSA has been detected. It also has a half mute function for temporarily reducing the sound volume of decoded audio outputs by a specified level and a mute function for eliminating the sound volume.

The superimposed dialogue code buffer 12 has a FIFO memory inside, and buffers superimposed dialogue data heads and superimposed dialogue data sent from the demultiplexer 5 to transfer them to a DTSS detector 13. It also issues a signal informing the demultiplexer 5 and the controller 16 of the overflow or the underflow of the superimposed dialogue code buffer if the buffer memory overflows or underflows.

The DTSS detector 13 enables the passage of only the superimposed dialogue data of the superimposed dialogue data head and superimposed dialogue data sent from the superimposed dialogue code buffer 12 to transfer them to the superimposed dialogue decoder 14. It also detects a DTSS in superimposed dialogue data head and duration_time in superimposed dialogue data to issue a signal to the controller 16 meaning that they have been detected, and retains the detected DTSS and duration_time in its internal register to inform the controller 16 of the retention when ordered by the controller 16.

When a DTSS is detected during DTSS search operation, the DTSS detector issues a signal to the superimposed dialogue decoder 14 as well as the controller 16 meaning that the DTSS has been detected. The superimposed dialogue decoder 14 decodes superimposed dialogue data sent by the DTSS detector 13 to send the results to the postprocessor 15.

During decoding, the superimposed dialogue decoder 14 halts decoding, resumes decoding, and halts the output of the results of decoding. During DTSS search, it skips superimposed dialogue data instead of decoding it until it receives a DTSS detection signal from the DTSS detector 13.

The postprocessor 15 generates a video signal for displaying information showing the current state of the data reproduction apparatus in response to an instruction from the controller 16, and synthesizes a video signal sent from the video decoder 8, a video signal sent from the superimposed dialogue decoder 14, and a video signal issued to show the current state of the reproduction apparatus to output the synthesized video signal to the video output terminal.

The controller 16 can receive information from each section and issue signals, and also can control the operation of the entire data reproduction apparatus shown in FIG. 1. An external interface 17 receives commands from computer equipment or editors to transmit them to the controller 16. A user input device 18 receives key inputs by users via pushbuttons or a remote commander to transmit them to the controller 16.

An information display device 19 displays information showing the current state of the reproduction apparatus in response to an instruction from the controller 16 using, for example, lamps or a liquid crystal display. A vertical synchronizing signal generation circuit 22 generates vertical synchronizing signals to supply them to the video decoder 8, the superimposed dialogue data decoder 14, the postprocessor 15, and the controller 16.

An STC register 23 is incremented in response to a signal from an STC countup circuit 24, and implements a reference clock for synchronously reproducing video, audio, and superimposed dialogue data. The controller 16 can set arbitrary values for the STC register 23. The STC register 23 in this embodiment is independent of the controller 16, while in another embodiment, it may be retained in the controller 16 as software.

The STC countup circuit 24 generates signals such as pulse signals of a specified frequency to output them to the STC register 23. It also halts the output to the STC register 23 in response to an instruction from the controller 16. The STC countup circuit 24 and the STC register act as an internal clock STC. Like the STC register 23, the STC countup register 24 in this embodiment is independent of the controller 16, while in another embodiment, it may be implemented as a count signal generator as software.

(2) Configuration of DSM

In the DSM 1, all data is stored in sectors, and the start position to read data from the DSM 1 is specified by the controller 16 using a sector number. Once a start position is specified, subsequent sectors are continuously read unless the controller 16 specifies a new position. For example, when sector 100 is specified as a start point, sectors are read out in the order of 100, 101, 102, 103, ... until a new readout position is specified.

FIG. 2 shows that each sector consists of 6,208 bytes and comprises four types of data: subcode data, multiplexed data, error correction data (C1) and error correction data (C2). The amount of these data in each sector is 64, 4096, 1024, and 1024 bytes, respectively. Among the four types of data, multiplexed data is reproduced, and the remaining three types of data, that is, subcode data, error correction data (C1), and error correction data (C2) are supplementary data for increasing the speed of multiplexing and the accuracy of reproduction.

Figure 10:
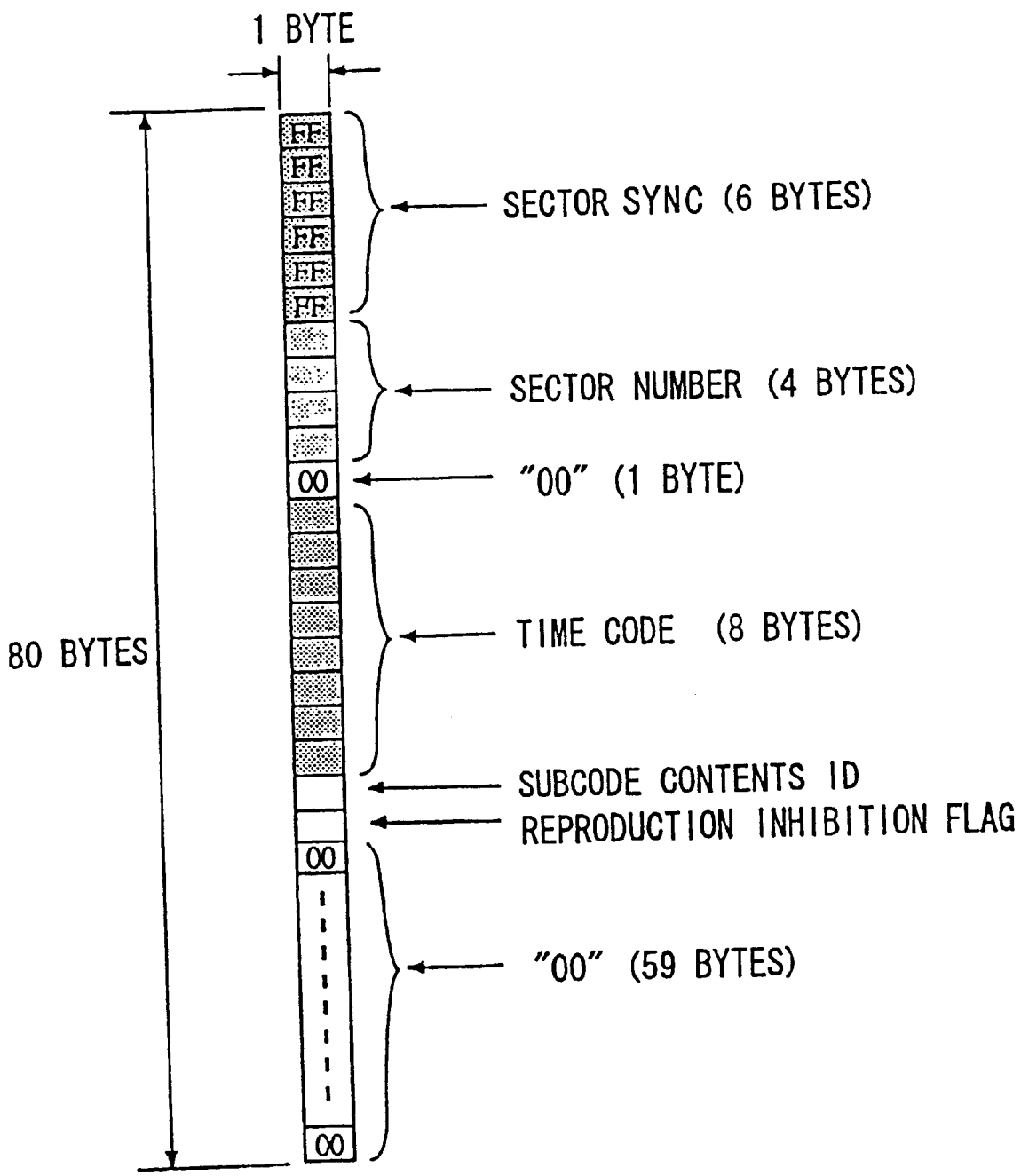
FIG. 10 is a schematic diagram describing the format of subcode data.

As shown in FIG. 10, subcode data comprise sector number information, time code information, a subcode contents ID, and a reproduction inhibition flag. The sector number information contains the sector number of a sector, the time code information contains information representing the time that the sector will be reproduced, data contents contains information showing the contents of subcode data (for example, "01" if the data contains a reproduction inhibition flag), and the reproduction inhibition flag contains a flag (for example, "FF") showing whether or not the sector is a lead-in area, a lead-out area, or an area where data such as TOC data that is not reproduced is stored. The remaining 59 bytes are reserved, and other information can be written to these bytes as subcode data. The multiplexed data includes multiplexed data comprising video, audio, and superimposed dialogue data to be reproduced and other data such as computer programs.

C1 and C2 error correction data is correction information for detecting and correcting errors in subcode data and multiplexed data as well as the error correction data itself. Since C1 error correction data and C2 error correction data have different interleaving directions, repetition of corrections with both C1 and C2 improves the error correction ability.

Figure 3:
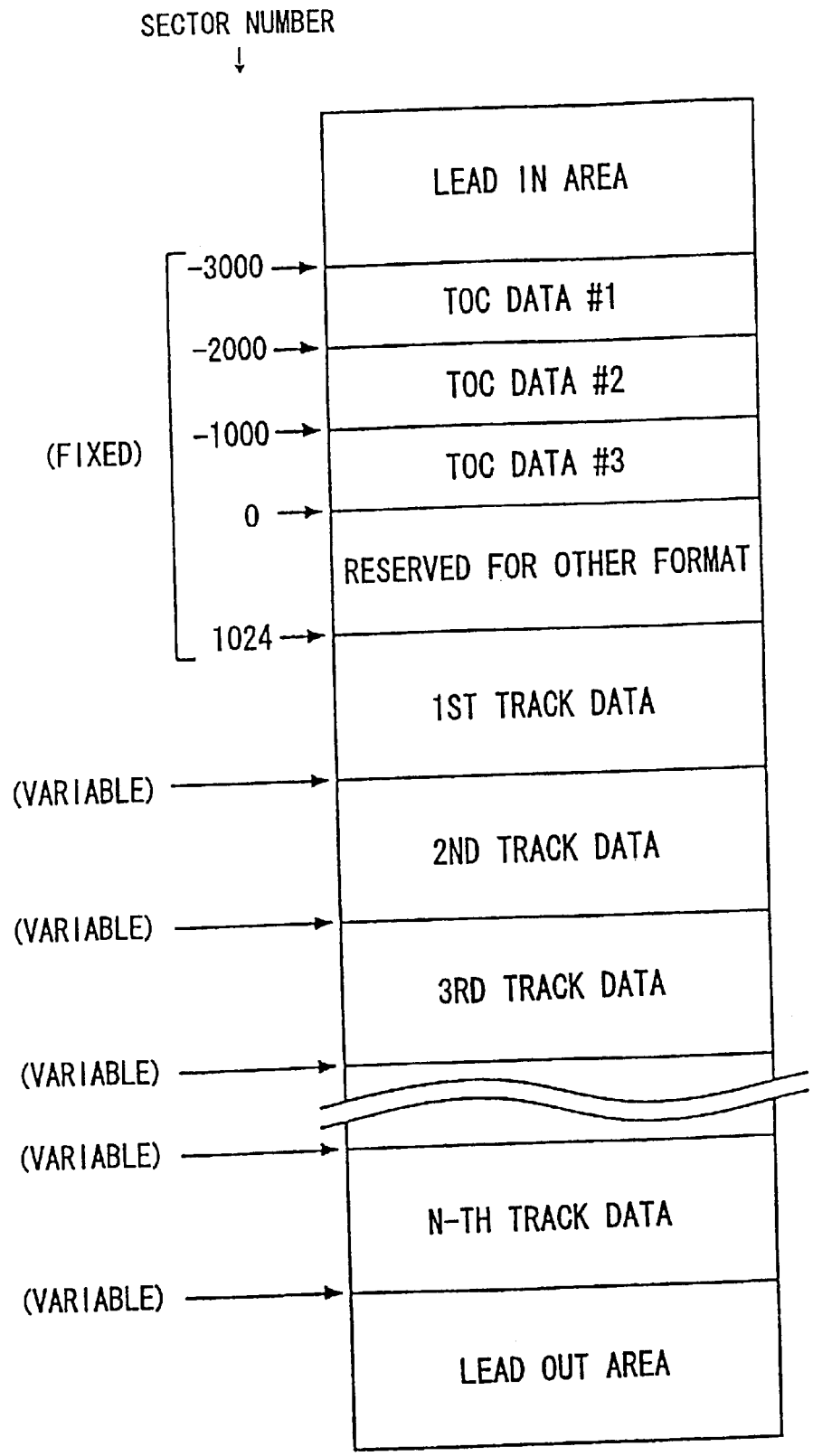
FIG. 3 is a schematic diagram describing the configuration of a DSM from which the data reproduction apparatus reproduces data.

FIG. 3 shows the type of data stored in the multiplexed data section of each sector wherein the data are classified using sector numbers. The data stored in the multiplexed data essentially has video, audio, and superimposed dialogue data multiplexed therein, but exceptionally contain special data such as TOC data stored in sectors −3,000 to 1,023. Video, audio, and superimposed dialogue data to be reproduced is stored in sector 1,024 and subsequent sectors.

An area called a TOC area is provided in sectors −3,000 to −1 of the DSM 1. The TOC area contains TOC data, that is, information for the contents of the stored in the DSM 1. As shown in FIG. 3, the same TOC data are stored in three regions, that is, sectors −3,000 to −2,001, sectors −2,000 to −1,001, and sectors −1,000 to −1 to improve reliability for errors. However, the size of the TOC data must not exceed 1,000 sectors. Users can specify sector numbers via the user input device 18 or the ten keys in the external interface 17 to obtain desired images and voices. However, since the TOC data are for control and should not be accessed during normal reproduction, the TOC area is set with negative sector numbers that cannot be specified by ordinary ten-keypad keys.

Figure 5:
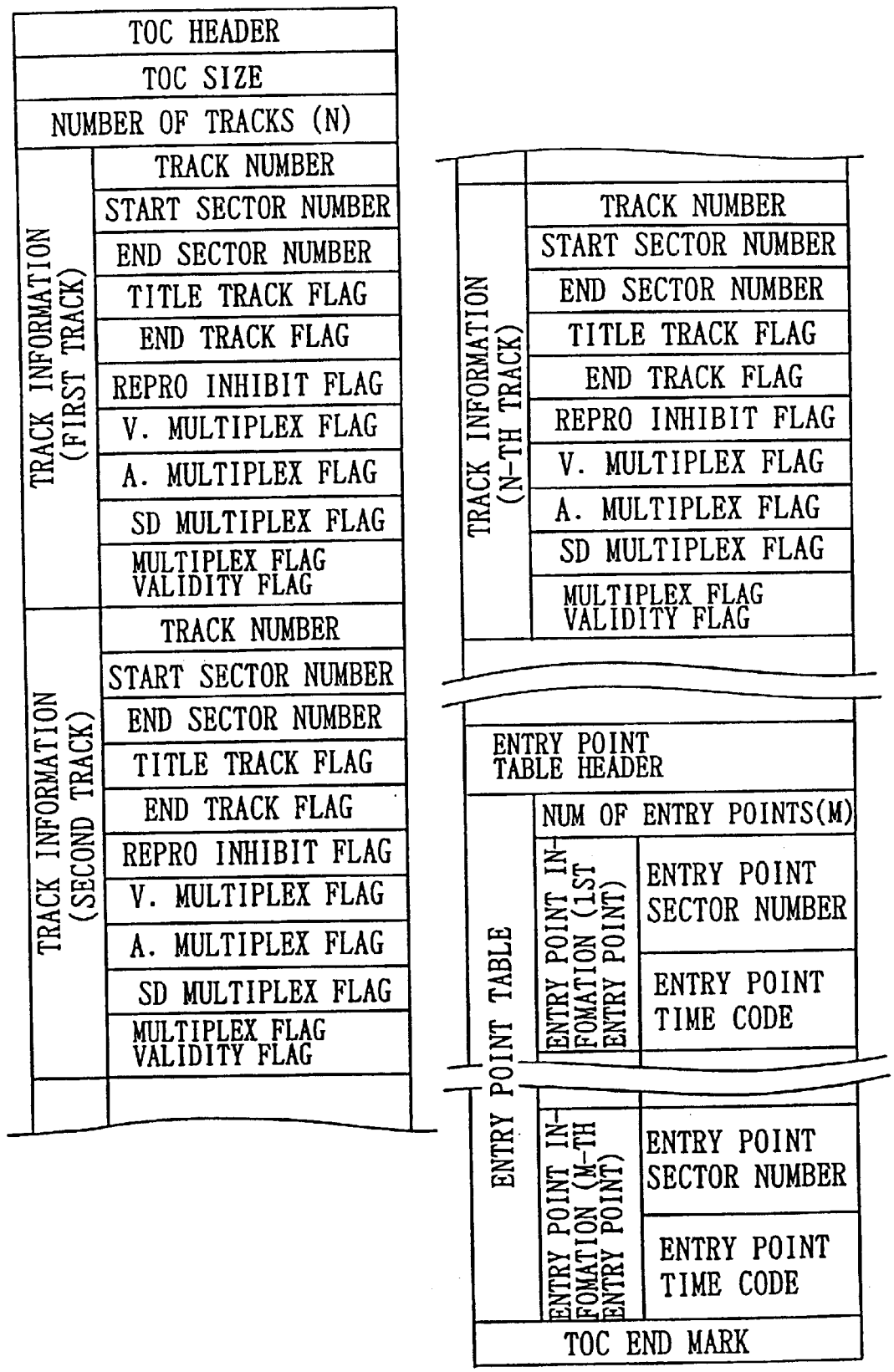
FIG. 5 is a schematic diagram describing the structure of TOC data in the DSM.

The sectors in the DSM 1 containing data with video, audio, and superimposed dialogue data multiplexed therein is grouped into one or more tracks according to the contents. This group comprising a plurality of continuous sectors is called a track. FIG. 5 shows the configuration of TOC data. TOC data comprises a TOC header, a TOC size, number of tracks-information for each track, an entry point table header, an entry point table, and a TOC end mark.

The TOC header contains a special data pattern showing that TOC starts in this position. The TOC size contains the length of TOC data in bytes. The information for each track comprises the track number of each track, a start sector number, an end sector number, a title track flag, an end track flag, a reproduction inhibition track flag, a video encoder flag, audio encoder flag, a superimposed dialogue encoder flag, and an encode flag valid information flag.

The track number contains the serial number of a track. The normal range of the track number values must be 1 to 254. The start sector numnumber at the start point and the end sector number at the end point show the range of the track on the DSM 1. The title and the end track flags show that the track is a title or an end track, respectively.

The reproduction inhibition flag is set to inhibit the reproduction of the track, and not set when the reproduction of the track is not inhibited. The video, audio, and superimposed dialogue multiplexing flag show whether or not video, audio, and superimposed dialogue data is multiplexed in the multiplexed data in the track, respectively. Each multiplexing flag may show the degree of multiplexing for each data type within the track.

The multiplexing flag valid information flag shows whether or not the contents of the preceding video, audio, and superimposed dialogue multiplexing flags are valid. For example, each of the preceding three flags cannot be fixed to a single value if the state of multiplexing for video, audio, or superimposed dialogue data varies within a single track. In this case, an arbitrary value is written to the three flags, and a value showing invalidity is stored in the multiplexing flag valid information flag.

Figure 4:
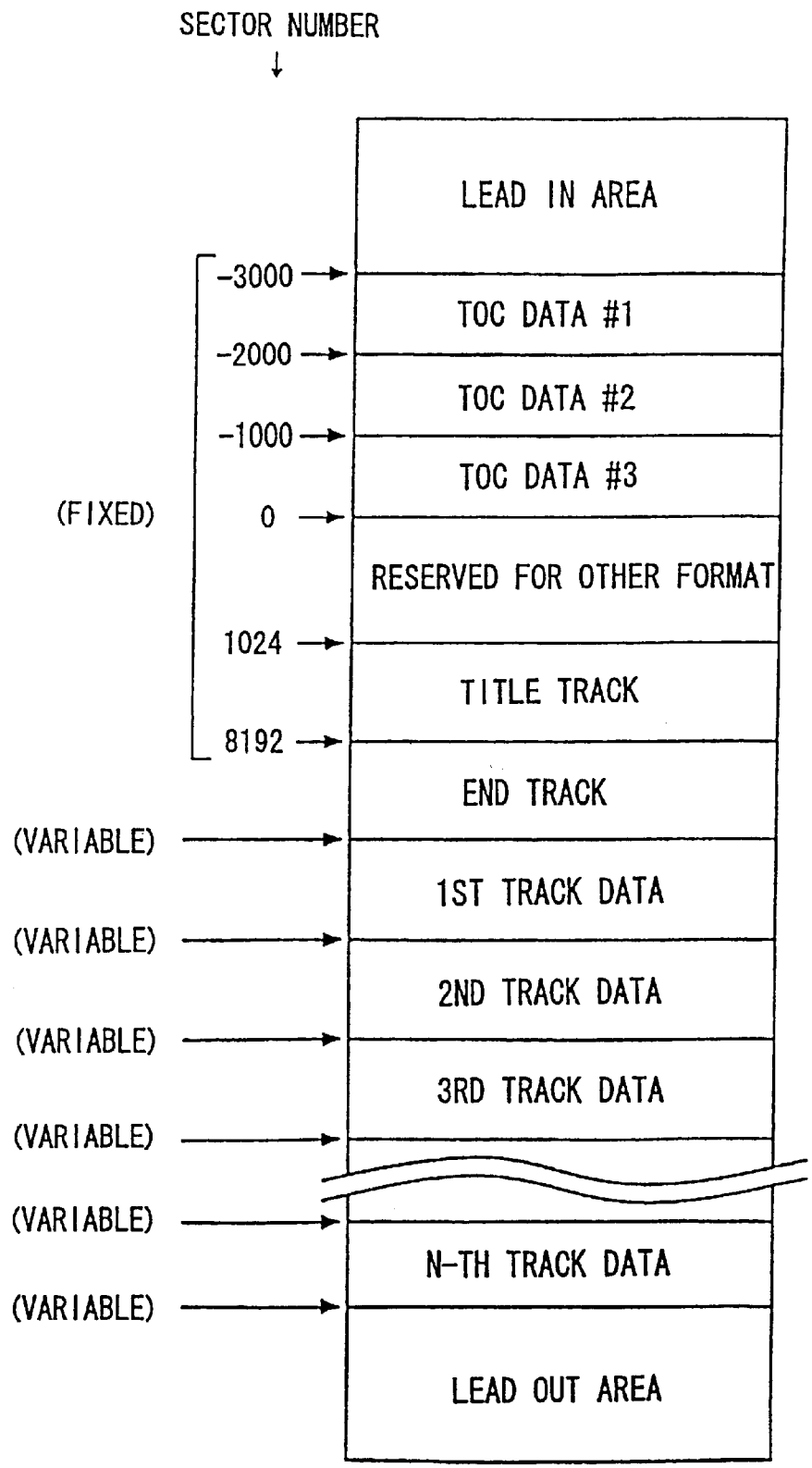
FIG. 4 is a schematic diagram describing the configuration of a DSM differing from the DSM in FIG. 3 from which the data reproduction apparatus reproduces data.

In the above example of information in a track, an attribute indicating that the track is a title or an end track can be added to any of the tracks 1 to 254. However, the processing of the reproduction apparatus can be simplified by reducing the size of TOC data and ensuring that the DSM 1 contains only a single title track and a single end track by replacing the structure of the DSM in FIG. 3 with the structure shown in FIG. 4 and the structure of the TOC in FIG. 5 with the structure in FIG. 6 and providing special tracks with track numbers of 0 and 255 for a title and an end tracks and fixing their positions in the DSM 1.

The entry point table header contains a special data pattern indicating that the entry point table starts in this position. The entry point table comprises the number of entry points and information for the entry points. The number of entry points comprises the number of entry points in the DSM 1, the positions of the entry points represented by sector numbers, and time code information stored in the subcode data in the sector.

The entry point table is used during random access and search. The entry point table must be referenced when the video data are compressed at a variable rate in conformity with ISO11172 (MPEG1) or ISO13818 (MPEG2), because the increase in sector numbers is not proportional to the increase in time codes. The TOC end mark contains a special data pattern indicating that TOC ends in this position.

(3) Operation of Data Reproduction Apparatus (3-1) Power On

Figure 11:
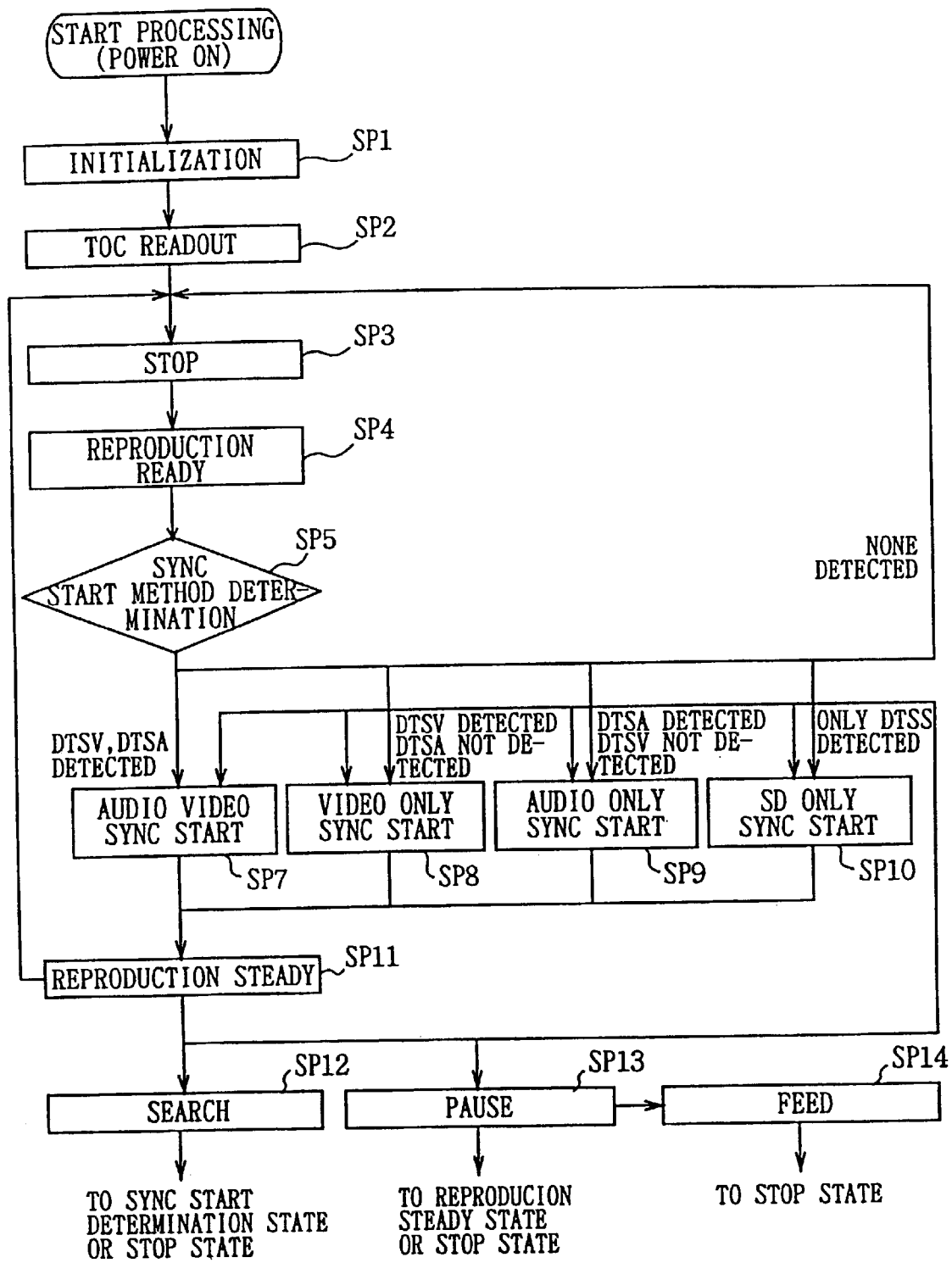
FIG. 11 is a flowchart describing the transition of the state of a controller to explain the operation of the data reproduction apparatus.
Figure 13:
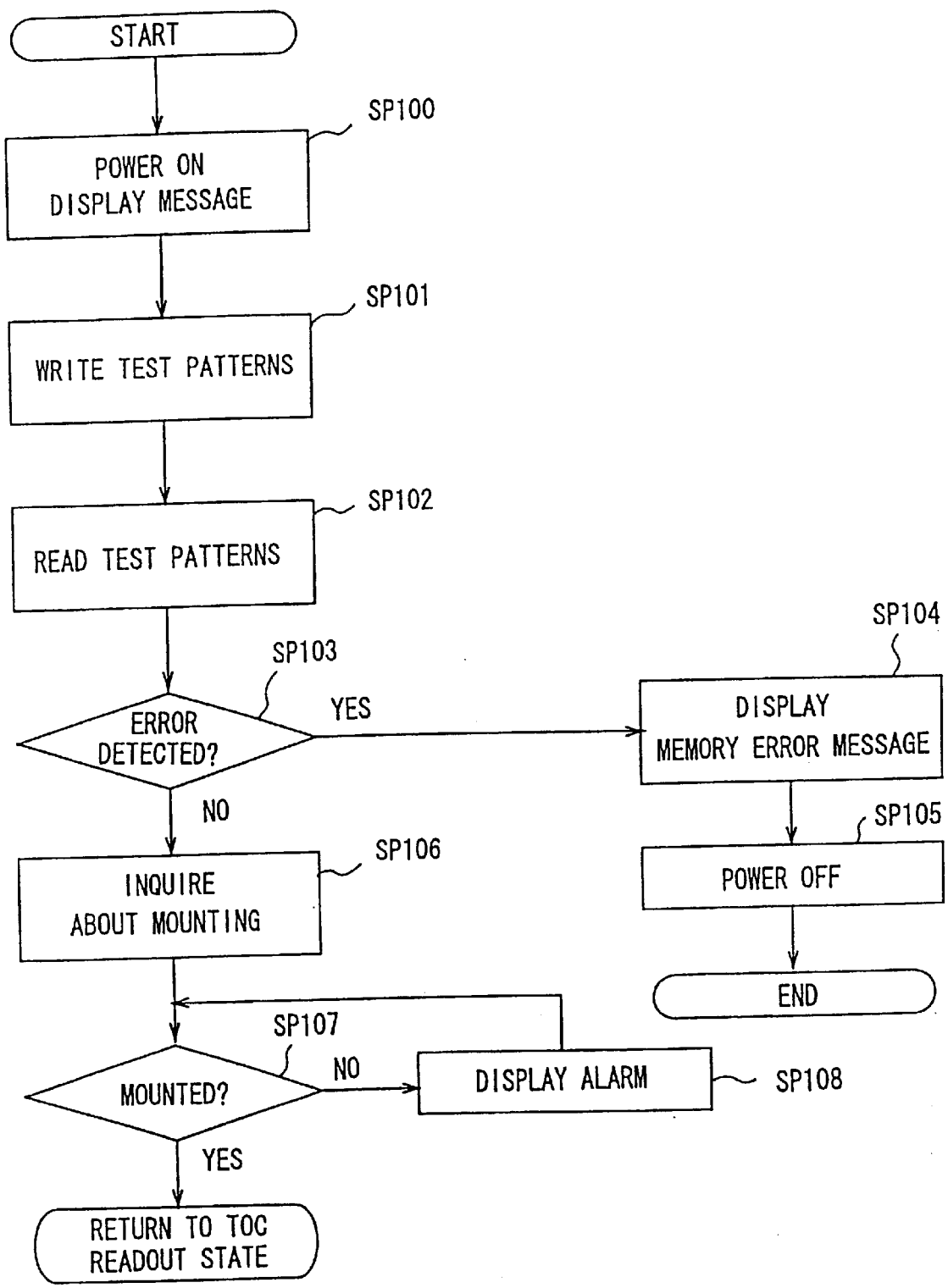
FIG. 13 is a flowchart illustrating processing by a controller 16 in its initialization state.

FIG. 11 is a transition diagram of the operational state of the controller 16. The controller 16 enters the initialization state when the power source of the data reproduction apparatus shown in FIG. 1 is turned on. FIG. 13 shows the flow of processing by the controller in its initialization state. In this state, the controller 16 instructs the information display device 19 to light a lamp indicating that the power source is turned on, and also instructs the postprocessor 15 to cause a display device such as CRT (not shown) to display a message showing that the power source is turned on (step SP100). The controller subsequently reads the test patterns stored in the ROM 25 to write them into the corresponding memories installed in the error correction device 3, the ring buffer 4, the video code buffer 6, the audio code buffer 9, the superimposed dialogue code buffer 12, and the storage device 20, and then reads them from the memories (step SP102) to check whether or not these memories are operating accurately (memory check; step SP103).

If an error is discovered during memory check, the controller instructs the information display device 19 to light a lamp indicating that an error is occurring, and also instructs the postprocessor 15 to cause a display device such as CRT (not shown) to display a message showing that an error is occurring in a memory (step SP104). In this state, the controller 16 subsequently ignores all input from the external interface 17 and the user input device 18 except a disk unload instruction. In addition, it reads no data or signal from the DSM 1. The controller 16 also turns off the power source for a specified period of time if an error is occurring in a memory (step SP105).

If no error is occurring in the memories, the controller 16 sends a signal to the drive unit 2 inquiring whether or not the DSM 1 is loaded (step SP106). When receiving this signal, the drive unit 2 issues a signal to the controller 16 indicating whether or not DSM 1 is currently loaded. Whether or not the DSM 1 is loaded is determined by using for detection a microswitch installed in the mechanism section of the drive unit 2 or checking whether or not a focus can be applied in a predetermined part of the DSM 1. If the controller 16 receives a signal indicating that the DSM 1 is currently loaded, it enters the TOC readout state at step SP2 shown in FIG. 11 (step SP107). Conversely, if the controller 16 receives a signal indicating that the DSM 1 is not currently loaded, it instructs the information display device 19 to light a lamp indicating that the DSM 1 is not loaded, and also instructs the postprocessor 15 to display a message showing that the DSM 1 is not loaded (step SP108). The controller 16 subsequently waits until it receives a signal from the drive unit 2 indicating that the DSM 1 is loaded.

The drive unit 2 detects the user's setting the DSM 1 into the drive unit 2 to perform mechanical loading such as the alignment of the DSM 1 in order to enable the pickup of the drive unit to read signals. Once loading is completed, the drive unit 2 sends a signal to the controller 16 indicating that the DSM 1 is loaded. The controller 16 enters the TOC readout state at step SP2 in FIG. 11 when receiving a signal indicating that loading is completed while waiting for a signal from the drive unit 2 indicating that the DSM 1 is loaded.

(3-2) TOC Readout

Figure 14:
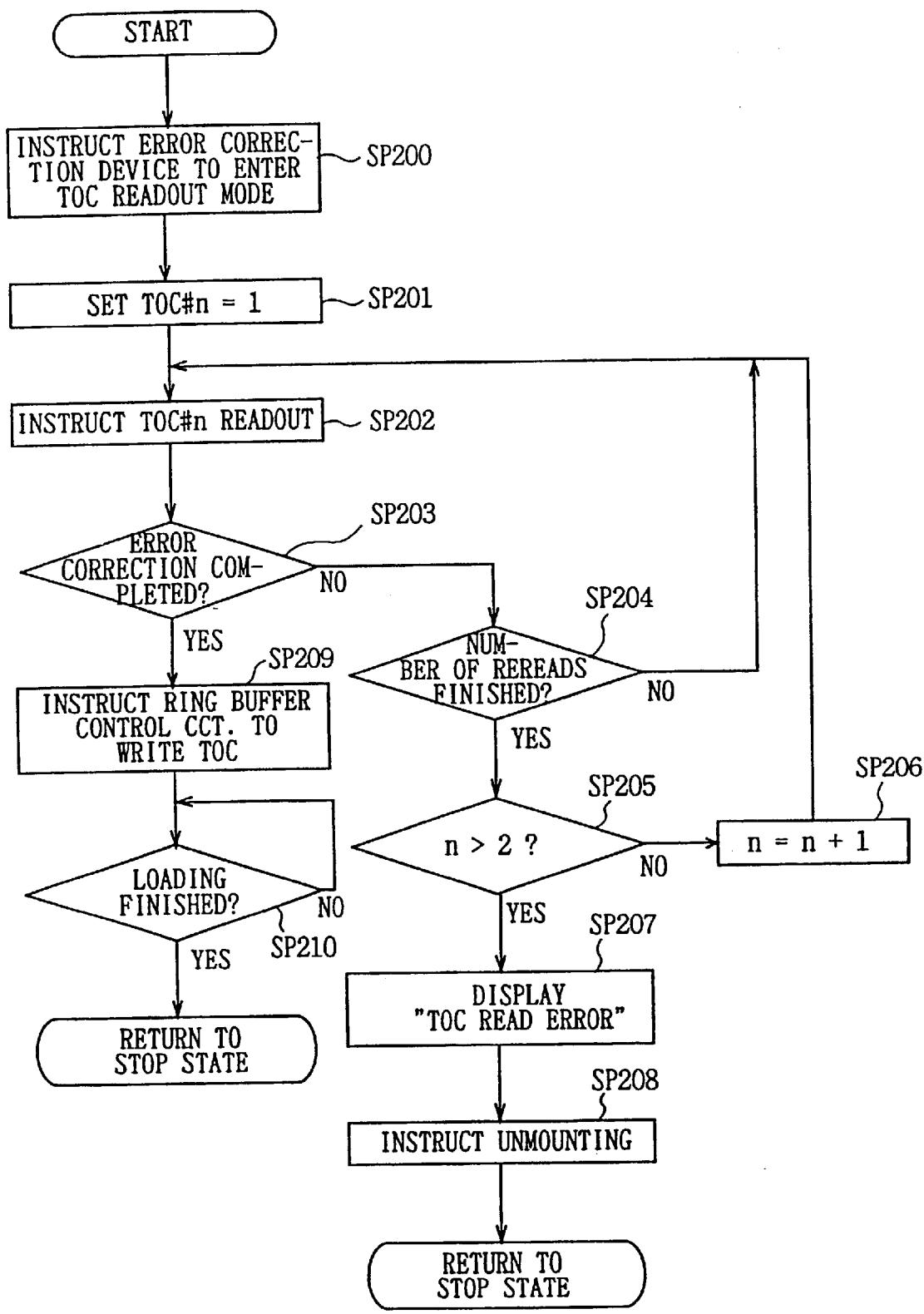
FIG. 14 is a flowchart illustrating processing by the controller 16 in its TOC readout state.

FIG. 14 shows the flow of processing by the controller 16 in its TOC readout state. When entering the TOC readout state, the controller 16 instructs the error correction device 3 to enter TOC readout mode (step SP200). The controller 16 also instructs the drive unit 2 to seek a section where the first TOC data is written, that is, sector −3,000 (steps SP202, SP203).

The drive unit 2 reads out data from the DSM 1 to transfer it to the error correction device 3. The error correction device 3 detects and corrects any error in the data sent from the drive unit 2, and passes the multiplexed data to the ring buffer 4 and the subcode data to the subcode decoder 21. However, the number of possible repetitions of C1 and C2 corrections must be set larger than in normal reproduction because the controller 16 has instructed the drive unit to enter the TOC readout mode.

That is, both C1 and C2 error corrections executed by the error correction device 3 are carried out only once during normal data reproduction to reduce the time from the loading of data from the DSM 1 until video output from the postprocessor 15 or the audio decoder 11 and outputs from the audio output terminal.

However, the error correction capability can be improved by repeating C1 and C2 error corrections a large number of times if the time from data loading until reproduction need not be reduced. Consequently, for the readout of TOC data which need not be fast but requires the high reliability of data, the error correction device 3 repeats error correction processing if the controller 16 has failed to correct an error despite its first attempt using a single C1 correction and a single C2 correction. The error correction device 3 may unconditionally repeat both C1 and C2 corrections several times, for example, four times.

Although the number of error corrections is increased for TOC data to enhance the error correction capability, a burst error on the DSM 1, that is, the loss of data over an extensive range cannot be completely corrected even by repeated error corrections. Thus, if an error cannot be corrected after a specified number of error corrections, the controller 16 instructs the drive unit 2 to seek the position where the error is occurring, and reads data again from the DSM 1 to attempt to detect and correct the error in the loaded data. This rereadout processing is not performed during normal reproduction because it takes a large amount of time. In this TOC readout state, however, the controller 16 performs this operation.

If an error cannot be corrected after a predetermined number of data rereadouts from the DSM 1, the controller 16 instructs the drive unit to seek the second of the TOC information stored in three different positions in the DSM 1 to load them, and then attempts to load the information into the ring buffer 4 as in the loading of the first TOC data. The controller 16 executes the same operation for the third TOC information if it has failed to read the second TOC information. Such readouts from different positions are possible because the same TOC data is stored in three positions, and impossible during normal reproduction. In this TOC readout state, however, the controller 16 carries out this operation (steps SP202, SP203, SP204, SP205, SP206).

If the controller 16 fails to read all TOC data stored in the three positions, it instructs the information display device 19 to light a lamp indicating that TOC readout has failed, and also instructs the postprocessor 15 to display a message on the screen showing a TOC readout error (step SP207). The controller 16 also instructs the drive unit 2 to unload the disk (step SP208), and enters the initialization state. The drive unit 2 unload the disk when receiving an unload instruction from the controller 16.

The controller 16 instructs the ring buffer control circuit 26 to start TOC loading when TOC error correction is completed (step SP209). The ring buffer control circuit controls a write pointer to load the TOC data into a specific region for TOC data loading in the memory installed in the ring buffer 4. The ring buffer 4 writes into the region for TOC data in its memory, reproduction data transferred from the error correction device 3. In this case, all TOC data shown in FIG. 5 is loaded into the memory if the ring buffer 4 has a memory sufficient to store this amount, while, otherwise, the TOC data excluding the entry point table header and the entry point table are loaded.

The ring buffer 4 can detect the loading of a TOC end mark to detect the end of loading of TOC data; when detecting the end of loading, the ring buffer 4 informs the controller 16 of this condition. The controller 16 receives a signal from the ring buffer 4 indicating the end of loading, and then enters the stop state (step SP210).

(3-3) Stop State (title track/end track reproduction)

Figure 15:
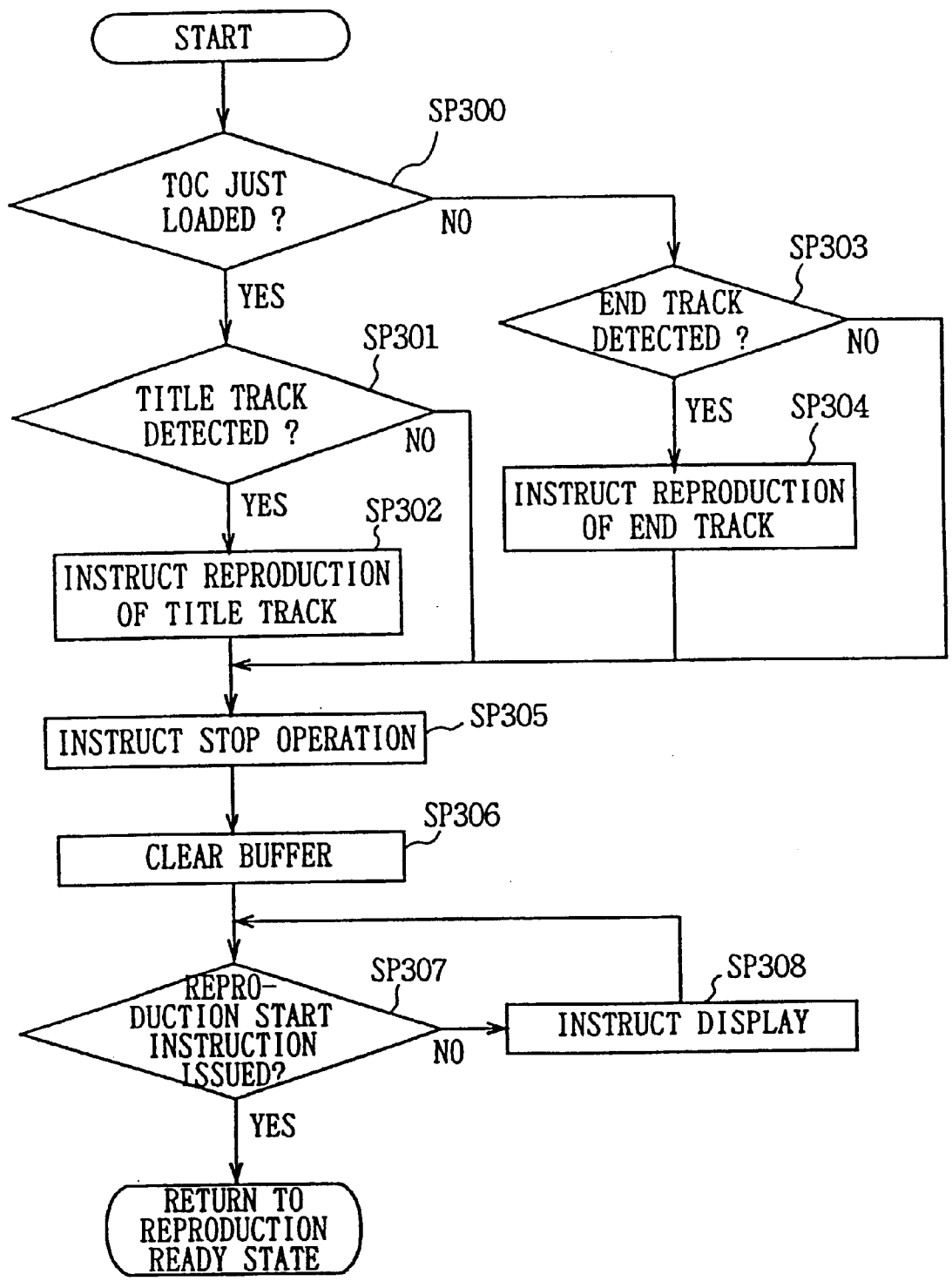
FIG. 15 is a flowchart illustrating processing by the controller 16 in its stop state.

FIG. 15 shows the flow of processing by the controller 16 in its stop state. When entering the stop state, the controller 16 determines whether or not the TOC has just been loaded (step SP300). The controller 16 reproduces the title track if TOC has just been loaded. Otherwise, for example, if the reproduction of all or part of the data from the DSM 1 has just been finished, the controller instructs reproduction of the end track.

For the reproduction of a title track, the controller 16 references TOC data (step SP301), and if there is a track with a flag indicating that it is a title track, reproduces that track regardless of a reproduction instruction from the user (step SP302). For the reproduction of an end track, as in the reproduction of a title track, the controller 16 references TOC data (step SP303), and if there is a track with a flag indicating that it is an end track, reproduces that track regardless of a reproduction instruction from the user (step SP304).

In the stop state, the controller 16 sends a stop instruction, an error correction halt instruction, a buffering halt instruction, and a demultiplexer stop instruction to the drive unit 2, the error correction device 3, the ring buffer 4, and the demultiplexer 5, respectively, if it cannot find a title or an end track to be reproduced or if the reproduction of a title or an end track is finished (step SP305). It also clears the video code buffer 6, the audio code buffer 9, and the superimposed dialogue code buffer 12 (step SP306).

In the stop state, the controller 16 waits for an instruction to start reproduction sent by the user via the user input device 18 or the external interface 17 (step SP307). It also instructs the information display device 19 and the postprocessor 15 to light a lamp indicating the stop state and to display the associated message on the screen (step SP308).

The user input device 18 sends a reproduction start signal to the controller 16 when the user carries out key inputs required to start reproduction. In this case, if the tracks to be reproduced have been specified by the user, the information for the track numbers is also transferred to the controller 16. The external interface 17 issues a reproduction start signal to the controller 16 when receiving the corresponding instruction from external equipment (not shown). In this case, or if the external equipment has specified the numbers of tracks to be reproduced, the track numbers are transferred to the controller 16.

The controller 16 enters the reproduction ready state at step SP4 in FIG. 11 when receiving a reproduction start signal from the user input device 18 or the external interface circuit 17. The controller 16 starts reproduction with the track represented by track number "1" if the user input device 18 or the external interface circuit 17 has not specified the numbers of tracks to be reproduced.

(3-4) Reproduction Ready

Figure 16:
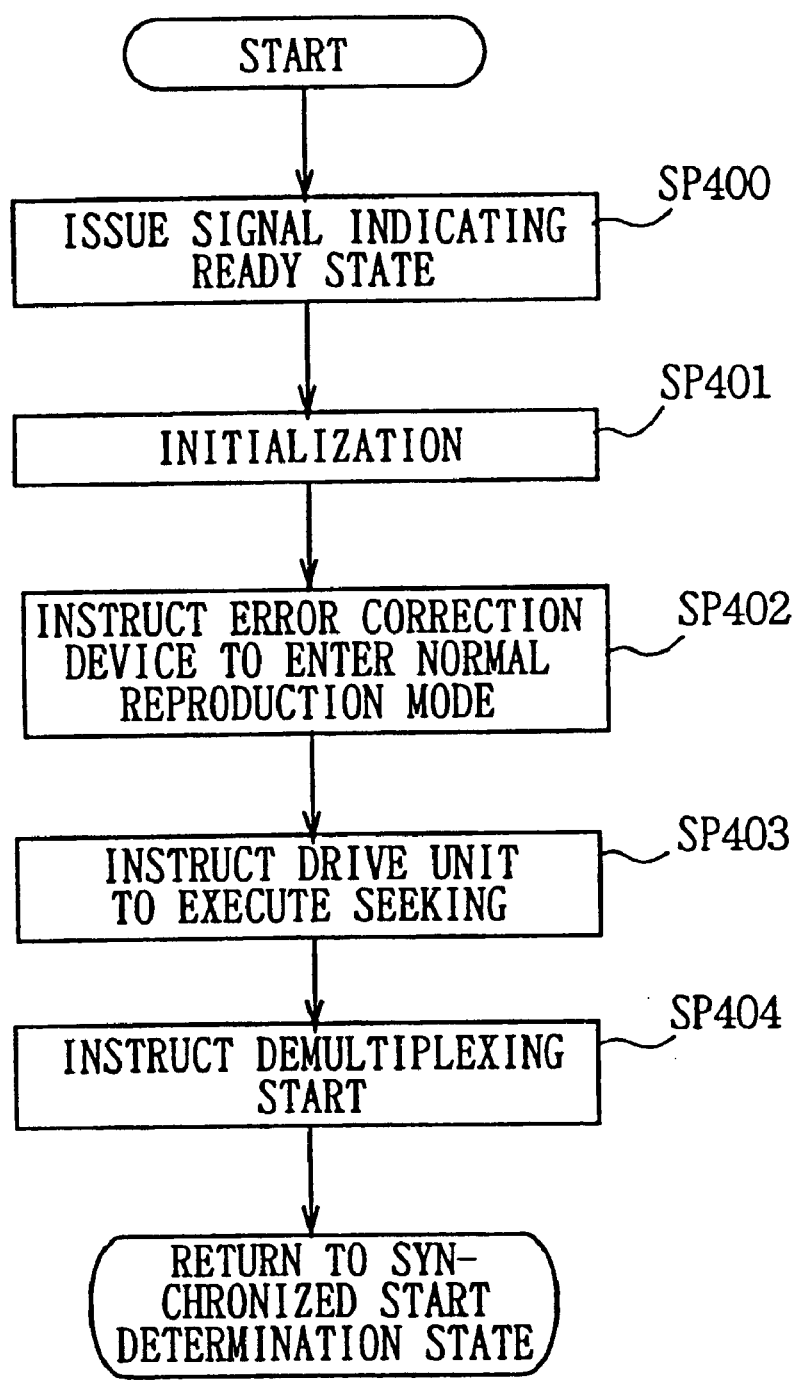
FIG. 16 is a flowchart illustrating processing by the controller 16 in its reproduction ready state.

FIG. 16 shows the flow of processing by the controller 16 in its reproduction ready state. When entering the reproduction ready state, the controller 16 instructs the information display device 19 and the postprocessor 15 to light a lamp indicating that reproduction is being prepared and to display the associated message on the screen (step SP400). The controller 16 then initializes the ring buffer 4, the demultiplexer 5, the video code buffer 6, the video decoder 8, the audio code buffer 9, the audio decoder 11, the superimposed dialogue code buffer 12, superimposed dialogue decoder 14, the postprocessor 15, and the storage device 20 (step SP401). However, it does not initialize the TOC data loaded and stored in the ring buffer 4.

The controller 16 instructs the error correction device 3 to enter the normal reproduction mode (step SP402). This instruction causes the error correction device 3 to perform both C1 and C2 error corrections once when an error occurs. The controller 16 then references TOC data to obtain the sector number at the beginning of the tracks to be reproduced, and issues a seek instruction to the drive unit 2 using the sector number (step SP403).

Figure 7A:
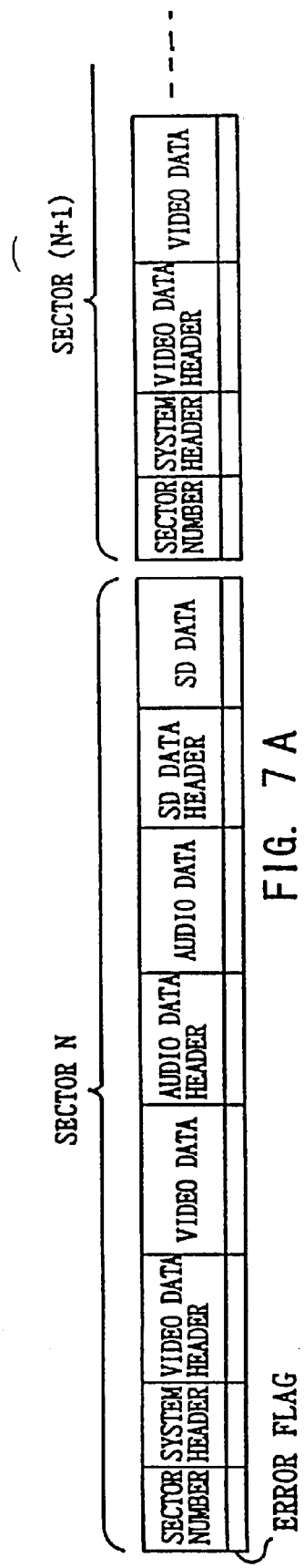
FIGS. 7A to 7D are schematic diagrams describing the structure of a multiplexed bit stream input to a demultiplexer and the structure of a bit stream output to each code buffer.
Figure 7B:
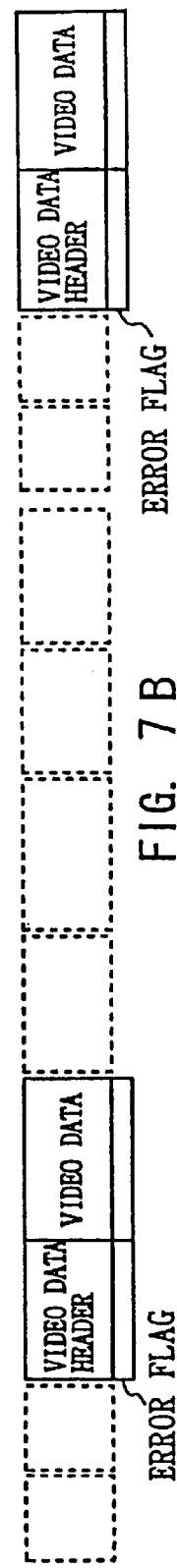
Figure 7C:
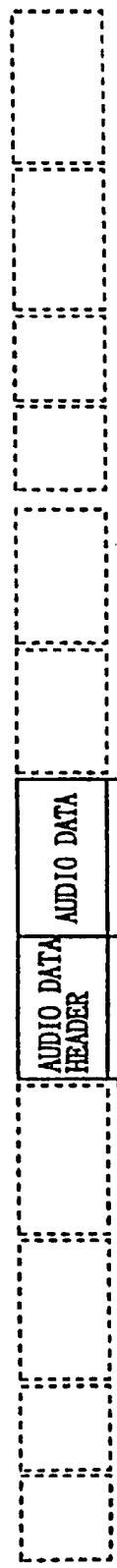
Figure 7D:
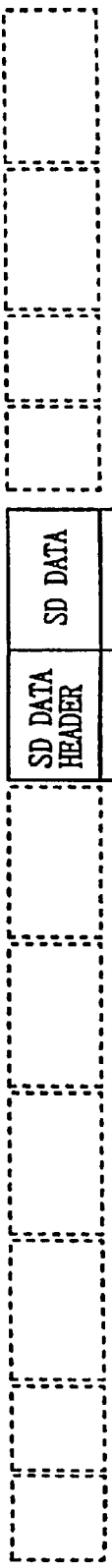

The controller 16 sends a demultiplexing start instruction to the demultiplexer 5 (step SP404). The demultiplexer 5 demultiplexes multiplexed bit streams passed from the ring buffer in the format shown in FIG. 7A, and then transfers them to the video code buffer 6, the audio code buffer 9, and the superimposed dialogue code buffer 12, as shown in FIGS. 7B, 7C, and 7D, respectively. It also detects the SCR stored in the system head, and retains it in its internal register.

The video code buffer 6 stores data transferred from the demultiplexer 5 in its buffer memory, and then passes them to the DTSV detector 7. Similarly, the audio code buffer 9 and the superimposed dialogue code buffer 12 stores data transferred from the demultiplexer 5 in their respective buffer memories, and then passes them to the DTSA detector 10 and the DTSS detector 13.

The DTSV detector 7 selects only the video data of the data sent from the video code buffer 6 to transfer them to the video decoder 8. It also attempts to detect a DTSV in video header shown in FIG. 9, and when detecting a DTSV, communicates the detection to the controller 16 and retains the value of the DTSV. Similarly, the DTSA detector 10 and the DTSS detector 13 select only the audio and superimposed dialogue data of the data sent from the audio code buffer 9 and the superimposed dialogue buffer 12 to transfer them to the audio decoder 11 and the superimposed dialogue decoder 13, respectively. They also attempt to detect a DTSA in audio header shown in FIG. 9 and a DTSS in superimposed dialogue data header also shown in FIG. 9, and when detecting a DTSA and a DTSS, communicate the detection to the controller 16 and retains their values, respectively. After this processing is finished, the controller 16 enters the synchronized start method determination state at step SP5 in FIG. 11.

(3-5) Synchronized Start Method Determination State

Figure 17:
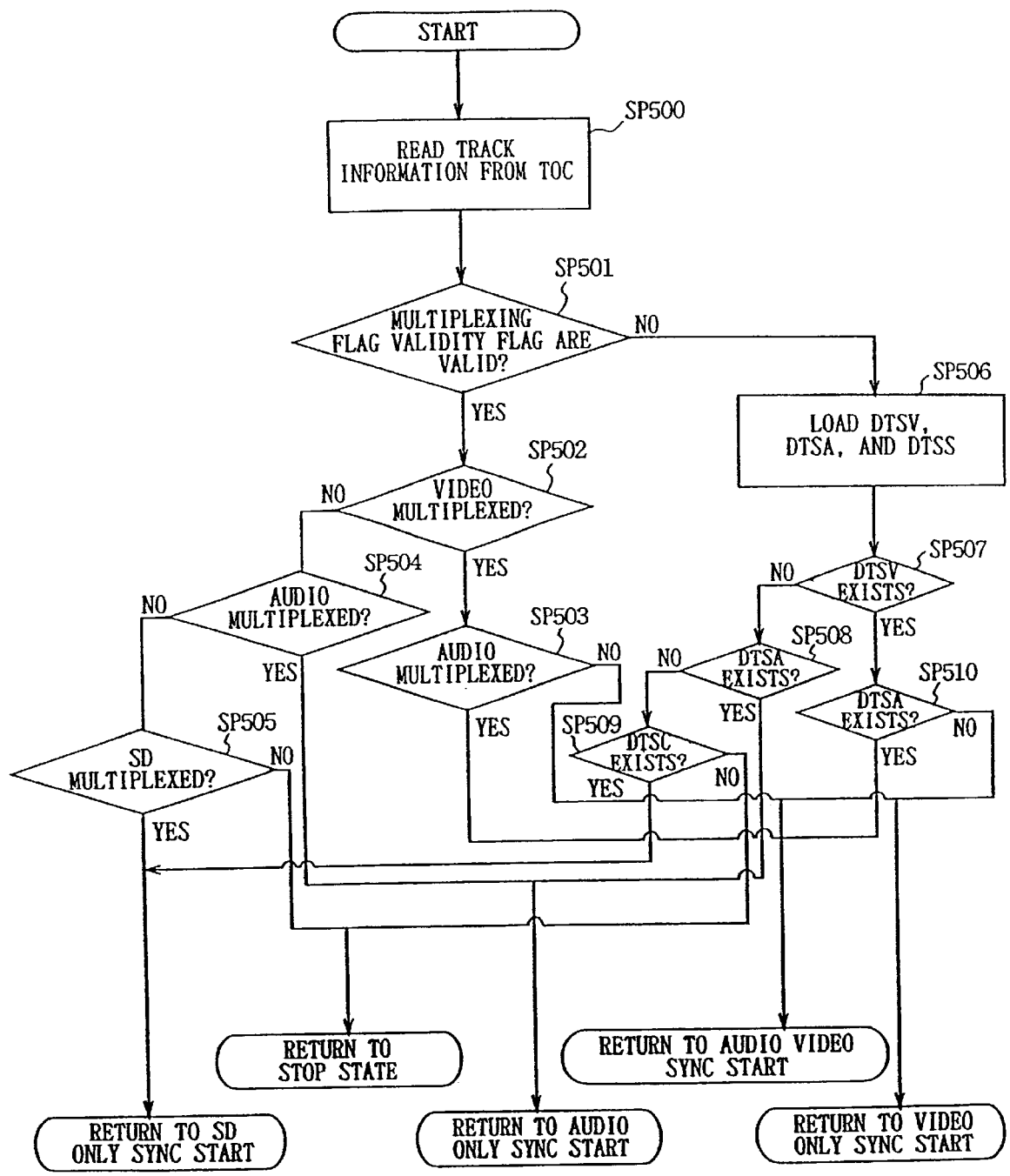
FIG. 17 is a flowchart illustrating processing by the controller 16 in its synchronized start method determination state.

FIG. 17 shows the flow of processing by the controller 16 in the synchronized start method determination state. When entering the synchronized start method determination state, the controller 16 executes processing required to start the reproduction of video, audio, and/or superimposed dialogue data. It selects a processing procedure used at the beginning of data reproduction using data contained in TOC and the detection state of a DTSV, a DTSA, or a DTSS to detect the presence of video, audio, and superimposed dialogue data in the data to be reproduced.

The controller 16 references the video, the audio, and the superimposed dialogue multiplexing flags in the information for each track in the TOC data shown in FIG. 5 to detect the presence of video, audio, and superimposed dialogue data in the data to be reproduced. The controller 16 first loads from the TOC stored in the ring buffer 4, the track information corresponding to the tracks to be reproduced (step SP500). It then determines whether or not each of the multiplexing flags is valid based on the multiplexing flag valid information flag in the track information obtained (step SP501). If it fails in this operation because the multiplexing flag valid information flag carries a value indicating invalidity, it executes the same determination based on the presence of a signal informing the detection of a DTSV, a DTSA, or a DTSS sent from the DTSV detector 7, the DTSA detector 10, or the DTSS detector 13 within a specified duration since the initiation of demultiplexing.

The controller 16 enters the audio and video synchronized start state if it determines from the multiplexing flags in the TOC information that both video and audio data are present in the tracks to be reproduced or if both a DTSV and a DTSA are detected within a specified duration. It enters video-only synchronized start state if it determines from the multiplexing flags in the TOC information that video data are present in the tracks to be reproduced whereas audio data is not present in these tracks or if a DTSV has been detected within a specified duration whereas a DTSA has not been detected within the same duration. It enters audio-only synchronized start state if it determines from the multiplexing flags in the TOC information that audio data is present in the tracks to be reproduced whereas video data is not present in these tracks or if a DTSA has been detected within a specified duration whereas a DTSV has not been detected within the same duration.

In addition, if the controller 16 determines from the multiplexing flats in the TOC information that neither video nor audio data is present in the tracks to be reproduced or if neither a DTSV nor a DTSA is detected within a specified duration, it enters the superimposed dialogue synchronized start state if a DTSS has been detected by that point of time. Furthermore, the controller 16 enters the stop state if it determines from the TOC information that neither video nor audio nor superimposed dialogue data is present or if neither a DTSV nor a DTSA nor a DTSS has been detected within a specified duration (steps SP502 to SP510).

(3-6) Audio and Video Synchronized Start State

Figure 18:
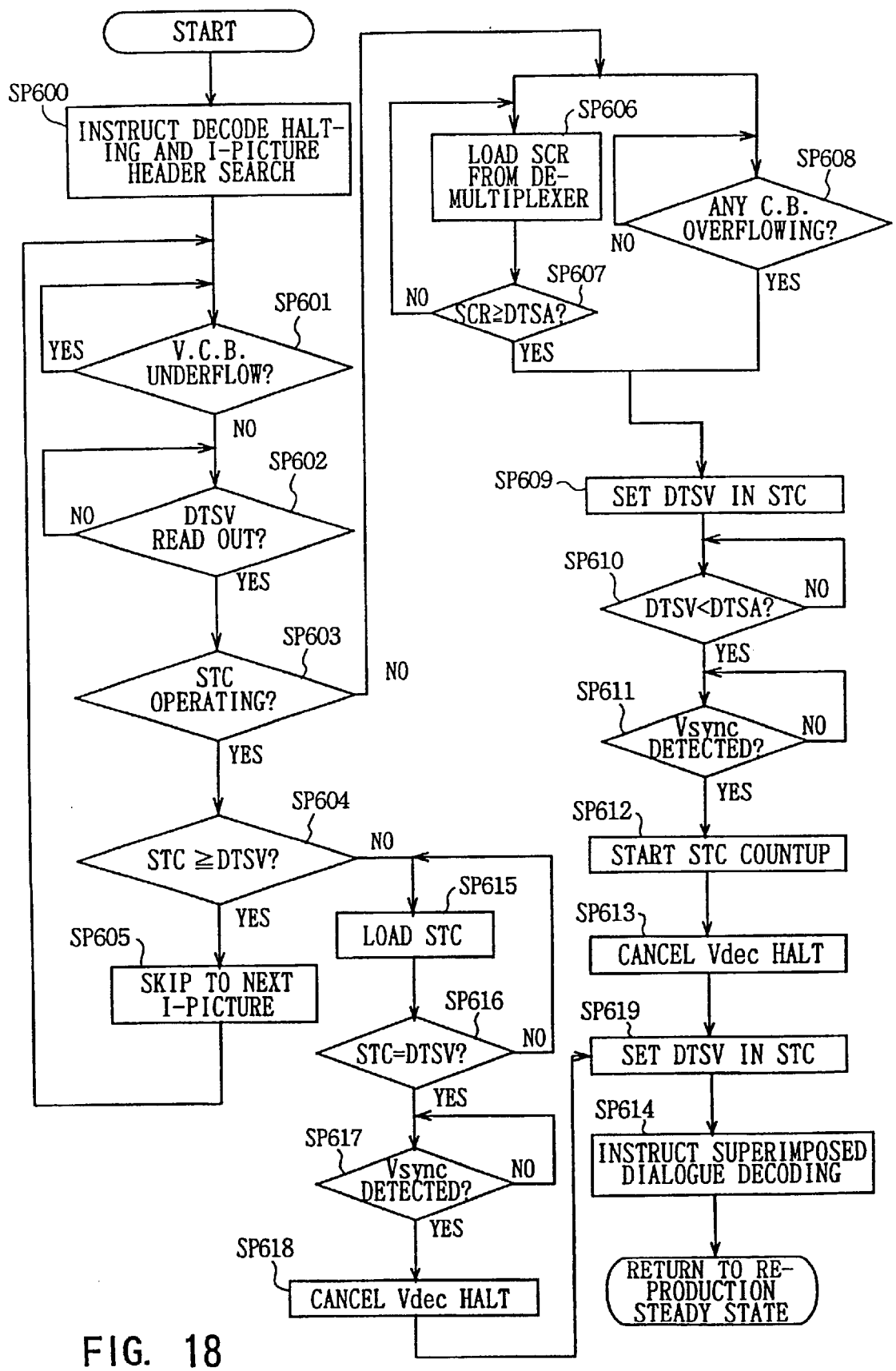
FIG. 18 is a flowchart illustrating video processing by the controller 16 in its audio and video synchronized state.

FIG. 18 shows the flow of processing for video data executed by the controller 16 in its audio video synchronized start state. When entering the audio and video synchronized start state, the controller 16 orders the video decoder 8 to halt decoding and to search for an I-picture header (step SP600). Since this causes an I-picture header to be searched for while decoding is halted, the video decoder 8 does not start decoding after detecting an I-picture header, and waits for a halt release instruction from the controller 16. The I-picture header is a particular data pattern placed at the beginning of intrapicture data in video data such as video bit streams defined by ISO11172 (MPEG1) or ISO13818 (MPEG2).

A rule specifies that a DTSV must be stored in the video data header in video data containing an I-picture header using the encoding method shown in the "case of DTSV encode flag=1" in FIG. 9, when data is stored in the DSM in which multiplexed bit streams in conformity with ISO11172 (MPEG1) or ISO13818 (MPEG2) are stored. This enables the controller 16 to load the DTSV corresponding to a detected I-picture header from the DTSV detector 7. Synchronization is started with I-pictures because the pictures, other than I-pictures, that is, P- and B-pictures are predictively encoded using pictures temporally located before and/or after these P- and the B-pictures and starting decoding with P- and B-pictures is thus impossible.

The controller 16 then determines whether or not the video code buffer 6 is underflowing (step SP601). If the video code buffer 6 is underflowing, the buffer has no data to be read out, so the controller 16 halts the reading of video data from the video code buffer 6. Next, when receiving a signal from the video decoder 8 indicating that an I-picture header has been read, the controller 16 loads the value of the DTSV from DTSV detector 16 (step SP602). The controller 16 then determines whether or not the STC countup circuit 24 is operating (step SP603).

If the automatic countup of the STC countup circuit 24 has been turned on, video and audio must be started in synchronization with the system clock STC, that is, the STC register, which has already started counting up. If the automatic countup of the STC has been turned off, both video and audio decoding and the automatic countup of the system clock STC must be started.

The controller performs the following processing for the video decoder 8 if the automatic countup of the STC has been turned on: The controller 16 first compares the STC stored in the STC register 23 with the DTSV detected by the DTSV detector 7 (step SP604). If DTSV≦STC, it determines that it has missed the time to start decoding, instructs the video decoder 8 to search again for an I-picture header (step SP605), and loads from the DTSV detector 7, the DTSV corresponding to the next I-picture header on the video bit stream (step SP602).

Since the STC has also been automatically counting up, the controller 16 again loads the most recent STC value from the STC register 23. It then compares the newly loaded DTSV with this STC (step SP604), and repeats this process until DTSV>STC. If a DTSV of a value that is larger than the value of the STC is loaded, the controller 16 waits until DTSV=STC is met (steps SP615, SP616). It then issues a decoding halt release instruction to the video decoder 8 in synchronization with the next vertical synchronization signal sent from the vertical synchronization signal generation circuit 22 (steps SP617, SP618). The controller 16 sets the STC to the value of the DTSV because the STC automatically counts up during wait for a vertical synchronization signal (step SP619).

Error processing must usually be carried out when an underflow signal is detected in the video code buffer 6 or the audio code buffer 9. In the audio and video synchronized start state, however, the controller 16 executes no special error processing even when receiving an underflow error signal from the video code buffer 6 after ordering the video decoder 8 to search for an I-picture header and before an I-picture is detected; the audio code buffer 9 waits until data is supplied from the demultiplexer 5 to clear the underflow state.

If the video decoder 8 detects an I-picture, the controller 16 must wait until a sufficient amount of data is stored in the video code buffer 6. The apparatus according to this invention fills the code buffer in the following manner if the STC fails to automatically count up, in order to obtain the predetermined fullness of code buffer specified in ISO11172 (MPEG1) or ISO13818 (MPEG2).

If the video decoder 8 detects an I-picture, it can receive data from the demultiplexer 5 and store them in the video code buffer 5 until the buffer 6 overflows because the video decoder 8 has already halted decoding. Every time data is stored, the demultiplexer 5 attempts to detect a new SCR.

The controller 16 loads a new SCR every specified duration which SCR updated every time data is stored in the video code buffer 6 (step SP606). It then compares this SCR with a DTSV loaded from the DTSV detector 7 (step SP607). At this point, if DTSV≦SCR, it determines that a sufficient amount of data is stored in the code buffer. If DTSV>SCR, it waits until the demultiplexer 5 detects a new SCR. It also determines that a sufficient amount of data is stored in the code buffer if it receives a signal meaning overflow from the video code buffer 6, the audio code buffer 9, or the superimposed dialogue code buffer 12 while waiting for a new SCR to be detected (step SP608).

The STC, which is a system clock, must be started in synchronization with a vertical synchronization signal if the automatic countup of the STC has been turned off. The DTSV is encoded in synchronization with a vertical synchronization signal, whereas the DTSA is encoded independently of a vertical synchronization signal. The STC is thus started in synchronization with a vertical synchronization signal using the DTSV as an initial value. After the STC is started and the decoding of video data is simultaneously started, the decoding of audio data is started using the DTSA. The controller performs the following processing for the video decoder if the STC automatic countup has been turned off. The controller 16 sets a DTSV read from the DTSV detector 7 into the STC register 23 (step SP609).

The controller 16 then compares the DTSA read from the DTSA detector 10 with the DTSV read from the DTSV detector 7 (step SP610). If DTSA≦DTSV, this means that audio data is decoded earlier than video data; the STC cannot thus be started in synchronization with a vertical synchronization signal. The controller 16 thus repeats issuance of a DTSA search instruction to the audio decoder 11 until DTSA>DTSV is met. The control of the audio decoder 11 is described below in detail.

If a DTSV and a DTSA have been loaded and DTSA>DTSV, the controller 16 waits for a vertical synchronization signal from the vertical synchronization signal generation circuit 22, and causes the STC countup circuit 24 to operate in synchronization with a vertical synchronization signal to turn on the automatic countup of the STC (step SP612). The controller 16 sends a halt release instruction to the video decoder 8 to start decoding of video data while causing the STC countup circuit 24 to operate (step SP613).

Figure 19:
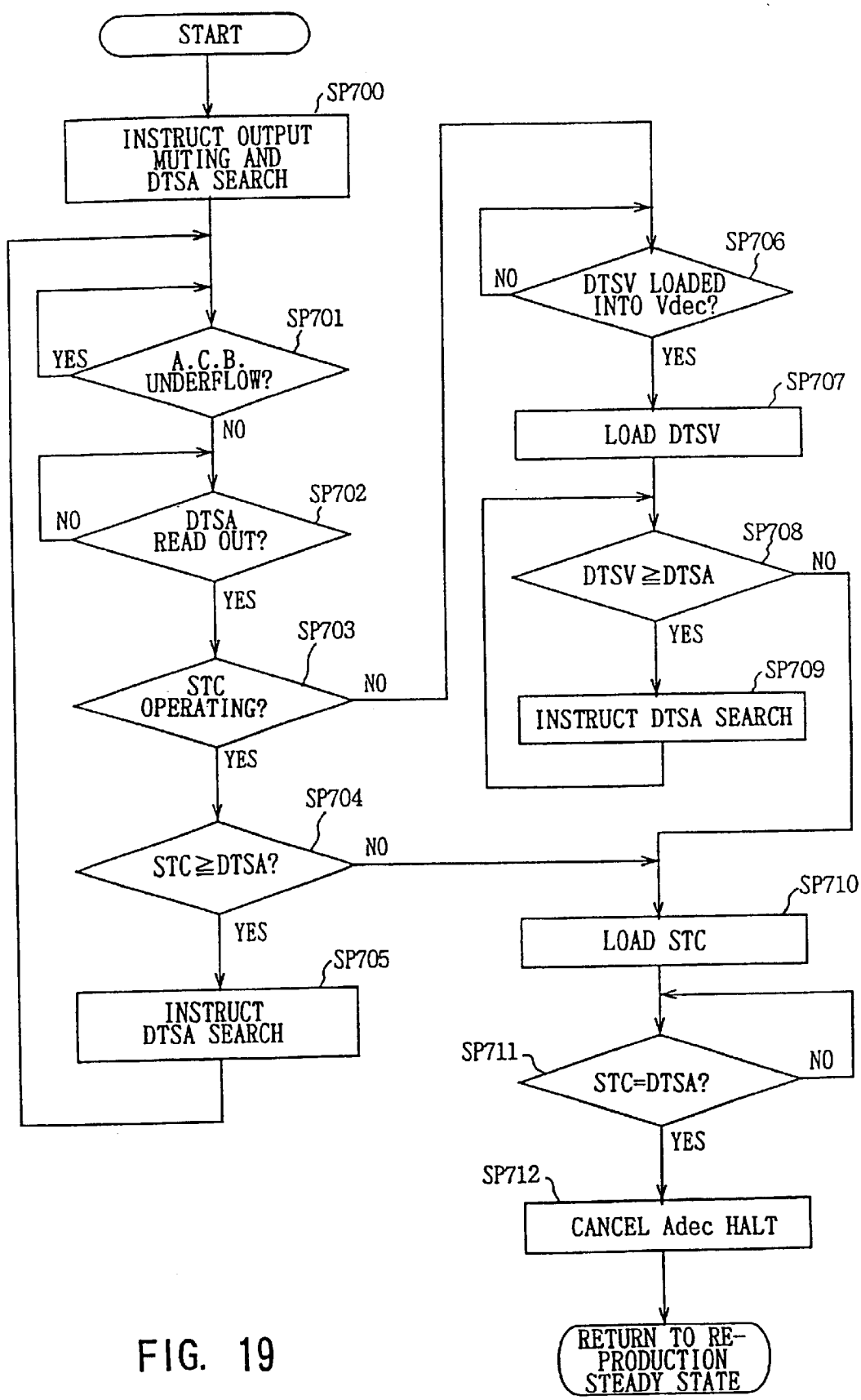
FIG. 19 is a flowchart illustrating audio processing by the controller 16 in the audio and video synchronized start state.

FIG. 19 shows the flow of processing for audio data executed by the controller 16 in its audio and video synchronized start state. When entering the audio video synchronized start state, the controller 16 issues an output mute instruction and a DTSA search instruction to the audio decoder 11 (step SP700). When receiving the DTSA search instruction, the audio decoder 11 sends a code request to the audio code buffer 9, starts decoding, and waits for a signal from the DTSA detector 10 meaning that a DTSA signal has been detected. In this state, however, the audio decoder 11 does not actually output decode data due to the mute instruction that has been received. The controller 16 monitors the audio code buffer 9 for underflow (step SP701). The underflow of the audio code buffer 9 means that the audio code buffer 9 has no data to be delivered. Thus, when detecting this, the controller 16 causes the delivery of data from the audio code buffer 9 to be halted, and enables delivery again when underflow is resolved. The decoder 11 halts decoding when receiving a signal from the DTSA detector 10 meaning that a DTSA signal has been detected. At this point, the controller 16 can load the detected DTSA from the DTSA detector 10 (step SP702). The halt state of the audio decoder 11 can be released by the controller 16 as described below.

The controller 16 then determines the operational state of the STC (step SP703). The controller executes the same processing for the audio decoder 11 as for the video decoder 8 if the automatic countup of the STC has been turned on. That is, the controller 16 compares the most recent STC loaded from the STC register 23 with the most recent DTSA loaded from the DTSA detector 10 (step SP704), and repeats issuance of a DTSA search instruction to the audio decoder 11 until DTSA>STC is met (step SP705). When a DTSA of a value larger than the value of the STC is loaded, the controller 16 loads a new STC (step SP710), waits until DTSA=STC is met (step SP711), and issues a decoding halt release instruction to the audio decoder 11 (step SP712).

The controller 16 performs the following processing for the audio decoder if the automatic countup of the STC has been turned off. That is, the controller determines that a DTSV has already been loaded during the synchronized start processing for the video decoder 8 in FIG. 18 (step SP706). If a DTSV has been loaded, the controller 16 loads it for synchronized start processing for the audio decoder 11 (step SP707). The controller 16 subsequently compares with the loaded DTSV with a DTSA (step SP708), and repeats issuance of a DTSA search instruction to the audio decoder 11 until DTSA>DTSV is met (step SP709). When DTSA>DTSV is met, the value of the STC can be loaded for synchronized start processing for the audio decoder 11 at this point because the STC countup circuit 24 has been operated to turn on the automatic countup of the STC during the synchronized start processing for the video decoder 8 in FIG. 18, as described above. The controller 16 subsequently waits until STC=DTSA is met (step SP711), and sends a decoding halt release instruction to the audio decoder 11 to start decoding when STC=DTSA is met (step SP712). When the above processing is finished, the controller 16 enters the reproduction steady state.

(3-7) Video-Only Synchronized Start State

Figure 20:
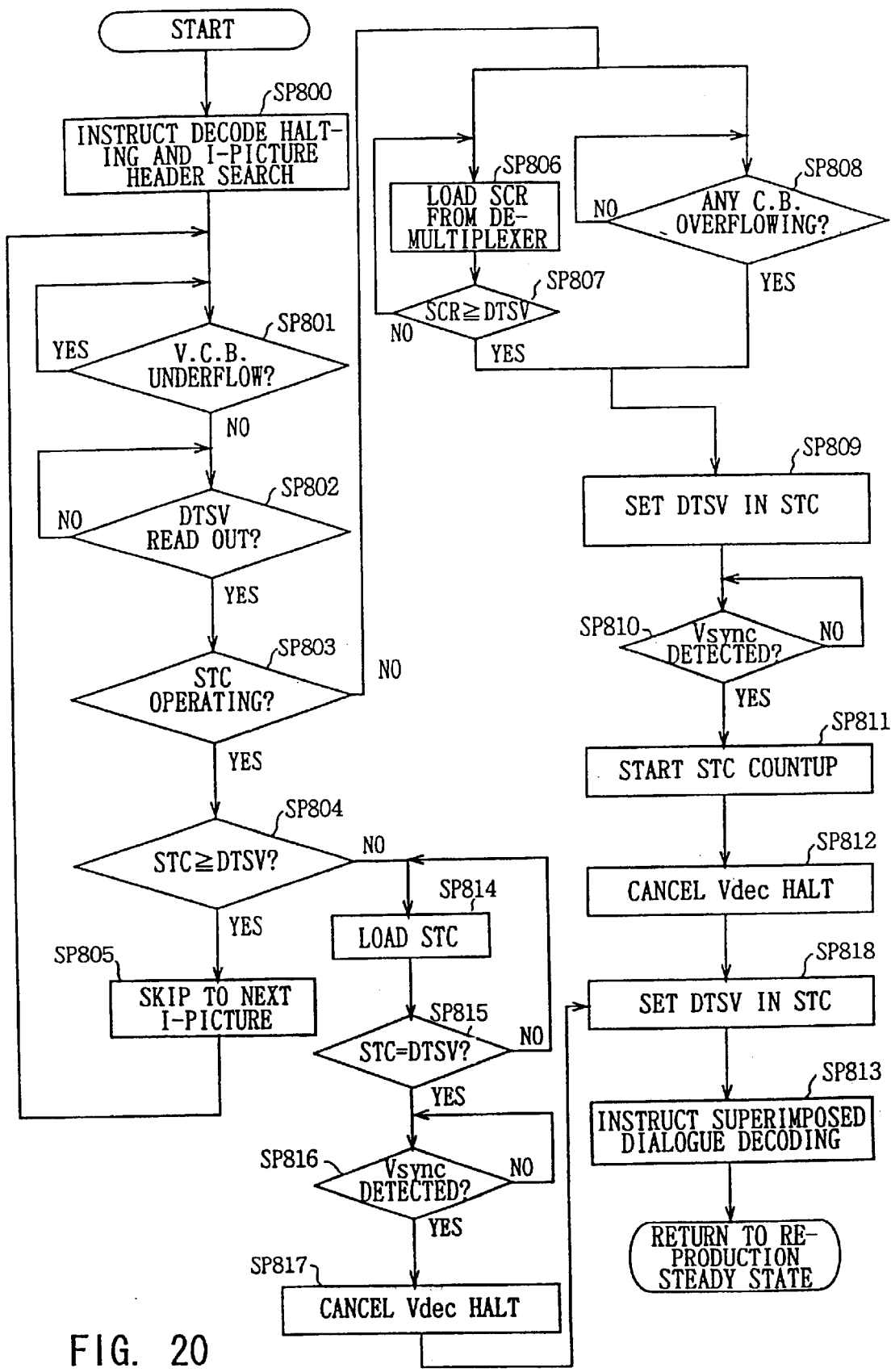
FIG. 20 is a flowchart illustrating processing by the controller 16 in its video-only synchronized start state.

FIG. 20 shows the flow of processing by the controller 16 in its video-only synchronized start state. When entering the video-only synchronized start state, the controller 16 executes processing required to start only video data in synchronization with a vertical synchronization signal. Processing by the controller 16 in the video-only synchronized start state is fundamentally the same as that in the audio video synchronized start state except for the absence of the comparison of the DTSV with the DTSA, that is, step SP610 in FIG. 18. Detailed description will therefore be omitted here. As in the audio video synchronized start, the controller 16 instructs the video decoder 8 to halt decoding and to search for an I-picture header (step SP800).

If the video decode 18 detects an I-picture, that is, the controller 16 loads a DTSV (step SP802) and the STC has been turned off, the controller 16 then waits for a sufficient amount of data to be stored in the video code buffer 6. That is, as in the audio video synchronized start, the controller 16 compares the detected DTSV with the most recent SCR read out from the demultiplexer 5, and waits until DTSV≦SCR is met or it receives a signal indicating overflow from the video code buffer 6, the audio code buffer 9, or the superimposed dialogue code buffer 12 (step SP806, SP807, SP808).

For audio data, the controller 16 performs no processing if the audio decoder 11 has already started decoding and, otherwise, sends an output mute instruction and a DTSA search instruction to the audio decoder 11 to cause the decoder to wait for audio data to be transferred from the demultiplexer 5 to the audio code buffer 9.

For video data, the controller 16 further executes the following processing. If the automatic countup of the STC has been turned on, it carries out the same processing as in the audio video synchronized start with the automatic countup of the STC turned on (step SP804, SP805, SP814, SP815, SP816, SP817, SP818). At this point, the controller 16 performs no processing for audio data.

If the automatic countup of the STC has been turned off, the controller carries out the same processing as in the audio video synchronized start with the automatic countup of the STC turned off. In this case, however, the controller does not perform processing for audio data, that is, does not repeat issuance of a decoding halt release instruction to the audio decoder 11 until DTSA=STC is met after causing the video decoder to start decoding.

After the above processing is finished, the controller 16 sends a decoding start instruction to the superimposed dialogue decoder, and enters the reproduction steady state. The controller 16 enters the audio-only synchronized start state at step 804 and subsequent steps shown in FIG. 21 if it receives a signal from the DTSA detector 10 indicating that a DTSA has been detected after starting reproduction in the video-only synchronized start state and then entering the reproduction steady state.

(3-8) Audio-Only Synchronized Start State

Figure 21:
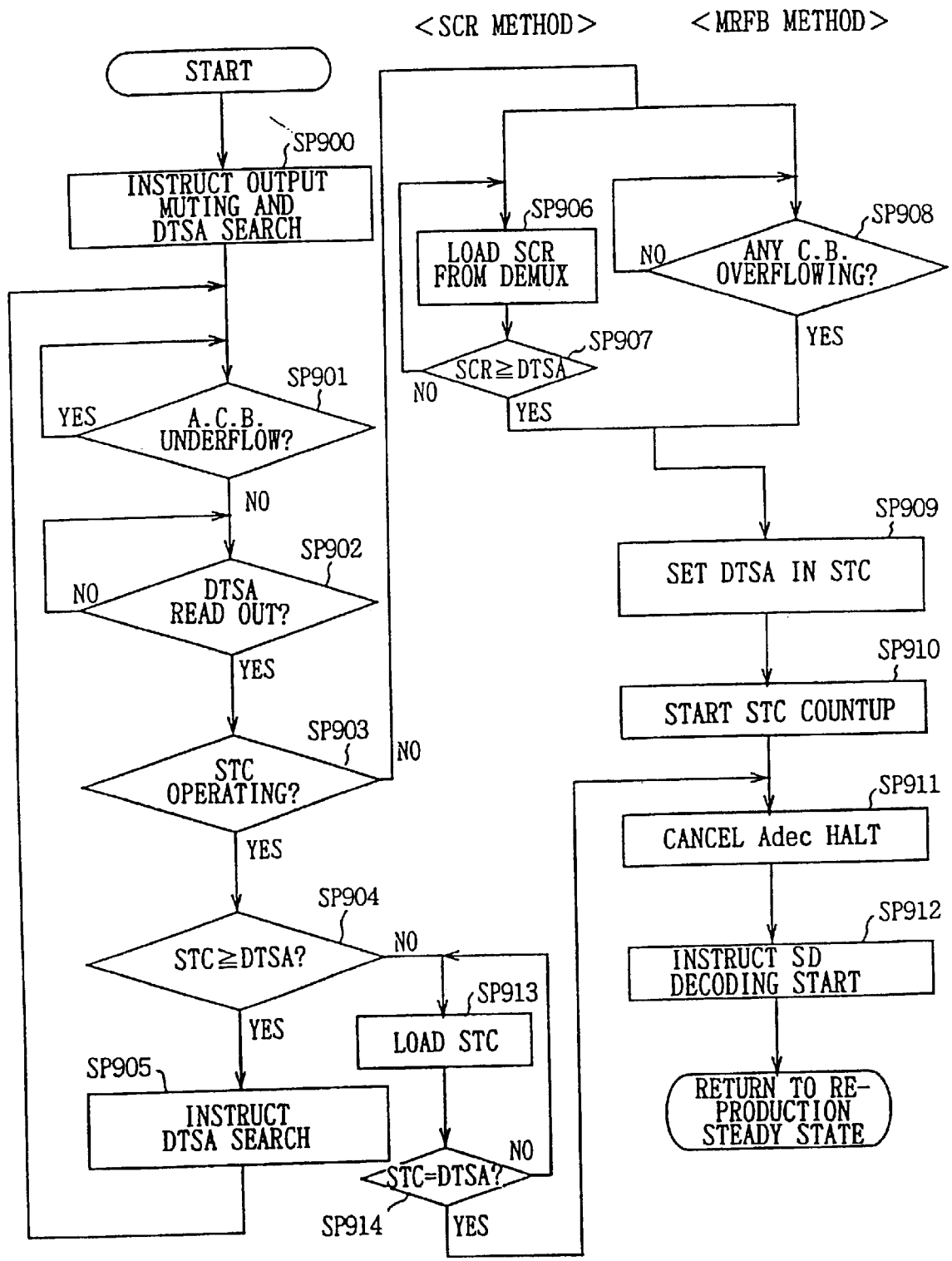
FIG. 21 is a flowchart illustrating processing by the controller 16 in its audio-only synchronized start state.

FIG. 21 shows the flow of processing by the controller 16 in its audio-only synchronized start state. When entering the audio-only synchronized start state, the controller 16 executes processing required to start only audio data in synchronization with the STC. For video data, the controller performs no processing if the video decoder 8 has already started decoding, and otherwise, sends an I-picture header search instruction to the video decoder 8.

When entering the audio-only synchronized start state, the controller 16 sends an output mute instruction and a DTSA search instruction to the audio decoder 11 (step SP900). When receiving the DTSA search instruction, the audio decoder 11 delivers a code request to the audio code buffer 9, starts decoding, and waits for a signal from the DTSA detector 10 meaning that a DTSA signal has been detected. In this state, however, the audio decoder 11 does not actually output decoded data due to the mute instruction it has received. The controller 16 monitors the audio code buffer 9 for underflow (step SP901). The underflow of the audio code buffer 9 means that the audio code buffer 9 has no data to be delivered. Thus, when detecting this, the controller 16 causes the delivery of data from the audio code buffer 9 to be halted, and enables the delivery again when underflow is resolved. The audio decoder 11 halts decoding when receiving a signal from the DTSA detector 10 meaning that a DTSA signal has been detected. At this point, the controller 16 can load the detected DTSA from the DTSA detector 10 (step SP902). The halt state of the audio decoder 11 can be released by the controller 16 as described below.

The controller 16 then determines the operational state of the STC (step SP903). The controller executes the following processing if the automatic countup of the STC has been turned on: That is, the controller 16 compares the most recent STC loaded from the STC register 23 with the most recent DTSA loaded from the DTSA detector 10 (step SP904), and repeats issuance of a DTSA search instruction to the audio decoder 11 until DTSA>STC is met (step SP905). When a DTSA of a value larger than the value of the STC is loaded, the controller 16 loads a new STC (step SP913), waits until DTSA=STC is met (step SP914), and issues a decoding halt release instruction to the audio decoder 11 (step SP911).

If the automatic countup of the STC has been turned off, the controller 16 starts to wait until a sufficient amount of data is stored in the audio code buffer 9 when the DTSA detector 10 detects a DTSA. That is, as in the above process of waiting until a sufficient amount of data is stored in the video code buffer 6, the controller 16 reads the most recent SCR from the demultiplexer 5 (step SP906), compares this SCR with the readout DTSA (step SP907), and waits until DTSA≦SCR is met or it receives a signal indicating overflow from the video code buffer 6, the audio code buffer 9, or the superimposed dialogue code buffer 12 (step SP908). If the automatic countup of the STC has been turned off, the controller 16 then starts the automatic countup of the STC at the same time when the audio decoder starts decoding. That is, when detecting that a sufficient amount of data is stored in the audio code buffer 9, the controller 16 sets the value of DTSA detected by the DTSA detector into the STC register 23 (step SP909), and causes the STC countup circuit 24 to operate to turn on automatic countup of the STC (step SP910). While causing the STC countup circuit 24 to operate, the controller 16 issues a halt release instruction to the audio decoder 11 to start decoding audio data (step SP911).

After the above processing is finished, the controller 16 sends a decoding start instruction to the superimposed dialogue decoder (step SP912), and enters the reproduction steady state. The controller 16 enters the video-only synchronized start state at step 804 and subsequent steps shown in FIG. 20 if it receives a signal from the DTSV detector 7 indicating that a DTSV has been detected after starting reproduction in the audio-only synchronized start state and then entering the reproduction steady state.

(3-9) Superimposed Dialogue-Only Synchronized Start State

Figure 22:
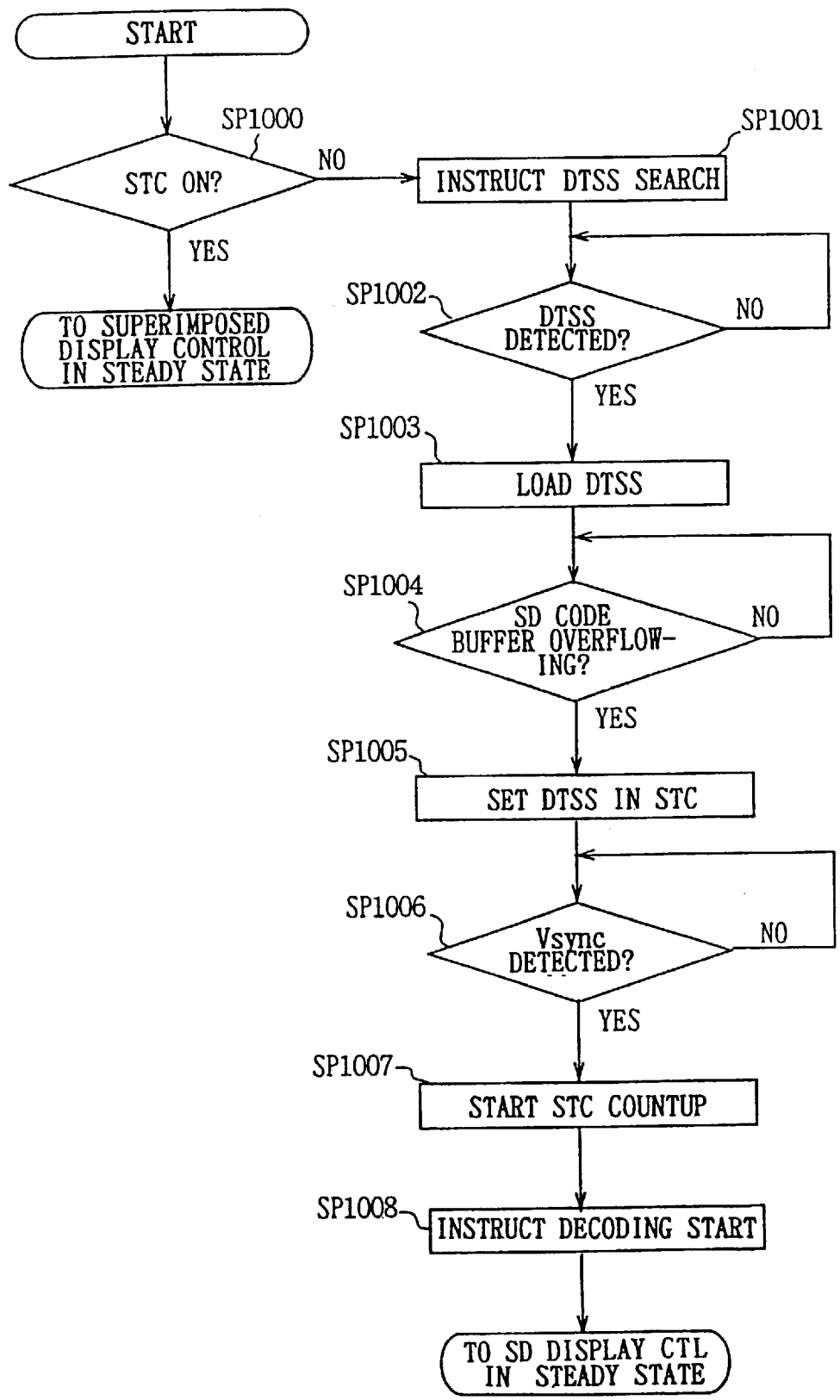
FIG. 22 is a flowchart illustrating processing by the controller 16 in its superimposed dialogue-only synchronized start state.

FIG. 22 shows the flow of processing by the controller 16 in its superimposed dialogue-only synchronized start state. When entering the superimposed dialogue-only synchronized start state, the controller 16 executes processing required to start only superimposed dialogue data in synchronization with the STC.

Superimposed dialogue data is among video data. However, like ordinary TV image signals or video data encoded in conformity with ISO11172 (MPEG1) or ISO13818 (MPEG2), video data 8 used by the video decoder of the present apparatus has a display duration on a single screen of about ⅕ to about ⅓₀ second, whereas superimposed dialogue data used by the present apparatus is image data wherein the same screen is displayed over a relatively long duration of about one second or more on a single screen as in superimposed dialogue synthesized or superimposed in movies or TV programs.

Since superimposed dialogue data has the above characteristic, an amount of superimposed dialogue data for a single screen must be stored in the DSM 1 at a lower transfer rate than video and audio data also stored on the DSM 1. The present apparatus that reproduces data stored in such a manner loads through the superimposed dialogue buffer 12 and the DTSS detector 13 superimposed dialogue data delivered at a low transfer rate, and after decoding them by the superimposed dialogue decoder 14, outputs them to the postprocessor 15.

During superimposed dialogue-only synchronized start, for video data, the controller performs no processing if the video decoder 8 has already started decoding and, otherwise, sends an I-picture header search instruction to the video decoder 8 to cause the decoder to wait for video data to be transferred from the demultiplexer 5 to the video code buffer 6.

For audio data, the controller performs no processing if the audio decoder 11 has already started decoding and, otherwise, sends an output mute instruction and a DTSA search instruction to the audio decoder 11 to cause the decoder to wait for audio data to be transferred from the demultiplexer 5 to the audio code buffer 9.

For superimposed dialogue data, if the automatic countup of the STC has been turned on, the controller displays superimposed dialogue using the same processing procedure as in the reproduction steady state described below. During superimposed dialogue-only synchronized start, the controller 16 first determines whether or not the countup of the STC has been turned on (step SP1000). If the automatic countup of the STC has been turned off, the controller, after executing the following processing, displays superimposed dialogue using the same processing procedure as in the reproduction steady state described below: If the automatic countup of the STC has been turned off, the controller 16 sends a DTSS search instruction to the superimposed dialogue decoder 14 (step SP1001), and waits for the DTSS detector 13 to detect a DTSS (step SP1002). The controller then loads a detected DTSS (step SP1003). At this point, the superimposed dialogue code buffer 12 may overflow because the STC has not been started, thereby preventing a decoding start instruction to be issued to the superimposed dialogue decoder 14. Consequently, when receiving a signal meaning overflow from the superimposed dialogue code buffer 12 (step SP1004), the controller 16 sets into the STC register 23 a DTSS read out from the DTSS detector 13 (step SP1005), waits for a vertical synchronization signal from the vertical synchronization signal generation circuit 22 (step SP1006), causes the STC countup circuit 24 to operate (step SP1007), and starts the superimposed dialogue decode (step SP1008). After the above processing is finished, the controller 16 enters the reproduction steady state.

The controller 16 enters the video-only synchronized start state at step SP804 if it receives a signal from the DTSV detector 7 indicating that a DTSV has been detected after starting reproduction in the superimposed dialogue-only synchronized start state and then entering the reproduction steady state. The controller 16 enters the audio-only synchronized start state at step SP904 if it receives a signal from the DTSA detector 10 indicating that a DTSA has been detected after starting reproduction in the superimposed dialogue-only synchronized start state and then entering the reproduction steady state. In addition, the controller 16 enters the audio and video synchronized start state at steps SP604 and SP704 if it receives a signal from both the DTSV detector 7 and the DTSA detector 10 indicating that a DTSV and a DTSA have been detected after starting reproduction in the superimposed dialogue-only synchronized start state and then entering the reproduction steady state.

(3-10) Reproduction Steady State

When returning to the reproduction steady state, the controller 16 detects errors in video synchronization, detects and corrects errors in audio synchronization, detects other errors, controls the superimposed dialogue decoder, and checks the reproduction program.

(3-11) Detection of Errors in Synchronization

While both the video decoder 8 and the audio decoder 11 are decoding data, a means is required for detecting and correcting the difference between the decoding start time of video data and the decoding start time of audio data, that is, an error in synchronization of displayed images with output voices which is called a "lip-sync."

Possible errors in synchronization include the difference between the system clock STC and the video decoding start time DTSV and the difference between the system clock STC and the audio decoding start time DTSA. Two methods are available for the detection of synchronization errors. One method is to detect both differences to take corrective action such that both differences can be substantially eliminated. The other method is to treat one of the difference as a reference while detecting the other difference and taking action required to correct this difference.

The former method is to adjust all the differences to a specified reference STC to correct errors in synchronization of video data with audio data. In addition, if the difference between the system clock STC and the video decoding start time DTSV is treated as a reference, the latter method initializes the STC to the DTSV periodically or at a specified time interval to eliminate this difference in a mathematical sense.

In the latter method, the difference between the system STC and the audio decoding start time DTSA is represented as its original value plus the value of the difference between the STC and the DTSV. Errors in the synchronization of video, audio, and superimposed dialogue data can thus be relatively corrected by eliminating only the difference associated with the DTSA.

Figure 23:
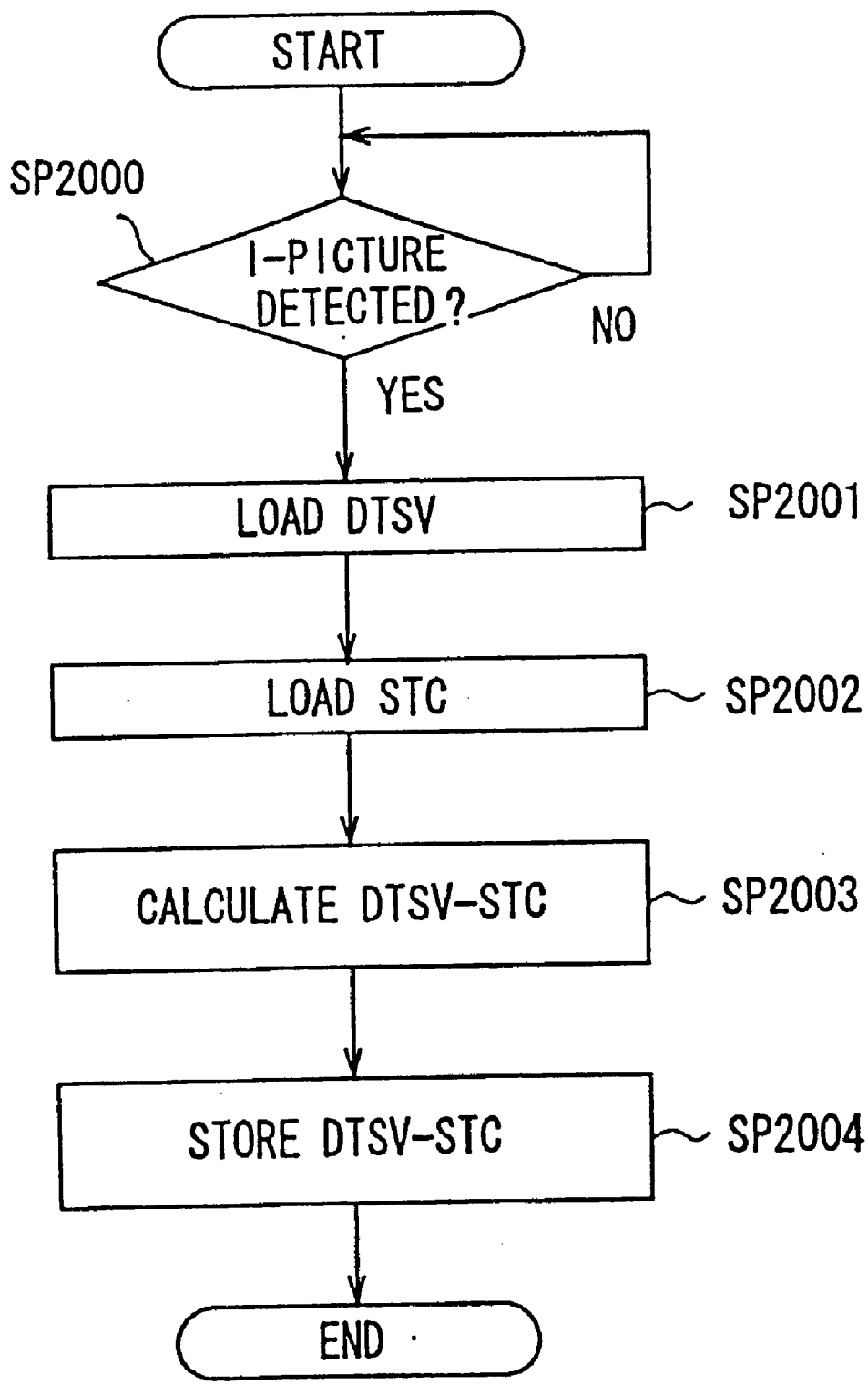
FIG. 23 is a flowchart illustrating processing executed by the controller 16 to detect an error in synchronization in terms of video.

In the former method, the difference between the STC and the DTSV and the difference between the STC and the DTSA are detected as follows: FIG. 23 shows the flow of processing executed by the controller 16 in the former video synchronization error detection method. That is, when receiving a signal from the video decoder 8 meaning that an I-picture header has been detected (step SP2000), the controller 16 loads the most recent DTSV from the DTSV detector 7 and an STC from the STC register 23 (steps SP2001, SP2002), and calculates the difference between the DTSV and STC, that is, (DTSV−STC) (step SP2003) to store the result in the storage device 20.

Figure 24:
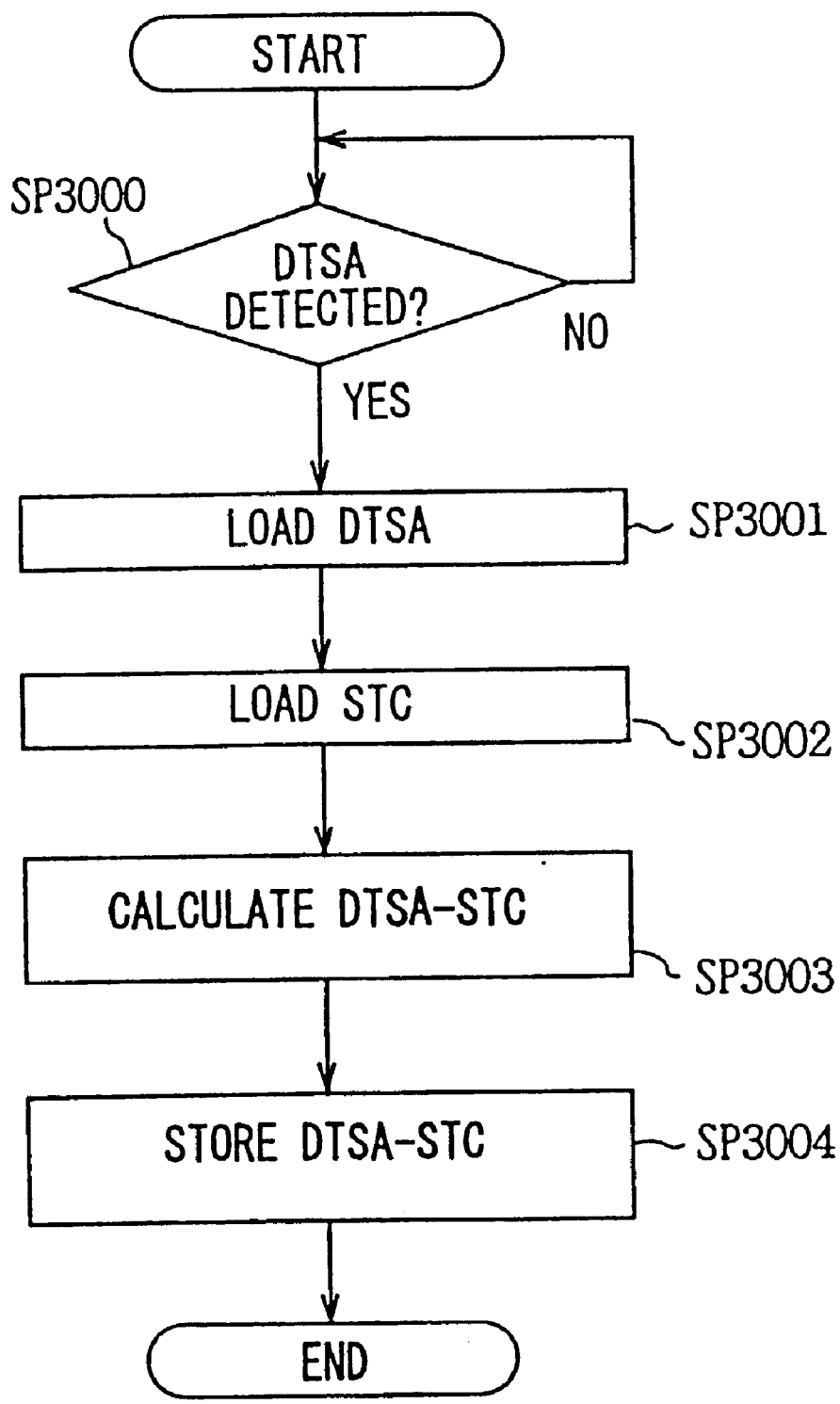
FIG. 24 is a flowchart illustrating processing executed by the controller 16 to detect an error in synchronization in terms of audio.

FIG. 24 shows the flow of processing executed by the controller 16 in the former audio synchronization error detection method. When receiving a signal from the DTSA detector 10 meaning that a DTSA has been detected (step SP3000), the controller 16 loads the most recent DTSA from the DTSA detector 10 and an STC from the STC register 23 (steps SP3001, SP3002), and calculates the difference between the DTSA and STC, that is, (DTSA−STC) (step SP3003) to store the result in the storage device 20 (step SP3004).

Figure 25:
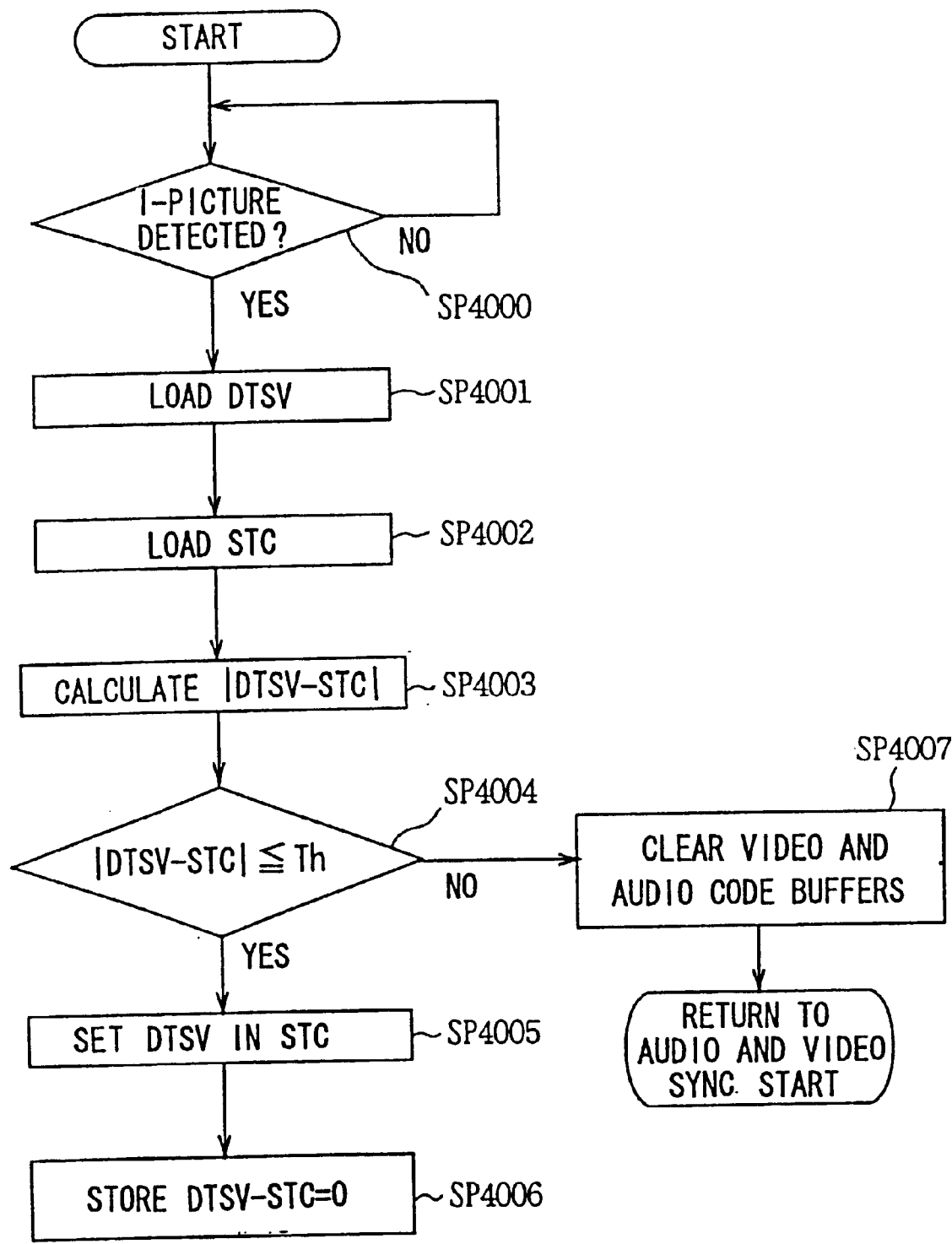
FIG. 25 is a flowchart illustrating other processing executed by the controller 16 to detect an error in synchronization in terms of video.

FIG. 25 shows the flow of processing executed by the controller 16 in the latter video synchronization error detection method. When receiving a signal from the video decoder 8 meaning that an I-picture header has been detected (step SP4000), the controller 16 loads the most recent DTSV from the DTSV detector 7 and an STC from the STC register 23 (steps SP4001, SP4002), and calculates the absolute value of the difference between the DTSV and STC, that is, |DTSV−STC| (step SP4003). The controller then compares |DTSV−STC| with a specified value (step SP4004), and sets the value of the DTSV in the STC register 23 if |DTSV−STC| is the specified value or smaller (step SP4005). If |DTSV−STC| exceeds the specified value, the controller determines that a serious synchronization error is occurring and that the DTSV cannot be used as a reference, and clears the video code buffer 6 and the audio code buffer 9 to enter the audio and video synchronized start state (step SP4007). The storage device 20 stores a value of "0" as (DTSV−STC) if |DTSV−STC| is the specified value or smaller (step SP4006).

FIG. 24 also shows the flow of processing by the controller 16 in the latter audio synchronization error detection method. That is, when receiving a signal from the DTSA detector 10 meaning that a DTSA has been detected, the controller 16 loads the most recent DTSA from the DTSA detector 10 and an STC from the STC register 23. It then calculates the difference between the DTSA and STC, that is, (DTSA−STC) to store the result in the storage device 20.

Hardware such as an adder, a subtracter, and a comparator can also be used to cause the controller 16 to set the values of the STC, the DTSV, and the DTSA and to read out the results of calculation if the controller must spend a large amount of time calculating (DTSV−STC), (DTSA−STC), and |DTSV−STC| using software.

(3-12) Correction of Synchronization Errors

Figure 26:
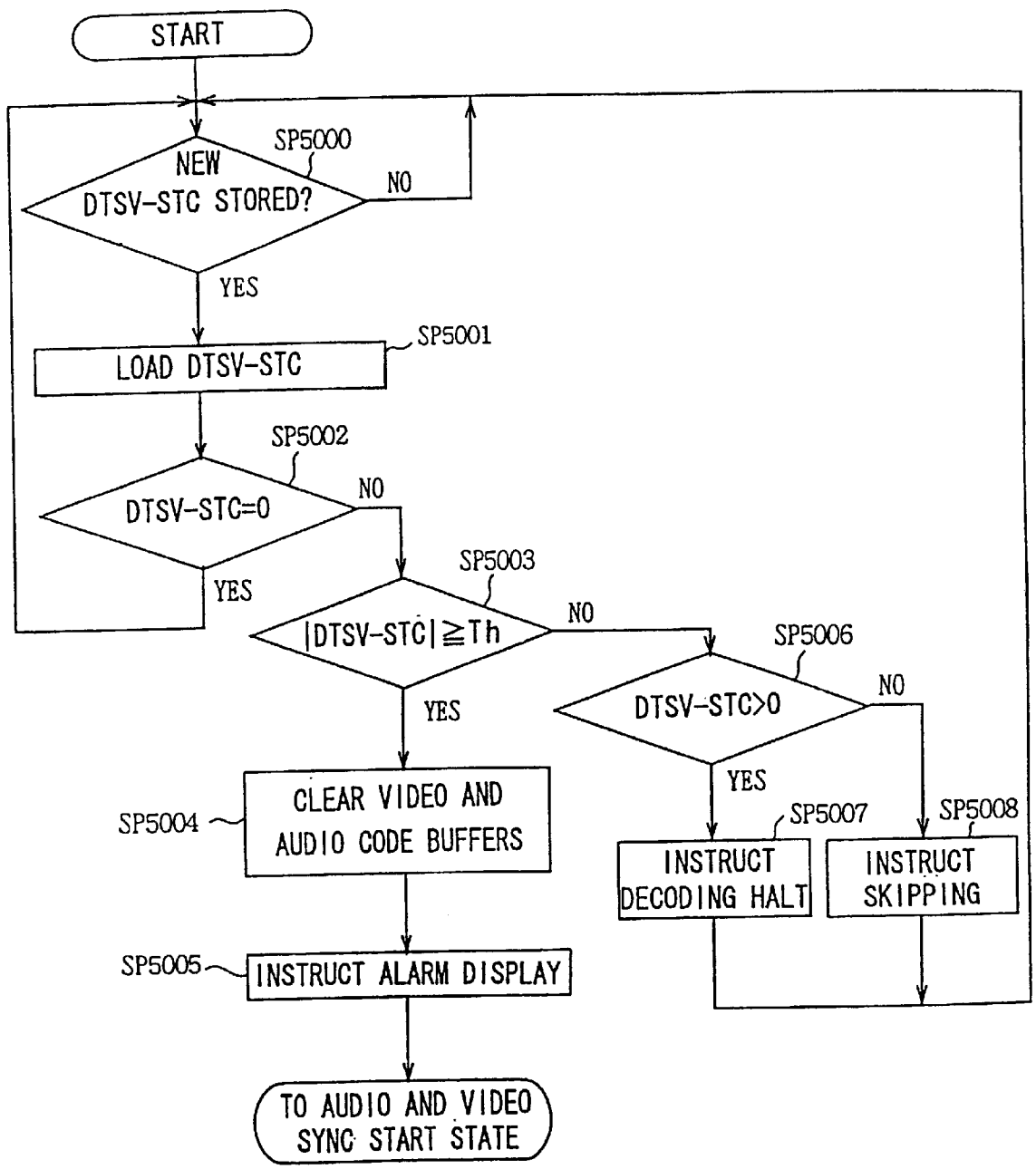
FIG. 26 is a flowchart illustrating processing executed by the controller 16 to correct an error in the synchronization in terms of video.

The correction of synchronization errors associated with the DTSV and the DTSA which is commonly used in both synchronization error detection methods is described below. FIG. 26 shows the flow of processing by the controller in correcting synchronization errors associated with the DTSV. When a new (DTSV−STC) is stored in the storage device 20 (step SP5000), the controller 16 loads this value (step SP5001). If (DTSV−STC)=0, the controller takes no corrective action for the video decoder 8 (step SP5002). The controller 16 then compares the absolute value of (DTSV−STC) with a specified value (step SP5003). If the absolute value of (DTSV−STC) is large and exceeds the specified value, the controller 16 determines that a serious synchronization error is occurring, and clears the video code buffer 6 and the audio code buffer 9 (step SP5004) to enter the audio and video synchronized start state. If the absolute value of (DTSV−STC) does not exceed the specified value, it determines whether the DTSV is positive or negative (step SP5,006). If (DTSV−STC)>0, the decoding of video data has progressed relative to the STC. The controller 16 thus instructs the video decoder 8 to halt decoding for an appropriate number of pictures corresponding to the magnitude of |DTSV−STC| and to repeat display of the same picture (step SP5007). If (DTSV−STC)<0, the decoding of video data is delayed relative to the STC, so the controller instructs the video decoder 8 to skip an appropriate number of pictures corresponding to the magnitude of |DTSV−STC| (step SP5008).

In this case, if I- and P-pictures are skipped, picture data cannot be decoded properly until the next I-picture because the images are compressed using the interframe correlating method in conformity with ISO11172 (MPEG1) or ISO13818 (MPEG2). The controller thus instructs the video decoder 8 to skip only B-pictures that are not used as reference images for decoding subsequent pictures and can thus be skipped safely.

Figure 27:
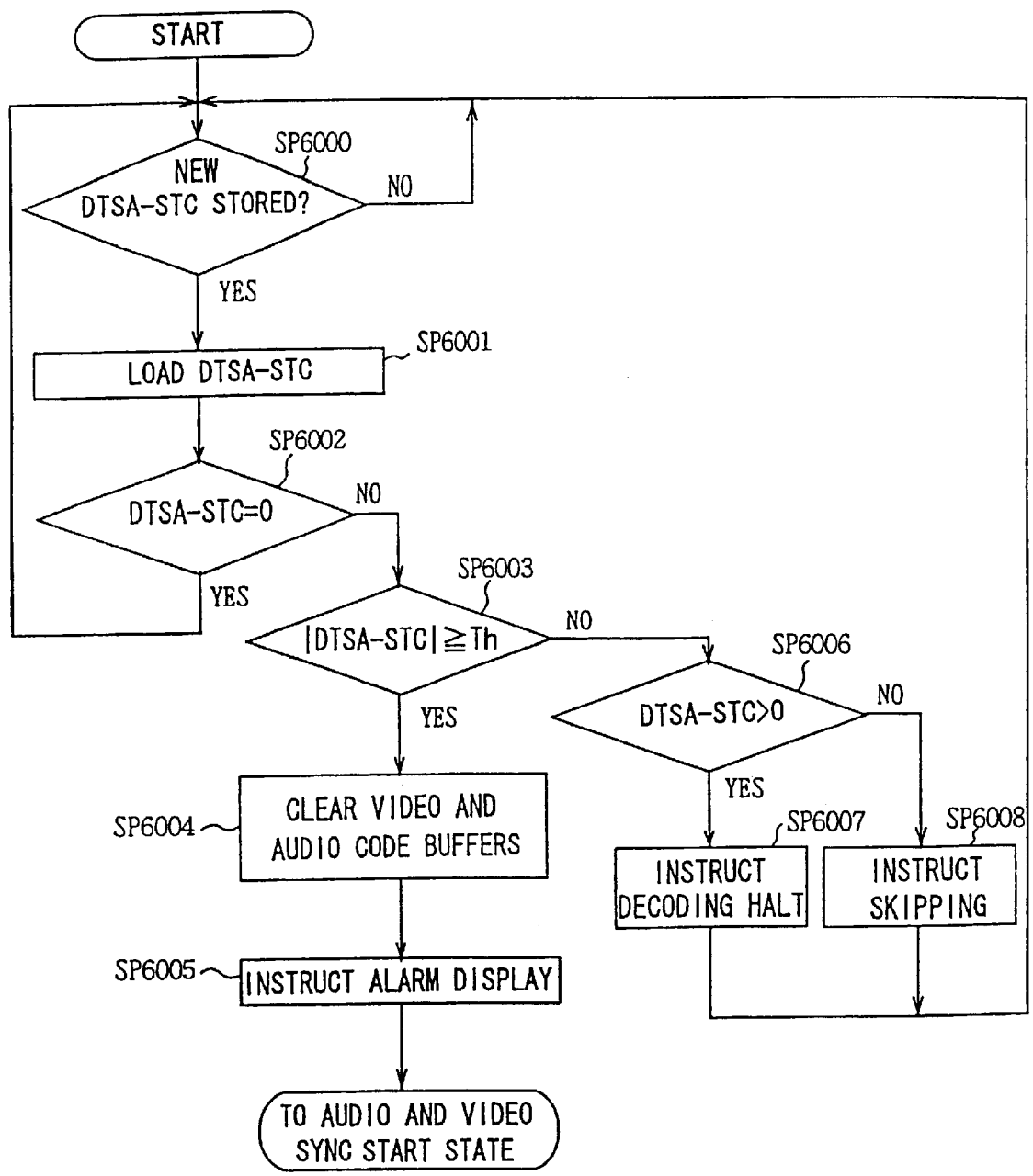
FIG. 27 is a flowchart illustrating processing executed by the controller 16 to correct an error in the synchronization in terms of audio.

FIG. 27 shows the flow of processing executed by the controller to correct synchronization errors associated with the DTSA. When a new (DTSA–STC) is stored in the storage device 20 (step SP6000), the controller 16 loads this value (step SP6001). If (DTSA–STC)=0, the controller takes no corrective action for the audio decoder 11 (step SP6002). The controller 16 then compares the absolute value of (DTSA–STC) with a specified value (step SP6003). If the absolute value of (DTSA–STC) is large and exceeds the specified value, the controller 16 determines that a serious synchronization error is occurring, and clears the video code buffer 6 and the audio code buffer 9 (step SP6004) to enter the audio and video synchronized start state. If the absolute value of (DTSA–STC) does not exceed the specified value, it determines whether the DTSA is positive or negative (step SP6006). If (DTSA–STC)>0, the decoding of audio data has advanced relative to the STC. The controller 16 thus instructs the audio decoder 11 to halt decoding for an appropriate number of pictures corresponding to the magnitude of |DTSA–STC| and to repeat decoding of audio data (step SP6007). If (DTSA–STC)<0, the decoding of audio data is delayed relative to the STC, so the controller instructs the audio decoder 11 to skip audio data for an appropriate duration corresponding to the magnitude of |DTSA–STC| (step SP6008).

In the above detection and correction of synchronization errors, the controller 16 may instruct the information display device 19 and the postprocessor 15 to light a lamp indicating that a substantial amount of video data may have been lost and to display this condition on the screen if it determines that a serious synchronization error is occurring (steps SP5006, SP6005).

(3-13) Error Detection

Although data read from the DSM 1 have errors corrected by the error correction device 3, if any, data containing a large amount of error data may be sent to the video decoder 8, the audio decoder 11, or the superimposed dialogue decoder 14 via the demultiplexer 5 without having the errors completely corrected. In this case, error flags contained in error data enable the video decoder 8, the audio decoder, 11, and the superimposed dialogue decoder 14 to detect the errors.

In addition, since both the video decoder 8 and the audio decoder 11 decode video or audio data in conformity with ISO11172 (MPEG1) or ISO13818 (MPEG2), they can detect errors by attempting to find data inconsistent with this syntax. In any case, when detecting an error, the video decoder 8, the audio decoder 11, and the superimposed dialogue decoder 14 send a signal to the controller 16 informing it of the presence of the error.

If a decoding error is detected in the video decoder 8 or the audio decoder 11, video or audio data may have been lost, and the synchronization of displayed images with output voices may thus fail if reproduction is continued. Such a synchronization error can be corrected by the above synchronization error detection and correction method. In addition to synchronization error correction, the controller 16 can count the frequency of errors to understand disk error generation conditions. This enables the error correction algorithm of the error correction device 3 to be modified or the error generation conditions to be notified to the user.

Figure 28:
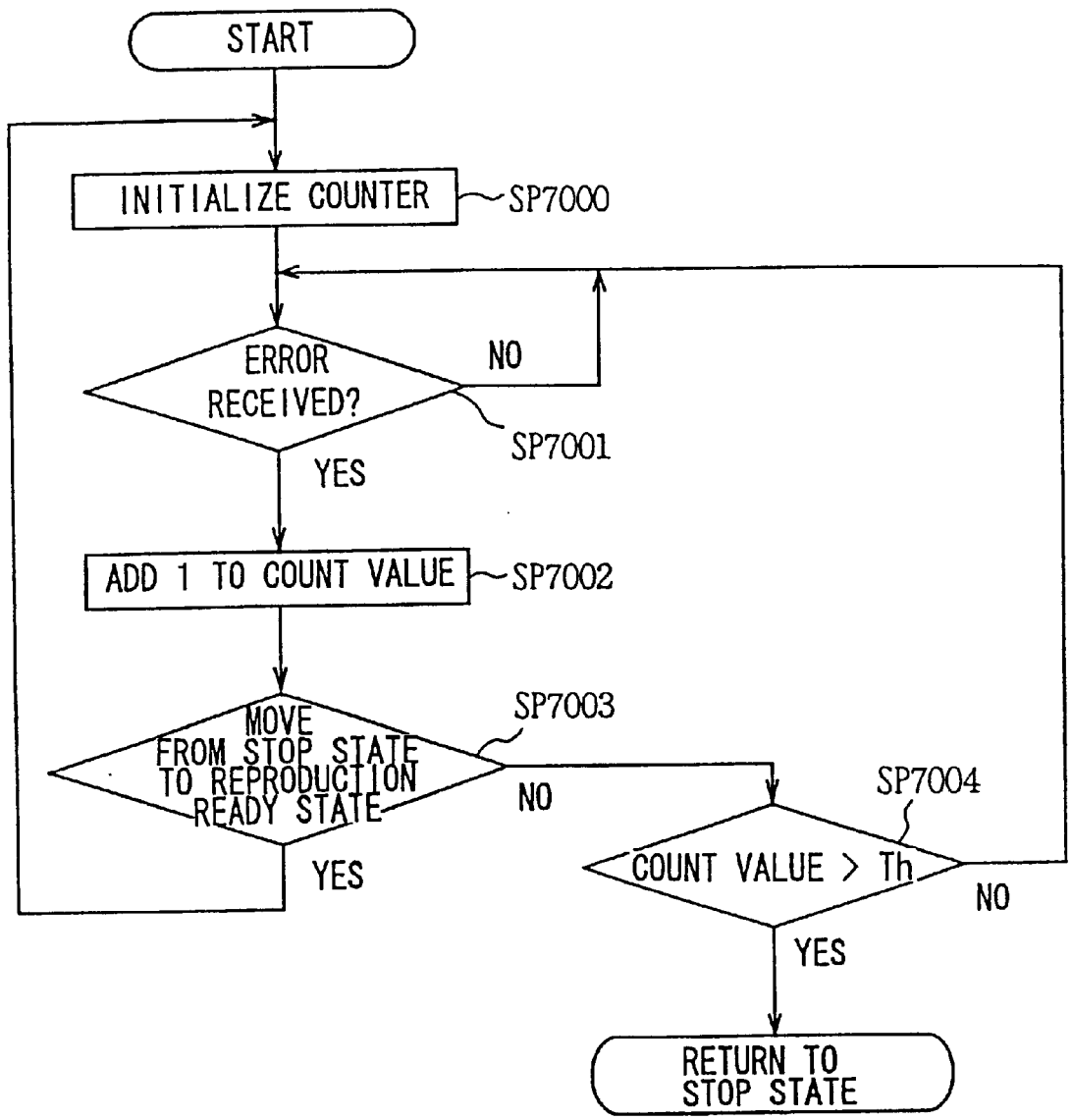
FIG. 28 is a flowchart illustrating processing executed by the controller 16 to detect an error.
Figure 29:
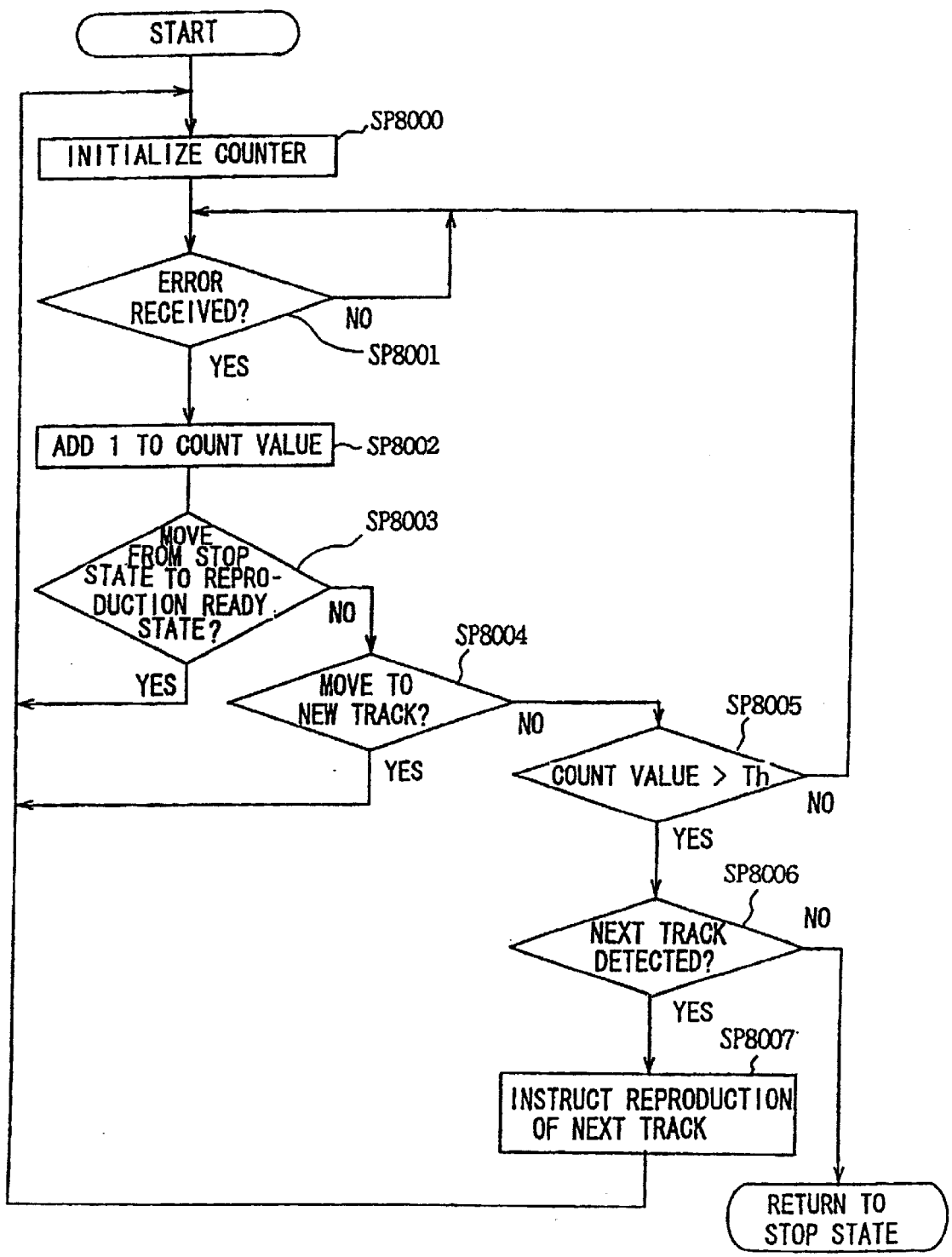
FIG. 29 is a flowchart illustrating other processing executed by the controller 16 to detect an error.
Figure 30:
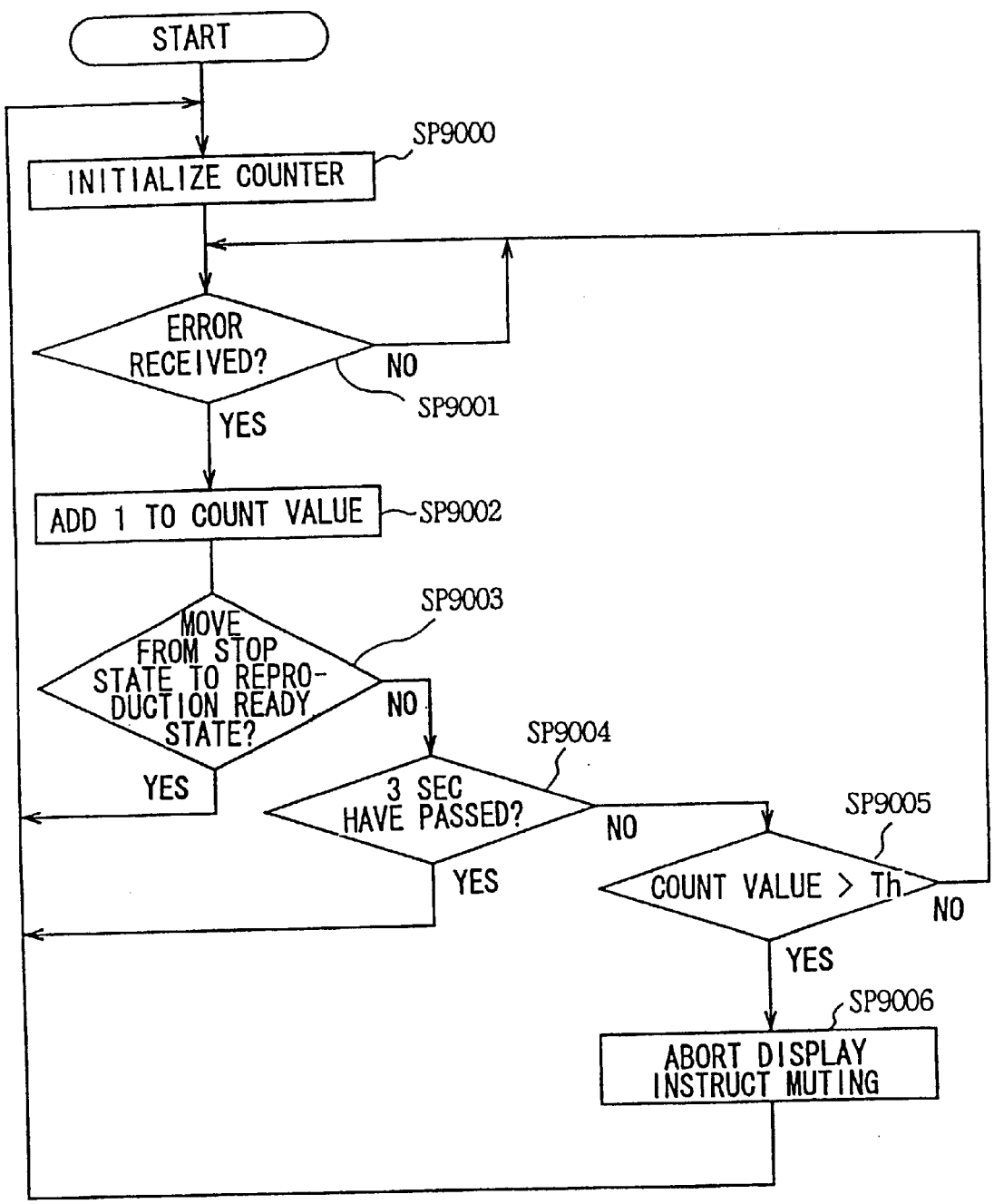
FIG. 30 is a flowchart illustrating other processing executed by the controller 16 to detect an error.

The controller 16 calculates the frequency of errors occurring in the disk, or in the track, or within the past specified duration by counting the number of received signals informing the presence of an error. Specifically, three error frequency storage regions are provided in the storage device 20: a disk error frequency storage region, an track error frequency storage region, and a three-second error frequency storage region, and these regions operate as counters. FIGS. 28, 29, and 30 show the flow of processing executed by the controller to detect errors using each of the counters. The disk error frequency storage region is reset when the stop state is shifted to the reproduction ready state, the track error frequency storage region is also reset when the stop state is shifted to the reproduction ready state and the new track reproduction, and the three-second error frequency storage region is also reset when the stop state is shifted to the reproduction ready state as well every three seconds (steps SP7000, SP7003, SP8000, SP8003, SP8004, SP9000, SP9003, SP9004).

If the controller 16 receives an error signal from the video decoder 8, the audio decoder 11, or the superimposed dialogue decoder 14 (steps SP7001, SP8001, SP9001), it adds 1 to each of the values stored in the disk, the track, and the three-second error frequency storage regions (steps SP7002, SP8002, SP9002). After the addition, if the value in the disk error frequency storage region exceeds the predetermined threshold, the controller 16 determines that the DSM 1 being reproduced has a large number of defects (step SP7004) to enter the stop state.

If the value in the track error frequency storage region exceeds the predetermined threshold (step SP8005), the controller 16 determines that this track has a large number of defects, and suspends the reproduction of the track to start the reproduction of the next track (steps SP8006, SP8007). However, it suspends reproduction to enter the stop state if it finds from the TOC data that the next data do not exist. If the value in the three-second error frequency storage region exceeds the predetermined threshold (step SP9005), the controller 16 instructs the video decoder 8 and the superimposed dialogue decoder 14 to halt the display of the screen and the audio decoder 11 to mute outputs for the next three seconds (step SP9006).

(3-14) Identification of Reproduced Tracks

In the reproduction steady state, the controller 16 loads sector number data from the demultiplexer 5 when receiving a signal from the demultiplexer 5 indicating that sector numbers have been detected. The controller compares the loaded sector number data with the start and the end sector numbers of each track in the TOC data shown in FIG. 5 to detect whether or not the sector numbers read from the demultiplexer 5 belong to that track. If the numbers do not belong to the track being currently reproduced, the controller 16 instructs the information display device 19 and the postprocessor 15 to light a lamp indicating the fact that the reproduced track has been changed and/or the number of the reproduced track and to display them on the screen.

In addition, the controller 16 instructs the demultiplexer 5 to stop demultiplexing if it detects that the reproduction of the final track is finished. The controller 16 subsequently waits for an underflow error signal indicating that all of the video code buffer 8, the audio code buffer 11, and the superimposed dialogue code buffer 12 have become empty, and then enters the stop state.

In the reproduction steady state, the controller 16 loads subcode data from the subcode decoder 21 as when loading sector numbers from the demultiplexer 5. As in sector number data read from the demultiplexer 5, the controller 16 compares the loaded subcode data with the start and the end sector numbers of each track in the TOC data shown in FIG. 5 to identify the number of the track to which the data are currently being input to the error correction device 3. If the identified track differs from the track being currently reproduced and if the user has specified reproduction in an inconsecutive order, the controller enters the reproduction ready state to reproduce the next track to be reproduced in that order.

In the reproduction steady state, the controller 16 enters the stop state if it receives a stop instruction from the user input device 18 or the external interface 17. In the reproduction steady state, the controller 16 enters the search state if it receives a search instruction from the user input device 18 or the external interface 17. In the reproduction steady state, the controller 16 enters the pause state if it receives a pause instruction from the user input device 18 or the external interface 17.

(3-15) Control of Superimposed Dialogue Decoder

Superimposed dialogue data are encoded in each screen. A DTSS indicating that decoding start time of each superimposed dialogue screen is stored in the superimposed dialogue data header contained in the leading data for the superimposed dialogue screen. A duration_time indicating the display duration of a superimposed dialogue screen is stored at the beginning of the superimposed dialogue screen in each superimposed dialogue data. The DTSS is stored in no superimposed dialogue data headers other than in the leading data for each superimposed dialogue screen. The leading data for a superimposed dialogue screen can be searched for by searching for the DTSS.

Figure 31:
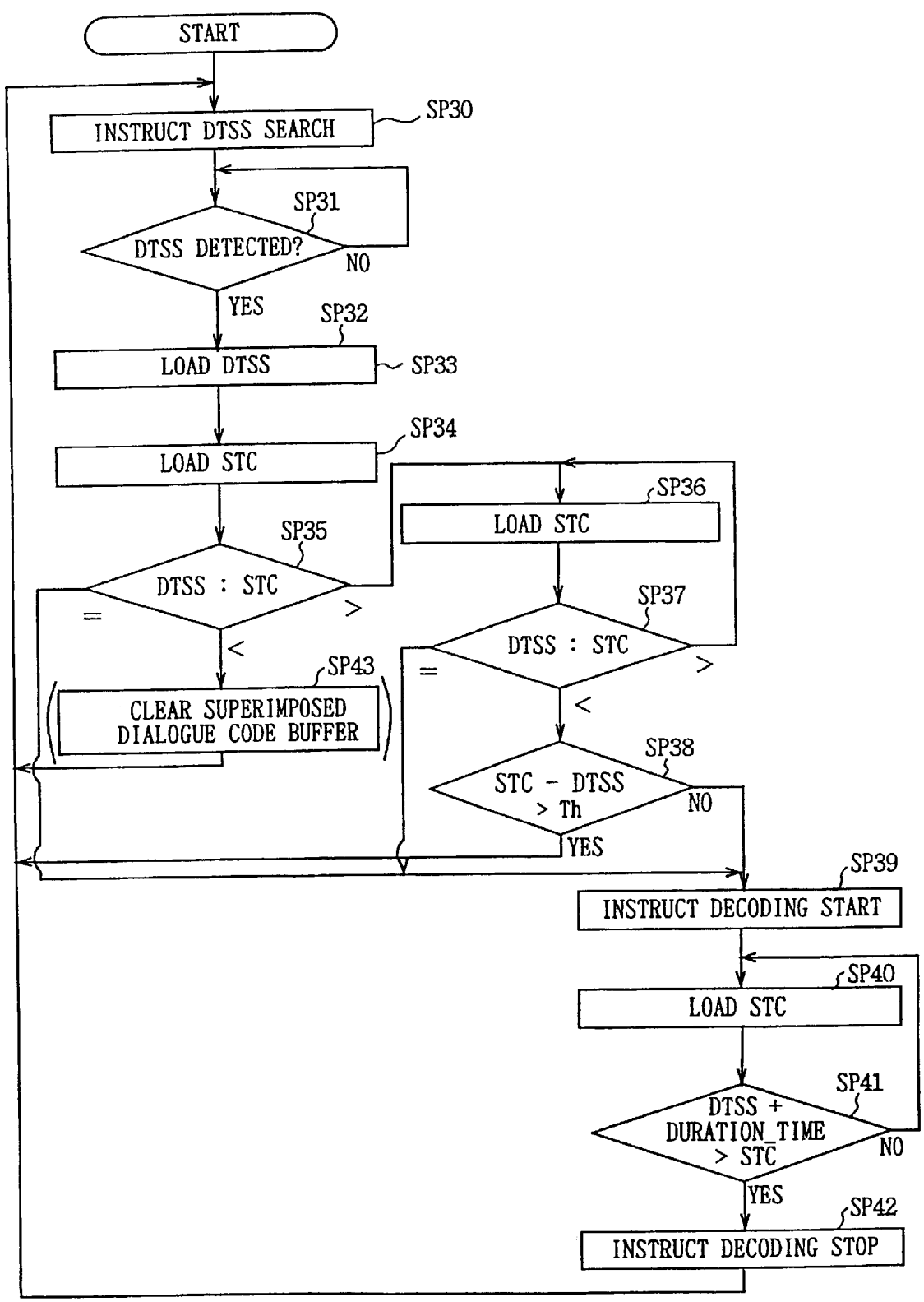
FIG. 31 is a flowchart illustrating superimposed dialogue processing by the controller 16.

FIG. 31 shows the flow of processing executed by the controller 16 to control the superimposed dialogue decoder in the reproduction steady state. In the reproduction steady state, the controller 16 checks the decoding start time when receiving a DTSS detection signal from the DTSS detector 25. It first reads the detected DTSS from the DTSS detector 25 and the current value of the STC from the STC register 23 (steps SP33, SP34). It then compares the readout DTSS with this STC (step SP35). If DTSS<STC, it determines that it has missed the decoding timing, and clears the superimposed dialogue buffer (step SP43). The controller then issues a DTSS search instruction to the DTSS detector 25 and the superimposed dialogue decoder 14 (step SP30). It then waits for a DTSS detection signal from the DTSS detector 25 (step SP31), and, if a DTSS is detected, checks the decoding start time for the next superimposed dialogue screen.

If DTSS=STC, the controller determines that decoding should be started and issues an instruction to decode data for a single screen. In addition, if DTSS>STC, it performs the same operation when DTSS=STC is met after determining that it is too early to start decoding (steps SP36, SP37, SP38, SP39). When receiving the instruction to decode data for a single screen, the superimposed dialogue decoder 14 decodes superimposed dialogue data for a single screen which are obtained from the superimposed dialogue code buffer 12 via the DTSS detector 25 and retains them in its internal frame memory. It then starts outputting the data to the postprocessor 15.

Furthermore, the controller 16 waits until DTSS+duration_time>STC is met (steps SP40, SP41). During this operation, the superimposed dialogue screen continues to be displayed. When DTSS+duration_time>STC is met, the controller issues a display stop instruction to the superimposed dialogue decoder 14 (step SP42) to end the display of the superimposed dialogue screen. The DTSS corresponding to the leading data for the next superimposed dialogue screen may be detected while the controller 16 is waiting until DTSS+duration_time>STC. In this case, the controller carries out no processing until DTSS+duration_time>STC is met to cause the display of the superimposed dialogue screen to be finished.

After the display of the superimposed dialogue screen is ended, the controller reads out the DTSS for the next superimposed dialogue screen from the DTSS detector 25 to check the decoding start time if the DTSS corresponding to the leading data for the next superimposed dialogue screen is detected while the controller 16 is waiting for DTSS+duration_time>STC to be met.

If the controller 16 is waiting for DTS=STC to be met after loading the DTSS and determining that DTSS>STC, an I-picture detection signal may be sent from the video decoder 8 and the DTSV corresponding to this I-picture may cause the STC register to be reset. The countup of the STC may then become discontinuous to lead to DTSS<STC, thereby preventing DTSS=STC from being established how long the controller waits.

Thus, if DTSS<STC is met (step SP37) with (STC−DTSS) smaller than a threshold, for example, duration_time, while the controller is waiting for DTSS=STC to be met after determining that DTSS>STC, this superimposed dialogue screen should still be displayed, and the superimposed dialogue decoder 14 can be forced to start decoding for a single screen. However, if (STC−DTSS) is large, the controller 16 determines that a serious synchronization error is occurring and issues a DTSS search instruction to the superimposed dialogue decoder 14 and the DTSS detector 25 (step SP30). When a DTSS is detected, it checks the decoding start time for this superimposed dialogue screen.

(3-16) Search State

The search state is an operation for reproducing only the I-pictures of video data which appear at a specified interval and skipping the P- and the B-pictures between the I-pictures instead of reproducing them to reproduce video data stored in the DSM 1 in a shorter time than in normal reproduction. Selective display of only I-pictures in the same direction as in normal reproduction is referred to as forward search, while selective display of I-pictures in the direction reverse to that of normal reproduction, that is, the direction in which the reproduction time becomes sequentially earlier.

Figure 32:
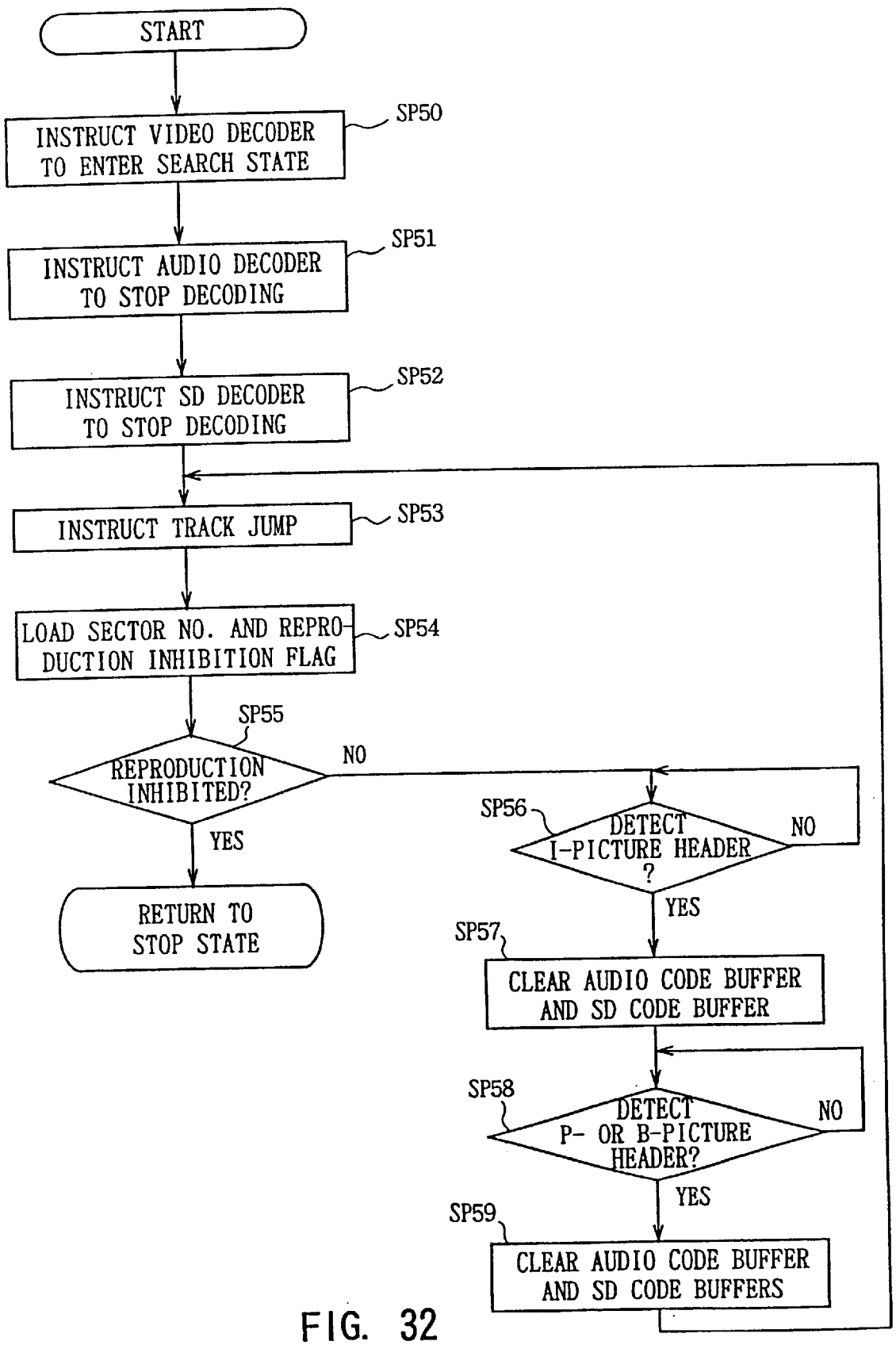
FIG. 32 is a flowchart illustrating processing by the controller 16 in its search state.

FIG. 32 shows the flow of processing by the controller 16 in its search state. When entering the search state, the controller 16 sends a signal to the video coder 8 meaning that it has entered the search state (step SP50). When receiving the signal meaning that the search state has been entered, the video decoder 8 decodes only the I-picture data of the data loaded from the DTSV detector 7 and skips the other data, that is, the P- and the B-picture data instead of decoding them. The decoded I-pictures are displayed immediately after decoding.

The controller also instructs the audio decoder 11 to stop decoding and to mute output sounds, and also instructs the superimposed dialogue decoder 14 to stop decoding and to halt decoding outputs (steps SP51, SP52). This prevents audio and superimposed dialogue data from being reproduced during search.

In the search state, for the forward search, the controller 16 instructs the drive unit 2 to perform track jump in the forward direction of the pickup, whereas, for the reverse search, it instructs the drive unit 2 to execute reverse track jump (step SP53). In response to a forward or a reverse track jump instruction, the drive unit 2 causes the pickup to move in such a way that, for the forward track jump instruction, data can be read from a large sector number relative to the current position of the pickup whereas, for the reverse track jump instruction, data can be read from a small sector number relative to the same position.

The amount of the movement of the pickup during track jump need not be specified accurately. That is, unlike a seek instruction wherein the number of the sector to which the pickup should move is rigidly specified, these instructions do not require the amount of jump to be specified accurately due to the combination of the DSM 1 and the drive unit 2 that can only designate an approximate movement direction and an approximate amount of movement when desired jump is fast and involves a very large amount of movement.

When the movement of the pickup is finished and the data at the position to which the pickup has moved are then loaded into the error correction device, subcode data in the format shown in FIG. 2 are loaded into the subcode decoder 21. The controller 16 loads sector number data and a reproduction inhibition flag from the subcode data loaded into the subcode decoder 21 (step SP54).

If the loaded reproduction inhibition flag is set (step SP55), that is, means that reproduction is inhibited, the controller 16 determines that, after track jump, the pickup has entered a lead in area, a lead out area, or a TOC area, and enters the stop state. Otherwise, the multiplexed data at the sector number read after track jump are supplied to the video decoder 8, the audio decoder 11, and the superimposed dialogue decoder 14.

Since the video decoder 8 is in the search state, it searches for an I-picture header to reproduce only I-pictures. When detecting an I-picture header, the video decoder 8 sends a signal to the controller 16 informing that an I-picture header has been detected, and promptly decodes the I-picture to output it immediately after completing decoding. If it next detects a P- or a B-picture header, it informs the controller 16 of the detection, and starts searching for the next I-picture header instead of decoding the P- or the B-picture data.

When entering the search state, the controller 16 starts to wait for a signal from the video decoder 8 informing an I-picture header has been detected (step SP56). When receiving an I-picture header detection signal, it starts to wait for a next P- or B-picture header detection signal (step SP58). When receiving a P- or B-picture header detection signal, the controller 16 determines that the decoding of the I-picture is finished. Again, for forward search, the controller 16 instructs the drive unit 2 to cause track jump of the pickup in the forward direction whereas for reverse search, it instructs the drive unit 2 to cause track jump of the pickup in the reverse direction in order to repeat the above search state (step SP53).

In the search state, audio and superimposed dialogue data are loaded into the audio code buffer 9 and the superimposed dialogue code buffer 12, respectively. However, since the audio decoder 11 and the superimposed dialogue decoder 14 has stopped decoding, the audio code buffer 9 and/or the superimposed dialogue code buffer 12 may overflow, thereby preventing the demultiplexer 5 from transferring data to the video code buffer 6, the audio code buffer 9, and the DTSS detector 25.

Consequently, in the search state, the controller 16 periodically clears the audio code buffer 9 and the superimposed dialogue code buffer 12. For example, it clears these buffers each time the controller receives an I-, a P-, or a B-picture header detection signal from the video decoder 8 (step SP57, SP58). In the search state, the controller 16 enters the synchronized start method determination state if it receives a search operation release instruction from the user input device 18 or the external interface 17. In the search state, the controller 16 enters the stop state if it receives a stop instruction from the user input device 18 or the external interface 17.

(3-17) Pause State

Figure 33:
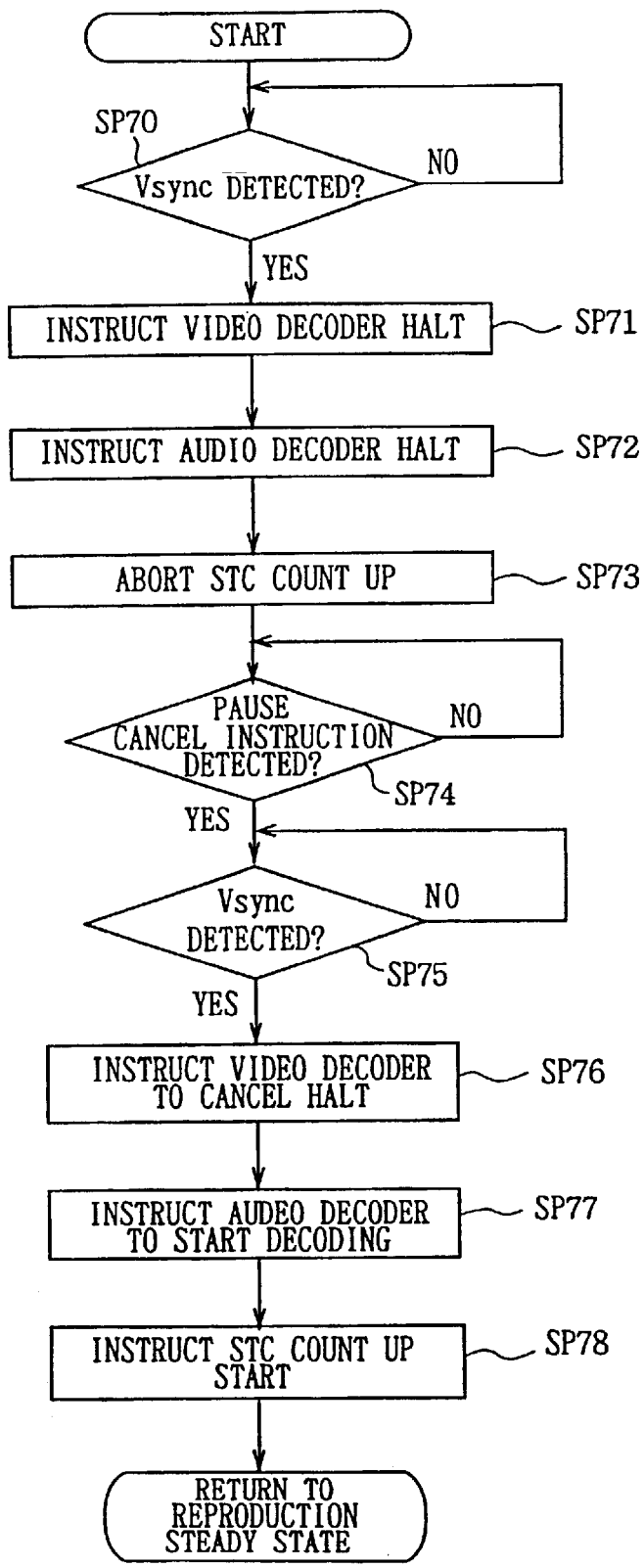
FIG. 33 is a flowchart illustrating processing by the controller 16 in its halt state.

FIG. 33 shows the flow of processing by the controller 16 in its pause state. When entering the pause state, the controller 16 starts to wait a vertical synchronization signal from the vertical synchronization generator (step SP70). When detecting a vertical synchronization signal, it issues a halt instruction to the video decoder 8 and a decoding stop instruction to the audio decoder 11, and simultaneously instructs the STC countup circuit to abort the automatic countup of the STC (step SP71, SP72, SP73).

When receiving a halt instruction, the video decoder 8 halts decoding and continues to display the last decoded screen. In this case, if the image being decoded is an interlaced image wherein a single screen comprises two fields with a temporal difference, the video decoder 8 selects one of the odd and the even number fields constituting this image to display the selected field even when the other field should be displayed, thereby restraining flickering. When receiving a decoding stop instruction, the audio decoder 11 promptly aborts decoding.

In the pause state, if a superimposed dialogue screen is displayed at the moment when the normal reproduction state is shifted to the pause state, this screen continues to be displayed. Otherwise, no superimposed dialogue screen is displayed. In the pause state, when receiving a pause release instruction from the user input device 18 or the external interface 17, the controller 16 starts to wait for a vertical synchronization signal from the vertical synchronization signal generator (steps SP74, SP75). When detecting a vertical synchronization signal, it issues a pause release instruction to the video decoder 8 and a decoding start instruction to the audio decoder 11, and simultaneously instructs the STC countup circuit to start the automatic countup of the STC (step SP76, SP77, SP78). The controller 16 subsequently enters the normal reproduction state.

Figure 34:
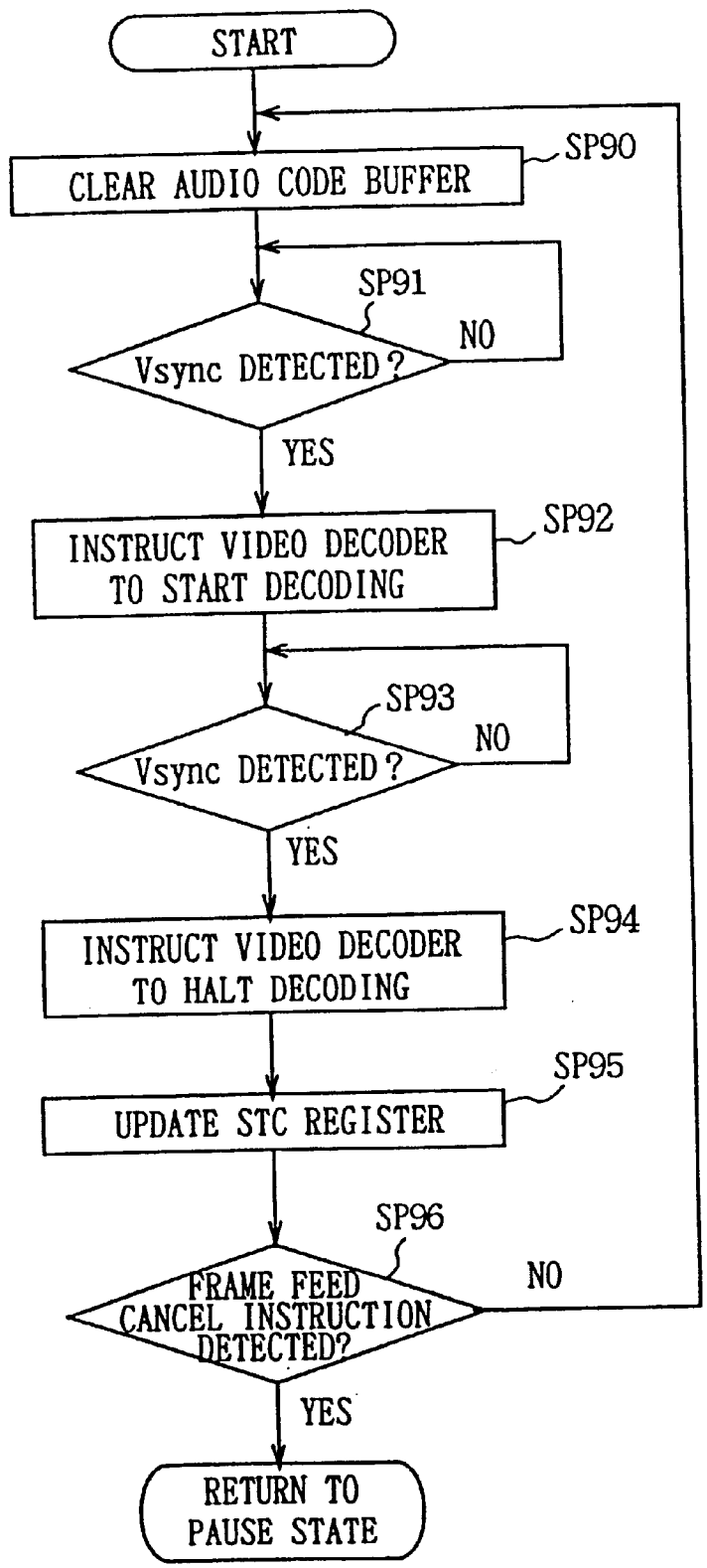
FIG. 34 is a flowchart illustrating processing by the controller 16 in its frame feed state.

In the pause state, the controller 16 enters the frame feed state if it receives a frame feed instruction from the user input device 18 or the external interface 17. FIG. 34 show the flow of processing by the controller 16 in its frame feed state. When entering the frame feed state, the controller 16 first orders the audio code buffer 9 to be cleared (step SP90). This is to avoid the underflow of the audio code buffer during the next decoding of a single screen by the video decoder.

The controller then forces the video decoder 8 to decode a single frame. That is, the controller waits for a vertical synchronization signal from the vertical synchronization generation circuit 22 (step SP91), sends a decoding start instruction to the video decoder 8 in response to a vertical synchronization signal (step SP92), and issues a halt instruction in response to the next vertical synchronization signal (steps SP93, SP94). The controller then sets the STC forward by one frame (step SP95). That is, the controller 16 reads out an STC from the STC register 23 to add one frame of display time to this STC, and then sets the result back into the STC register 23. The controller 16 then determines whether or not the user input device 18 or the external interface 17 is issuing a frame feed release instruction (step SP96), and if not, repeats the above processing.

In this case, the controller performs the following processing for the superimposed dialogue screen as in the normal reproduction state: If a superimposed dialogue screen is currently displayed, it issues a display stop instruction to the superimposed dialogue decoder 14 when DTSS+ duration_time>STC is met, thereby ending the display the superimposed dialogue screen. Otherwise, it instructs the superimposed dialogue decoder 14 to display the next superimposed dialogue screen when DTSS<STC is met. After finishing the above processing, the controller moves from the frame feed state to the pause state.

As described above, this invention implements a data reproduction apparatus and a data storage medium for reproducing multiplexed data with video, audio, and superimposed dialogue data compressed at a variable rate and performing various functions.

INDUSTRIAL APPLICABILITY

The data storage medium according to this invention is applicable to digital video disks (DVDS) wherein bit streams compressed using MPEG are stored. In addition, the data reproduction apparatus according to this invention is applicable to reproduction devices for reproducing such DVDs.

What is claimed is:

1. A data management system, comprising:
a data storage medium wherein data including at least two types of data multiplexed therein is stored, said data including said at least two types of data being operationally divided into a plurality of tracks and including a table of contents having a subsection for each of said tracks, wherein said plurality of tracks includes a title track and an end track, said title track and end track being stored in a fixed area of said data storage medium and said fixed area being allocated for storage of said title track and end track prior to the storage of any data on said data storage medium, wherein each said subsection includes a multiplexing flag for each one of said at least two types of data included therein indicating whether or not said one of said at least two types of data is included within the respective track, and wherein each said subsection includes a validity flag indicating whether or not said multiplexing flag for each said one of said at least two types of data is valid; and
data reproduction means for reproducing data from the data storage medium, the data reproduction means including readout means for reading data including said multiplexed data from said data storage medium, a plurality of decoding means for decoding said multiplexed data, control means for determining the multiplexing state of data in a predetermined data unit and for controlling said plurality of decoding means according to the multiplexing state, error detection means for detecting when said table of contents read from said data storage medium contains an error, and means for performing an error correction process on said table of contents read from said data storage medium and to repeat said error correction process at least one time if the initial performance thereof fails to correct all errors in said table of contents; wherein for each track, when said validity flag indicates that said multiplexing flag for each type of data is valid, the operation of determining the multiplexing state of data in a predetermined data unit is made on the basis of said multiplexing flag for each type of data.

2. The data management system according to claim 1, wherein said control means determines said multiplexing state based on multiplexing state information for the data in said predetermined data unit.

3. The data management system according to claim 1, wherein said control means determines said multiplexing state depending on whether or not decoding start time information for each data unit has been detected within a specified duration.

4. The data management system according to claim 1, wherein said control means selects a reproduction start procedure for said predetermined data unit depending on whether or not video, audio, and superimposed dialogue data are multiplexed within said predetermined data unit.

5. The data management system according to claim 4, further comprising a reference clock; and wherein said plurality of decoding means include a video decoder for decoding video data and an audio decoder for decoding audio data; such that if said predetermined data unit contains only video data, said control means instructs said reference clock to operate and only said video decoder to start decoding, and if said audio data is detected after said video decoder has started decoding, instructs the audio decoder to start decoding the audio data in synchronization with said reference clock.

6. The data management system according to claim 4, further comprising a reference clock; and wherein said plurality of decoding means include a video decoder for decoding video data and an audio decoder for decoding audio data; such that if said predetermined data unit contains only audio data, said control means instructs said reference clock to operate and only said audio decoder to start decoding, and if said video data is detected after said audio decoder has started decoding, instructs the video decoder to start decoding the video data in synchronization with said reference clock.

7. The data management system according to claim 4, further comprising a reference clock; and wherein said plurality of decoding means include a video decoder for decoding video data and a superimposed dialogue decoder for decoding superimposed dialogue data; such that if said predetermined data unit contains only superimposed dialogue data, said control means instructs said reference clock to operate and only said superimposed dialogue decoder to start decoding and, if said video data is detected after said superimposed dialogue decoder has started decoding, instructs the video decoder to start decoding the video data in synchronization with said reference clock.

8. The data reproduction apparatus according to claim 4, further comprising a reference clock; and wherein said plurality of decoding means include an audio decoder for decoding audio data and a superimposed dialogue decoder for decoding superimposed dialogue data; such that if said predetermined data unit contains only superimposed dialogue data, said control means instructs said reference clock to operate and only said superimposed dialogue decoder to start decoding and, if said audio data is detected after said superimposed dialogue decoder has started decoding, instructs the audio decoder to start decoding the audio data in synchronization with said reference clock.

* * * * *